US008057296B2

(12) United States Patent
Hedrick et al.

(10) Patent No.: US 8,057,296 B2
(45) **Date of Patent: *Nov. 15, 2011**

(54) GAMING DEVICE INCLUDING A CARD PROCESSING ASSEMBLY HAVING VERTICALLY-STACKED CARD HOLDERS OPERABLE WITH THERMALLY-PRINTABLE DATA CARDS AND PORTABLE CARD CHANGEOVER MACHINES

(75) Inventors: Joseph R. Hedrick, Reno, NV (US); William R. Wells, Reno, NV (US); Franco Crivelli, Reno, NV (US); Greg Parrott, Reno, NV (US)

(73) Assignee: IGT, Reno, NV (US)

( * ) Notice: Subject to any disclaimer, the term of this patent is extended or adjusted under 35 U.S.C. 154(b) by 1690 days.

This patent is subject to a terminal disclaimer.

(21) Appl. No.: 11/158,478

(22) Filed: Jun. 22, 2005

(65) Prior Publication Data

US 2005/0282627 A1 Dec. 22, 2005

Related U.S. Application Data

(63) Continuation-in-part of application No. 10/661,229, filed on Sep. 12, 2003, now Pat. No. 7,494,414.

(51) Int. Cl.
*A63F 13/08* (2006.01)

(52) U.S. Cl. ............................... 463/25; 463/29; 463/47

(58) Field of Classification Search .................... 463/25, 463/29, 43, 47
See application file for complete search history.

(56) References Cited

U.S. PATENT DOCUMENTS

| | | | |
|---|---|---|---|
| 3,947,691 | A | 3/1976 | Goldstein |
| 4,197,986 | A | 4/1980 | Nagata |
| 4,519,600 | A | 5/1985 | Warwick et al. |
| 4,575,622 | A | 3/1986 | Pellegrini |
| 4,593,183 | A | 6/1986 | Fukatsu |
| 4,677,435 | A | 6/1987 | Causse et al. |
| 4,683,371 | A | 7/1987 | Drexler |
| 4,747,049 | A | 5/1988 | Richardson et al. |
| 4,764,666 | A | 8/1988 | Bergeron |
| 4,820,912 | A | 4/1989 | Samyn |
| 4,879,268 | A | 11/1989 | Sheldon |
| 4,880,237 | A | 11/1989 | Kishishita |

(Continued)

FOREIGN PATENT DOCUMENTS

| | | |
|---|---|---|
| EP | 0288300 | 10/1988 |

(Continued)

OTHER PUBLICATIONS

"Heavy Duty Dollar Bill Size Direct Thermal Slot Machine Voucher: Operators Manual," Future Logic, Incorporated, 2000 (73 pages total).

(Continued)

*Primary Examiner* — Dmitry Suhol
*Assistant Examiner* — Jay Trent Liddle
(74) *Attorney, Agent, or Firm* — K&L Gates LLP

(57) ABSTRACT

A gaming device having a card management system which is operable to manage a plurality of circulating data cards. The gaming device includes a card read-write device for reading data cards, a plurality of vertically-stacked card holders for holding a plurality of data cards and one or more card transporters for moving data cards to and from the card holders. The gaming device is operable with a portable card changeover machine. The present invention increases the convenience and efficiency for playing and managing gaming devices.

26 Claims, 29 Drawing Sheets

U.S. PATENT DOCUMENTS

| | | | | | |
|---|---|---|---|---|---|
| 4,882,473 | A | | 11/1989 | Bergeron | |
| 4,977,410 | A | | 12/1990 | Onuki et al. | |
| 5,038,022 | A | | 8/1991 | Lucero | |
| 5,067,832 | A | | 11/1991 | Baur et al. | |
| 5,122,754 | A | | 6/1992 | Gotaas | |
| 5,179,517 | A | | 1/1993 | Sarbin et al. | |
| 5,200,601 | A | | 4/1993 | Jarvis | |
| 5,227,226 | A | | 7/1993 | Rzasa | |
| 5,264,689 | A | | 11/1993 | Maes et al. | |
| 5,265,874 | A | | 11/1993 | Dickinson et al. | |
| 5,266,781 | A | | 11/1993 | Warwick et al. | |
| 5,276,312 | A | | 1/1994 | McCarthy | |
| 5,290,033 | A | | 3/1994 | Bittner et al. | |
| 5,294,785 | A | | 3/1994 | Fukuda et al. | |
| 5,326,104 | A | | 7/1994 | Pease et al. | |
| 5,326,179 | A | | 7/1994 | Fukai et al. | |
| 5,332,076 | A | | 7/1994 | Ziegert | |
| 5,342,047 | A | | 8/1994 | Heidel et al. | |
| 5,344,144 | A | | 9/1994 | Canon | |
| 5,371,345 | A | | 12/1994 | LeStrange et al. | |
| 5,397,125 | A | | 3/1995 | Adams | |
| 5,398,932 | A | | 3/1995 | Eberhardt et al. | |
| 5,426,285 | A | | 6/1995 | Sherrod | |
| 5,440,108 | A | | 8/1995 | Tran et al. | |
| 5,448,279 | A | | 9/1995 | Matsuda et al. | |
| 5,448,280 | A | | 9/1995 | Matsuda et al. | |
| 5,448,284 | A | | 9/1995 | Matsuda et al. | |
| 5,457,306 | A | | 10/1995 | Lucero | |
| 5,470,079 | A | | 11/1995 | LeStrange et al. | |
| 5,471,044 | A | | 11/1995 | Hotta et al. | |
| 5,504,321 | A | | 4/1996 | Sheldon | |
| 5,504,701 | A | | 4/1996 | Takahashi et al. | |
| 5,504,808 | A | | 4/1996 | Hamrick, Jr. | |
| 5,505,449 | A | | 4/1996 | Eberhardt et al. | |
| 5,530,232 | A | | 6/1996 | Taylor | |
| 5,554,312 | A | | 9/1996 | Ward | |
| 5,557,086 | A | | 9/1996 | Schulze et al. | |
| 5,559,312 | A | | 9/1996 | Lucero | |
| 5,575,374 | A | | 11/1996 | Orus et al. | |
| 5,580,309 | A | | 12/1996 | Piechowiak et al. | |
| 5,594,233 | A | | 1/1997 | Kenneth et al. | |
| 5,606,158 | A | * | 2/1997 | Takemoto et al. | 235/380 |
| 5,609,337 | A | | 3/1997 | Clapper | |
| 5,611,730 | A | | 3/1997 | Weiss | |
| 5,627,356 | A | | 5/1997 | Takemoto et al. | |
| 5,628,685 | A | | 5/1997 | Takemoto et al. | |
| 5,645,485 | A | | 7/1997 | Clapper, Jr. | |
| 5,645,486 | A | | 7/1997 | Nagao et al. | |
| 5,655,961 | A | | 8/1997 | Acres et al. | |
| 5,683,082 | A | | 11/1997 | Takemoto et al. | |
| 5,698,839 | A | | 12/1997 | Jagielinski et al. | |
| 5,709,603 | A | | 1/1998 | Kaye | |
| 5,714,743 | A | | 2/1998 | Chiba et al. | |
| 5,714,748 | A | | 2/1998 | Lee | |
| 5,720,500 | A | | 2/1998 | Okazaki et al. | |
| 5,724,545 | A | | 3/1998 | Skorski | |
| 5,748,737 | A | | 5/1998 | Daggar | |
| 5,761,647 | A | | 6/1998 | Boushy | |
| 5,766,074 | A | | 6/1998 | Cannon et al. | |
| 5,768,143 | A | | 6/1998 | Fujimoto | |
| 5,810,665 | A | * | 9/1998 | Takemoto et al. | 463/31 |
| 5,811,772 | A | | 9/1998 | Lucero | |
| 5,814,796 | A | | 9/1998 | Benson et al. | |
| 5,816,918 | A | | 10/1998 | Kelly et al. | |
| 5,836,817 | A | | 11/1998 | Acres et al. | |
| 5,852,463 | A | | 12/1998 | Koshida et al. | |
| 5,854,477 | A | | 12/1998 | Kawaji et al. | |
| 5,876,284 | A | | 3/1999 | Acres et al. | |
| 5,880,769 | A | | 3/1999 | Nemirofsky et al. | |
| 5,882,127 | A | | 3/1999 | Amano | |
| 5,902,184 | A | | 5/1999 | Bennett | |
| 5,902,983 | A | | 5/1999 | Crevelt et al. | |
| 5,919,091 | A | | 7/1999 | Bell et al. | |
| 5,935,000 | A | | 8/1999 | Sanchez, III et al. | |
| 5,952,640 | A | | 9/1999 | Lucero | |
| 5,959,277 | A | | 9/1999 | Lucero | |
| 5,959,278 | A | | 9/1999 | Kobayashi et al. | |
| 5,971,271 | A | | 10/1999 | Wynn et al. | |
| 5,974,961 | A | | 11/1999 | Kazo et al. | |
| 5,988,642 | A | | 11/1999 | Ziemba et al. | |
| 5,993,316 | A | | 11/1999 | Coyle et al. | |
| 6,007,426 | A | | 12/1999 | Kelly et al. | |
| 6,012,832 | A | | 1/2000 | Saunders et al. | |
| 6,014,594 | A | | 1/2000 | Heidel et al. | |
| 6,015,344 | A | | 1/2000 | Kelly et al. | |
| 6,019,283 | A | | 2/2000 | Lucero | |
| 6,030,474 | A | | 2/2000 | Isono et al. | |
| 6,036,495 | A | | 3/2000 | Marcus et al. | |
| 6,039,648 | A | | 3/2000 | Guinn et al. | |
| 6,045,050 | A | | 4/2000 | Ippolito et al. | |
| 6,048,269 | A | | 4/2000 | Burns et al. | |
| 6,050,487 | A | * | 4/2000 | Bonifas et al. | 235/375 |
| 6,056,289 | A | | 5/2000 | Clapper, Jr. | |
| 6,056,642 | A | | 5/2000 | Bennett | |
| 6,064,413 | A | | 5/2000 | Fukui et al. | |
| 6,071,190 | A | * | 6/2000 | Weiss et al. | 463/25 |
| 6,089,982 | A | | 7/2000 | Holch et al. | |
| 6,104,311 | A | | 8/2000 | Lastinger | |
| 6,104,815 | A | | 8/2000 | Alcorn et al. | |
| 6,108,236 | A | | 8/2000 | Barnett | |
| 6,110,041 | A | | 8/2000 | Walker et al. | |
| 6,110,044 | A | | 8/2000 | Stern | |
| 6,113,098 | A | | 9/2000 | Adams | |
| 6,113,495 | A | | 9/2000 | Walker et al. | |
| 6,125,307 | A | | 9/2000 | Heidel et al. | |
| 6,128,550 | A | | 10/2000 | Heidel et al. | |
| 6,135,884 | A | | 10/2000 | Hedrick et al. | |
| 6,139,419 | A | | 10/2000 | Abe | |
| 6,142,876 | A | | 11/2000 | Cumbers | |
| 6,145,741 | A | | 11/2000 | Wisdom et al. | |
| 6,147,605 | A | | 11/2000 | Vega et al. | |
| 6,151,037 | A | | 11/2000 | Kaufman et al. | |
| 6,152,620 | A | | 11/2000 | Ozawa et al. | |
| 6,161,743 | A | | 12/2000 | Shoemaker, Jr. | |
| 6,190,256 | B1 | | 2/2001 | Walker et al. | |
| 6,227,972 | B1 | | 5/2001 | Walker et al. | |
| 6,230,973 | B1 | | 5/2001 | Fukui et al. | |
| 6,236,420 | B1 | | 5/2001 | Matsuzaka | |
| 6,244,958 | B1 | | 6/2001 | Acres | |
| 6,247,643 | B1 | | 6/2001 | Lucero | |
| 6,251,014 | B1 | | 6/2001 | Stockdale et al. | |
| 6,264,103 | B1 | | 7/2001 | Stanley | |
| 6,308,886 | B1 | | 10/2001 | Benson et al. | |
| 6,313,856 | B1 | | 11/2001 | Ulrich | |
| 6,318,536 | B1 | | 11/2001 | Korman et al. | |
| 6,319,125 | B1 | | 11/2001 | Acres | |
| 6,327,376 | B1 | | 12/2001 | Harkin | |
| 6,345,760 | B1 | | 2/2002 | Eason et al. | |
| 6,347,738 | B1 | | 2/2002 | Crevelt et al. | |
| 6,364,550 | B1 | | 4/2002 | Petteruti | |
| 6,371,852 | B1 | | 4/2002 | Acres | |
| 6,394,907 | B1 | | 5/2002 | Rowe | |
| 6,409,595 | B1 | | 6/2002 | Uihlein et al. | |
| 6,439,996 | B2 | | 8/2002 | LeMay et al. | |
| 6,443,642 | B1 | | 9/2002 | Luciano et al. | |
| 6,471,590 | B2 | | 10/2002 | Saunders | |
| 6,488,203 | B1 | | 12/2002 | Stoutenburg et al. | |
| 6,500,067 | B1 | | 12/2002 | Luciano et al. | |
| 6,503,147 | B1 | | 1/2003 | Stockdale et al. | |
| 6,511,377 | B1 | | 1/2003 | Weiss | |
| 6,543,685 | B1 | | 4/2003 | Lien et al. | |
| 6,547,131 | B1 | | 4/2003 | Foodman et al. | |
| 6,547,664 | B2 | | 4/2003 | Saunders | |
| 6,558,256 | B1 | | 5/2003 | Saunders | |
| 6,565,434 | B1 | | 5/2003 | Acres | |
| 6,575,090 | B1 | | 6/2003 | Vienneau et al. | |
| 6,598,794 | B1 | | 7/2003 | Ishii | |
| 6,601,771 | B2 | | 8/2003 | Charrin | |
| 6,623,357 | B2 | | 9/2003 | Chowdhury | |
| 6,629,591 | B1 | | 10/2003 | Griswold et al. | |
| RE38,295 | E | | 11/2003 | Kobayashi et al. | |
| 6,641,034 | B1 | * | 11/2003 | Oki et al. | 235/380 |
| 6,648,755 | B1 | | 11/2003 | Luciano et al. | |
| 6,675,152 | B1 | | 1/2004 | Prasad et al. | |
| 6,676,515 | B1 | | 1/2004 | Baltz et al. | |
| 6,676,522 | B2 | | 1/2004 | Rowe et al. | |
| 6,679,775 | B1 | | 1/2004 | Luciano et al. | |

| | | | | |
|---|---|---|---|---|
| 6,682,421 | B1 | 1/2004 | Rowe et al. | |
| 6,682,422 | B1 | 1/2004 | Walker et al. | |
| 6,694,884 | B2 | 2/2004 | Klinefelter et al. | |
| 6,698,654 | B1 | 3/2004 | Zuppicich | |
| 6,702,417 | B2 | 3/2004 | Silverbrook | |
| 6,729,719 | B2 | 5/2004 | Klinefelter et al. | |
| 6,729,958 | B2 | 5/2004 | Burns et al. | |
| 6,736,725 | B2 | 5/2004 | Burns et al. | |
| 6,743,098 | B2 | 6/2004 | Urie et al. | |
| 6,745,887 | B2 | 6/2004 | Heidel et al. | |
| 6,752,312 | B1 | 6/2004 | Chamberlaine et al. | |
| 6,758,616 | B2 | 7/2004 | Pribula et al. | |
| 6,814,282 | B2 | 11/2004 | Seifert et al. | |
| 6,834,794 | B2 | 12/2004 | Dabrowski | |
| 6,852,029 | B2 | 2/2005 | Van Baltz et al. | |
| 6,852,031 | B1 | 2/2005 | Rowe | |
| 6,890,260 | B2 | 5/2005 | Ollins | |
| 6,901,375 | B2 | 5/2005 | Fernandez | |
| 6,969,319 | B2 | 11/2005 | Rowe et al. | |
| 7,100,829 | B2 | 9/2006 | Okada | |
| 7,134,962 | B2 | 11/2006 | Meyerhofer et al. | |
| 7,147,152 | B2 | 12/2006 | Yoshioka et al. | |
| 7,192,208 | B2 | 3/2007 | Meyerhofer | |
| 7,198,571 | B2 | 4/2007 | LeMay et al. | |
| 7,277,601 | B2 | 10/2007 | Zorab et al. | |
| 7,329,186 | B2 | 2/2008 | Griswold et al. | |
| 7,458,895 | B2 | 12/2008 | Tastad et al. | |
| 7,494,057 | B2 | 2/2009 | Lasch et al. | |
| 2001/0014246 | A1 | 8/2001 | Luciano et al. | |
| 2002/0002075 | A1 | 1/2002 | Rowe | |
| 2002/0103027 | A1 | 8/2002 | Rowe et al. | |
| 2002/0111206 | A1 | 8/2002 | Van Baltz et al. | |
| 2002/0169021 | A1 | 11/2002 | Urie et al. | |
| 2003/0010827 | A1* | 1/2003 | Hilton et al. | 235/475 |
| 2003/0032474 | A1 | 2/2003 | Kaminkow | |
| 2003/0036425 | A1 | 2/2003 | Kaminkow et al. | |
| 2003/0038176 | A1 | 2/2003 | Dabrowski | |
| 2003/0064784 | A1 | 4/2003 | Wells et al. | |
| 2003/0172083 | A1 | 9/2003 | Goodwin et al. | |
| 2003/0186739 | A1* | 10/2003 | Paulsen et al. | 463/25 |
| 2003/0205896 | A1 | 11/2003 | Geiger et al. | |
| 2003/0211885 | A1* | 11/2003 | Fujimoto | 463/29 |
| 2004/0022444 | A1 | 2/2004 | Rhoads | |
| 2004/0033095 | A1 | 2/2004 | Saffari et al. | |
| 2004/0039702 | A1 | 2/2004 | Blair et al. | |
| 2004/0043813 | A1 | 3/2004 | Chamberlain et al. | |
| 2004/0043814 | A1* | 3/2004 | Angell et al. | 463/25 |
| 2004/0053692 | A1 | 3/2004 | Chatigny et al. | |
| 2004/0087360 | A1 | 5/2004 | Chamberlain et al. | |
| 2004/0110557 | A1 | 6/2004 | Rowe | |
| 2004/0136764 | A1 | 7/2004 | Meyerhofer et al. | |
| 2004/0147309 | A1 | 7/2004 | Chamberlain et al. | |
| 2004/0204233 | A1 | 10/2004 | Saffari et al. | |
| 2005/0017067 | A1 | 1/2005 | Seifert et al. | |
| 2005/0020348 | A1* | 1/2005 | Thomas et al. | 463/20 |
| 2005/0057633 | A1 | 3/2005 | Meyerhofer | |
| 2005/0058482 | A1 | 3/2005 | Meyerhofer | |
| 2005/0059482 | A1 | 3/2005 | Hedrick et al. | |
| 2005/0077995 | A1 | 4/2005 | Paulsen et al. | |
| 2005/0124407 | A1 | 6/2005 | Rowe | |
| 2005/0153768 | A1 | 7/2005 | Paulsen | |
| 2006/0019745 | A1 | 1/2006 | Benbrahim | |
| 2006/0040741 | A1 | 2/2006 | Griswold et al. | |
| 2006/0067890 | A1 | 3/2006 | Fujiwara et al. | |
| 2006/0092193 | A1 | 5/2006 | Block et al. | |
| 2006/0104697 | A1 | 5/2006 | Meyerhofer | |
| 2006/0183541 | A1 | 8/2006 | Okada et al. | |
| 2007/0094721 | A1 | 4/2007 | Nguyen et al. | |
| 2007/0134042 | A1 | 6/2007 | Meyerhofer | |
| 2007/0167229 | A1 | 7/2007 | LeMay et al. | |
| 2008/0051193 | A1 | 2/2008 | Kaminkow et al. | |

FOREIGN PATENT DOCUMENTS

| | | |
|---|---|---|
| EP | 729848 | 9/1996 |
| EP | 0 805 424 | 11/1997 |
| EP | 0827101 | 3/1998 |
| EP | 0854461 | 7/1998 |
| EP | 0729848 | 5/1999 |
| EP | 805424 | 4/2000 |
| GB | 2221870 | 2/1990 |
| JP | 62-089167 | 4/1987 |
| JP | 5-169762 | 7/1993 |
| JP | 10-255118 | 9/1998 |
| JP | 2002-86970 | 3/2002 |
| WO | WO 9109369 | 6/1991 |
| WO | 9606411 | 2/1996 |
| WO | WO 97/02872 | 1/1997 |
| WO | WO 98/57295 | 12/1998 |
| WO | 02/22223 | 3/2002 |
| WO | WO 03/058878 | 7/2003 |
| WO | WO 2004/013820 | 2/2004 |
| WO | WO 2005/021275 | 3/2005 |
| WO | WO 2005/029229 | 3/2005 |
| WO | WO2005/029238 | 3/2005 |
| WO | WO 2005102705 | 11/2005 |

OTHER PUBLICATIONS

"Toshiba Debuts First Full-Color 'System on Glass' (SOG) Input Display with Image Capture Technology," Internet Publication, Jun. 28, 2004, ZP002350712 (1 page total).

"Messages on Cards" in Smart Card News Ltd., vol. 8, No. 7. (Jul. 1999), p. 131. (20 pages total).

13$^{th}$ Annual therm Printing Conference, Thermal Rewritable Technology Update and Innovations, Apr. 30, 2002, Information Management Institute, Advanced Future Image Technology, Atlantek Leadership in Electronic Imaging [retrieved on Mar. 6, 2008]. Retrieved from the Internet:<URL: afitprinter.jp/pdf/imi_2002.pdf> (63 pages total).

13$^{th}$ Annual Thermal Printing conference Apr. 29-May 1, 2002, Information Management Institute [online], Apr. 29, 2002 [retrieved on Mar. 26, 2008]. Retrieved from the Internet: URL:imi.maine.com/completed/thermal02.html., (12 pages total).

Cashless Gaming Excerpt, Loose Change Magazine, written by Daniel R. Mead, published in Oct. 1993, p. 20.

International Search Report in Corresponding PCT Application PCT/US2005/026677, Mailed Jan. 6, 2006 (8 pages total).

Written Opinion in Corresponding PCT Application PCT/US2005/026677, Mailed Jan. 6, 2006 (4 pages total).

"Announcing IGS EZ Ticket™", Gaming System News, pp. 14-15, prior to Dec. 2000.

"EZ Pay™ Hits the Strip!", Gaming System News, pp. 14-15, prior to Dec. 2000.

"Introducing EZ Pay Lite™", Gaming System News, pp. 14-15, prior to Dec. 2000.

"Anchor Gaming Licenses Cashless Gaming Patents to Konami," written by Anchor Gaming, printed from http://biz.yahoo.com/prnews/001222/nv_anchor_.html on Feb. 7, 2001, 2 pgs.

"Announcing IGS EZ Ticket™", written by Gaming System News, pp. 14-15, prior to Dec. 2000, 1 pg.

"Atomically Engineered Materials & Innovative Technologies for a Cleaner & Better World", written by Energy Conversion Devices, Inc., printed from http://www.ovonic.com/ on Mar. 1, 2001, 3 pgs.

"Card Manufacturing",written by Oberthur Card Systems, printed from http://www.oberthurusa.com/pns-mfg-generics.asp on Mar. 1, 2001, 3 pgs.

"Card Product Range", written by Schlumberger Smart Cards & Terminals Products & Services, printed from http://www.1.slb.com/smartcards/products/cardtech.html on Mar. 1, 2001, 2 pgs.

"Cash to Chip", written by CypberMark, printed from http://www.cybermark.com/products_ctc.html on Mar. 1, 2001, 4 pgs.

"Cashless Gaming—Reduce operational costs", written by GRIPS Electronic GmbH, printed from http://www.grips.com/products_cashless.htm on Feb. 7, 2001, 2 pgs.

"Cashless Gaming: The Inside Story of the Future", written by Oneida Indian Nation, printed from http://standingstonegaming.com/page04.html on Feb. 7, 2001, 1 pg.

"Coinless Video Poker," written by Skip Hughes and John Kelly, available prior to Oct. 1, 2001, 2 pgs.

"eBet Enters Eurpoe—Further Expanding International Cashless Gaming Sales", written by eBet Limited, printed from http://www.ebetonline.com/articles/press/asx2000_12_20.html on Feb. 7, 2001, 2 pgs.

"EZ Pay™ Hits the Strip!", written by Gaming System News, p. 15, prior to Dec. 2000, 1 pg.
"Information Media and Electronics Materials", written by Mitsubishi Plastics, Inc., printed from http://www.mpi.co.jp/english/products/category_1.htm on Jun. 22, 2005, 4 pgs.
"Introducing EZ Pay Lite™", written by Gaming System News, p. 15, prior to Dec. 2000, 1 pg.
Office Action issued by the United States Patent and Trademark Office for corresponding U.S. Appl. No. 10/654,521 on May 4, 2005, 15 pgs.
Office Action issued by the United States Patent and,Tradernark Office for corresponding U.S. Appl. No. 10/661,229 on Sep. 30, 2005, 11 pgs.
Office Action issued by the United States Patent and Trademark Office for corresponding U.S. Appl. No. 10/661,229 on Apr. 26, 2007, 5 pgs.
Office Action issued by the United States Patent and Trademark Office for corresponding U.S. Appl. No. 10/661,229 on Apr. 28, 2007, 15 pgs.
Office Action issued by the United States Patent and Trademark Office for corresponding U.S. Appl. No. 10/229,772 on Jun. 29, 2007, 13 pgs.
Office Action issued by the United States Patent and Trademark Office for corresponding U.S. Appl. No. 10/229,772 on Oct. 6, 2006, 13 pgs.
Office Action issued by the United States Patent and Trademark Office for corresponding U.S. Appl. No. 10/229,772 on May 2, 2006, 11 pgs.
Office Action issued by the United States Patent and Trademark Office for corresponding U.S. Appl. No. 10/229,772 on Nov. 4, 2004, 10 pgs.
Office Action issued by the United States Patent and Trademark Office for corresponding U.S. Appl. No. 10/662,618 on Mar. 28, 2007, 8 pgs.
Office Action issued by the United States Patent and Trademark Office for corresponding U.S. Appl. No. 10/662,618 on Oct. 4, 2005, 15 pgs.
Office Action issued by the United States Patent and Trademark Office for corresponding U.S. Appl. No. 10/662,495 on Jun. 29, 2007, 12 pgs.
Office Action issued by the United States Patent and Trademark Office for corresponding U.S. Appl. No. 10/662,495 on Oct. 10, 2006, 10 pgs.
Office Action issued by the United States Patent and Trademark Office for corresponding U.S. Appl. No. 10/662,495 on Jun. 30, 2006, 9 pgs.
Office Action issued by the United States Patent and Trademark Office for corresponding U.S. Appl. No. 10/662,495 on Feb. 8, 2005, 7 pgs.
"Overview of Standing Stone Gaming", written by Oneida Indian Nation, printed from http://standingstonegaming.com/ page05.html on Feb. 7, 2001, 3 pgs.
"Plastic Cards", written by Digicard, printed from http://www.digicard.at/eng/kunz/pcards.html on Mar. 1, 2001, 2 pgs.
"Smart Card Basics", written by Bull SC&T, printed from http://www.cp8.bull.net/sct/uk/world/basics/page/c_home.html on Mar. 1, 2001, 1 pg.
"Smart Cards for Mass Transit", written by Schlumberger, printed from http://www.1.slb.com/smartcards/products/transit/easycards/html on Mar. 1, 2001, 1 pg.
"Smart Cards", written by Oberthur Card Systems, printed from http://www.oberthurusa.com/pns-sc-serv-modmfg.asp on Mar. 1, 2001, 7 pgs.
"What is Smart Card?", written by 3B System, printed from http://www.3bsystem.co.kr/smartcard/what/html on Mar. 1, 2001, 1 pg.
"What is a Re-writable Card?", written by Ricoh Electronics, Inc., printed from http://www.rei.ricoh.com/tc_main.html on Sep. 10, 2004, 2 pgs.
"World Gambling Emphasises Global Aspects with Slots! Slots! Slots!," [online] [available prior to Oct. 1, 2001]. Retrieved from the Internet at <URL:http://www.nochargelotto.com/5827.html>, 4 pgs.
World Gaming News (website) written by WGNews@worldgaminglive.com, printed Oct. 17, 2001, 4 pgs.
13th Annual Thermal Printing conference Apr. 29-May 1, 2002, Information Management Institute [online], Apr. 29, 2002 [retrieved on Apr. 14, 2009]. Retrieved from the Internet: URL:imi.maine.com/completed/thermal02.html (8 pages).
Decision to Refuse a European Patent Application for EP Application No. 04 783 785, mailed Dec. 8, 2010 (11 pages).
Examiner's First Report for Australian Application No. 2006202695, mailed Aug. 31, 2010 (5 pages).
Examiner's First Report for Australian Innovation Patent No. 2010100433, mailed Jun. 9, 2010 (2 pages).
Examiner's Second Report for Australian Application No. 2006202695, mailed Feb. 28, 2011 (3 pages).
International Search Report for PCT Application No. PCT/US04/28590, mailed Sep. 29, 2005 (5 pages).
International Search Report for PCT Application No. PCT/US04/29702, mailed Oct. 26, 2005 (3 pages).
Minutes of Oral Proceedings for EP Application No. 04 783 785, mailed Dec. 8, 2010 (5 pages).
Office Action for EP Application No. 04 783 785, mailed Dec. 22, 2009 (4 pages).
Office Action for EP Application No. 04 783 785, mailed Jun. 23, 2009 (3 pages).
Summons to Attend Oral Proceedings for EP Application No. 04 783 785, mailed Apr. 22, 2010 (6 pages).
Supplementary European Search Report for EP Application No. 04 78 3785, mailed Mar. 24, 2009 (3 pages).
Written Opinion of the International Searching Authority for PCT Application No. PCT/US04/28590, mailed Sep. 29, 2005 (5 pages).
Written Opinion of the International Searching Authority for PCT Application No. PCT/US04/29702, mailed Oct. 26, 2005 (3 pages).
Office Action for Canadian Application No. 2,668,313, mailed Feb. 11, 2011 (2 pages).

* cited by examiner

GAMING DEVICE INCLUDING A CARD PROCESSING ASSEMBLY HAVING VERTICALLY-STACKED CARD HOLDERS OPERABLE WITH THERMALLY-PRINTABLE DATA CARDS AND PORTABLE CARD CHANGEOVER MACHINES

PRIORITY CLAIM

This application is a continuation-in-part of and claims priority to and the benefit of U.S. patent application Ser. No. 10/661,229, filed on Sep. 12, 2003 now U.S. Pat. No. 7,494, 414, entitled "Gaming Device Having A Card Management System for the Management of Circulating Data Cards," the entire disclosure of which is hereby incorporated.

CROSS REFERENCES TO RELATED APPLICATIONS

This application is related to the following commonly-owned co-pending-patent applications: "GAMING DEVICE HAVING AN ELECTRONIC FUNDS TRANSFER SYSTEM," Ser. No. 10/229,772; "GAMING DEVICE HAVING AN ELECTRONIC FUNDS TRANSFER SYSTEM," Ser. No. 10/662,618; "ELECTRONIC FUND TRANSFER KIOSK FOR USE WITH WAGERING GAMING MACHINE," Ser. No. 10/662,495; "THERMAL PRINTER WITH DUAL HEAD-AUDIT TRAIL," U.S. patent application Ser. No. 09/795,337; "GAMING SYSTEM WITH REWRITABLE DISPLAY CARD AND LCD INPUT DISPLAY FOR READING SAME," U.S. patent application Ser. No. 10/923,568; and "REWRITABLE CARD PRINTER," Ser. No. 11/678,837.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a card management system for managing circulating data cards.

BACKGROUND OF THE INVENTION

Contemporary gaming machines, such as slot machines, poker machines, blackjack machines and keno machines, generally are adapted to accept paper currency (such as dollar bills) and tokens or coins (such as quarters and half dollars) from a player. For instance, a player may purchase dollar tokens from a cashier and insert the tokens into the gaming device to play a game. If a player earns a payout, the gaming device provides additional credits for the player or dispenses the appropriate number of tokens to the player. The player may cash in the tokens at the cashier for currency.

The use of coins and tokens has several disadvantages. Because each token represents a relatively small amount of currency, a player typically handles a plurality of tokens. It is typical for a gaming device to dispense a handful of tokens to a player for a typical win. The supply and handling of tokens in a gaming facility requires substantial labor, storage space and security procedures. Also, containers are typically provided to players for carrying tokens from place to place. Dirt and germs tend to accumulate on the containers and the tokens as they circulate from player to player. The high number of tokens and containers thus contribute to colds and other health conditions. With the advance of electronics, several techniques have been developed as an alternative for tokens, coins and paper currency in gaming machines. Several U.S. patents disclose cashless or tokenless systems.

For instance, U.S. Pat. Nos. 5,265,874 and 6,089,982 disclose data cards which are player-specific, meaning they can only be used by a single, specified player. For example, player ID cards store player-specific data such as a player's name and account number. U.S. Pat. No. 5,265,874 discloses a cashless gaming apparatus and method suitable for casinos wherein a player gives money and an ID card to a clerk at a validation terminal. The clerk stores the ID number and the amount of money in the memory of the validation terminal. The clerk returns the ID card to the player for operating any one of a number of game terminals. When the player inserts the ID card into a game terminal which reads the player's ID card, the cash amount from the validation terminal is downloaded to the game terminal and the game terminal can be played. If the player wishes to play a second game terminal, the player actuates a cash-out switch on the first game terminal and receives the ID card. The player moves to the second game terminal and inserts the ID card into the second game terminal. The money remaining as a cash amount on the ID card is downloaded to the second game terminal. The player can then play the second game terminal. When the player wishes to stop playing the game terminals completely, the player actuates the cash-out switch of the last game terminal played and receives the ID card. The player presents his ID card to the clerk at the validation terminal and the validation terminal reads the ID card. A ticket showing the card number and the cash amount is printed and the player is paid the cash amount on the spot. The printed ticket is used for reconciliation.

U.S. Pat. No. 6,089,982 discloses a cordless video game system which includes a plurality of electronic video game terminals, a game server corresponding to each player terminal and a central control network for administering and controlling games and playing accounts. A player initially establishes a player account in the central control network and receives a player ID card bearing the player's account number and other relevant information. Players use these ID cards to establish sessions at a player terminal. The server provides a random number to each player terminal at predefined intervals to determine wins and losses for each game selected by a player. Wagered amounts are then debited or credited to a player's account in the central control network. Players may redeem any account balance from a cashier associated with the central control network.

U.S. Pat. Nos. 5,038,022; 5,902,983; 5,952,640; 5,959,277 and 6,019,283 disclose the use of financial cards (such as bank debit cards and credit cards). U.S. Pat. No. 5,038,022 discloses an apparatus for enabling a gaming machine to provide credit to a player operating the machine without the player leaving the machine. The gaming machine has a card reader associated with it for reading a debit card or credit card and transmitting player related financial data to a remote location for approval. A first code identifies the particular gaming machine and a second code identifies the establishment in which the gaming machine is located. A visual display on the gaming machine indicates the amount of credit approved and usable by the player and enables the player to operate the gaming machine to use the credit.

U.S. Pat. No. 5,902,983 discloses a gaming machine which includes the apparatus necessary to send requests to and receive authorizations from an electronic funds transfer (EFT) system. All such requests for credit are limited to a preset amount, so that when a player uses an EFT transfer to obtain playing credit, the credit will be limited to a specified amount. In practice, the player inserts his or her ATM card (debit card), keys in a personal identification number (PIN), requests playing credits and receives the preset amount of credit which can be converted to play on the gaming machine.

U.S. Pat. Nos. 5,952,640; 5,959,277 and 6,019,283, which are related patents, disclose a gaming machine system wherein a player feeds a general purpose charge card such as a VISA, MasterCard or American Express card to a reader at a gaming machine or enters on a keyboard or other input device information relating to the general purpose charge card, keys in a desired amount of playing credit and optionally a personal identification number (PIN) for automatic transmission to a remote financial institution (VISA or other charge card facility) either directly or through an intermediate transaction processing facility. Also transmitted are an identification of the gaming machine and the gaming operator. Upon approval of the requested playing credit, the gaming machine is enabled and thereafter a running net (balance) is kept for the player and/or each machine and/or the gaming operator by accounting for win-lose-draws. After the playing session is over, net playing credit information is automatically transmitted to the financial institution either directly or through an intermediate transaction processing facility so that the entire playing session can be a single line item on the player's regular statement from that financial institution.

U.S. Pat. Nos. 4,880,237; 5,371,345; 6,012,832; 6,048,269 and 6,113,098 disclose systems and devices other than a gaming device data card, such as a player keypad used to initiate a game, change-making cards for gaming facilities and tickets and slips used in gaming devices.

U.S. Pat. No. 4,880,237 discloses a slot machine requiring no game media at all and comprising a game data processing unit which is provided with an input unit for specific data, a storage unit, an arithmetic processing unit, a printer, a display and a slot machine body which is provided with a pattern display mechanism, a starting lever, stopping buttons, a win decision unit and a display for the input data and the results of arithmetic processing.

U.S. Pat. No. 5,371,345 discloses a gaming machine change system wherein providing change to gaming machine players is facilitated by the use of a change card having a memory storing a cash value which a change person can use to input a credit into a gaming machine in exchange for cash from a player. A game monitor unit having a card reader, a keypad and a display is attached to the gaming machine and can be used to authorize and transfer a selected cash value to the credit meter of the gaming machine from the change card. Cash values along with authorizations and security codes are input to the change card at a change station utilizing a similar monitor unit.

U.S. Pat. No. 6,012,832 discloses a cashless peripheral device connecting to a gaming system. The gaming system issues a "cash-out" signal when a player quits playing and receives a "cash-in" when a player desires to play a game. A stack of continuous unprinted tickets is stored in the interior of the device. A ticket printer prints a coded value, such as a bar code, on a ticket in response to a cash-out signal from the gaming system. A ticket reader reads the amount printed on the ticket. If the printed value corresponds to the value which should have been printed, a ticket-out transport delivers the printed ticket to the player cashing out from the gaming system. When a player inserts the ticket into the device, a ticket-in transport senses the insertion and the ticket reader reads the coded value from the inserted printed ticket. The ticket reader issues a cash-in signal to the gaming system corresponding to the value read from the coded value on the inserted printed ticket. After reading, the ticket is delivered into a ticket bin, which is secured by means of a lock internally in the housing. The tickets are not reused and the ticket bins are opened periodically for emptying and ticket verification.

U.S. Pat. No. 6,048,269 discloses a gaming apparatus such as a slot machine capable of accepting either paper currency, preprinted coupons or cash-out slips. The slot machine also includes a printer that prints and dispenses cash-out slips which include a bar code representing a unique identification that provides the amount of "winnings." The cash-out slips can be scanned into a separate currency dispenser at a cashier's station for receiving currency, either from the dispenser or from an attendant. A central processing unit generates the unique codes for regulating the game to be played, the wager limits of the game and the validity of the free play coupons on the cash-out tickets.

U.S. Pat. No. 6,113,098 discloses gaming devices which dispense tickets which are supplemental to the gaming award. The gaming devices provide gaming awards, typically in a form selected from the group consisting of coins, currency, credits or redeemable tickets in response to a randomly determined event, and also provide supplemental tickets.

U.S. Pat. Nos. 4,764,666; 4,882,473 and 5,276,312 disclose the use of data cards with remote terminals in an on-line wagering system. U.S. Pat. Nos. 4,764,666 and 4,882,473, which are related patents, disclose an on-line wagering system with programmable game entry cards including cards having on-card data storage or value tokens and data uniquely related to the player. The player cards are operable as payment means in which the tokens are spent and as play validation and play entry means in lieu of mark sense slips and printed validation receipts. Demographic player data uniquely related to the owner of the card is stored on the card and possibly in the central wagering system memory.

U.S. Pat. No. 5,276,312 discloses a wagering system for random drawing lotteries which includes a central data processor managing acceptance of player entries and payout authorization. Remote agent terminals receive player entry data from players and process authorized payouts. Portable agent data modules having an on-board memory and security provisions are issued to the agents and carry data in both directions between the central data processor and the terminals. Preferably, the agent modules included in the wagering system are integrated circuit cards or "smart cards."

U.S. Pat. No. 5,575,374 discloses gaming machines having electronic payment mechanisms. The conventional payment mechanism is replaced by a payment mechanism operated by tokens that are secured by contact-free detection. The machine is furthermore provided with a second payment mechanism operated by a chip card. Switching makes it possible to change over from the token operated payment mechanism to the chip card operated payment mechanism when a card is inserted into the corresponding payment mechanism.

This patent does not disclose a gaming device adapted to store or hold a plurality of data cards for future use, nor does this patent disclose data cards adapted for circulation throughout gaming devices and gaming device players.

Though the aforementioned systems and devices may provide an electronic alternative to tokens, they fail to disclose a gaming device which receive, store and dispense data cards to facilitate the recirculation of such cards similar to the circulation of tokens or coins. The player-specific cards require a player to open an account and permanently keep a card. The replacement costs for these types of cards can be relatively high because players tend to lose or dispose cards after the balance becomes zero, and also players do not always carry the cards with them. If they want to spontaneously play a gaming device, they must obtain a replacement card. In addition, many players do not wish to open an account and disclose their personal information. The other systems discussed above, such as the ticket systems, require a continuous replenishing of the materials needed to produce the tickets and also require substantial maintenance of such systems. The player-specific cards described above also do not allow all players to play anonymously.

SUMMARY OF THE INVENTION

The present invention overcomes the above shortcomings by providing a gaming device having a card management system which enables the gaming device to receive, read, update, reset, store and dispense a plurality of circulating data cards.

The data card of the present invention has the capacity to be repeatedly reset. Although the data card is preferably in the shape of a wallet-sized card, the data card can include any suitable card, key, tag, item, object, physical instrument or other article which is capable of storing memory, data or information. The term "reset" and any suffix thereof, as used herein, includes the process of changing or otherwise bringing to a blank state or a particular charged state (from another state). The term "state," as used herein, includes the condition corresponding to the storage of particular data, such as cash data, fund data or credit unit data. The credit data, credit unit data or fund data can include data which identifies locations in a memory device which stores different amounts of credit units, cash or money. Accordingly, a data card which stores no data or credit unit data, is at times described herein as having a blank state or being a blank data card. A data card can also store certain no-fund data when the player has no balance of funds or cash. Here, the data card can be described as having a blank state. Also, a data card which stores certain data or credit unit data is at times described herein as having a charged state or being a charged or re-charged data card. When a data card is changed from one state to another state, the data on the data card is at times described herein in terms of having been updated, written, rewritten, erased, reset, stored, reduced, increased or adjusted. The term "credit unit," as used herein includes data used to measure or track gaming credits, such as the number "1" associated with a single credit.

In one embodiment, the fund data stored on the data card includes fund tracking data. The fund tracking data on the data card includes a particular address, number, number combination or other code. The pay validation system or pay system described below includes a database of different levels of funds or cash associated with a plurality of different codes. As described below, the pay system reads the particular fund code stored on the data card, determines the cash amount corresponding to such fund code and provides this cash amount to the player.

In one embodiment, the data card includes a graphics recording medium or strip on the front side. The data card includes a magnetic memory strip on the back side. The gaming device's thermal writer records erasable graphics, such as text, on the graphics recording strip. When certain events occur, the gaming device's thermal eraser erases the graphics on the graphics recording strop.

In addition, the gaming device's magnetic reader-writer reads the data on the magnetic memory strip. The magnetic reader-writer also stores certain data on the magnetic memory strip when certain events occur.

In one embodiment, the gaming device includes a card management system having: one or more card read-write devices for receiving, reading, updating and dispensing data cards; a card transporter for moving or conveying data cards within the gaming device; and one or more card holders for holding or storing data cards. The gaming device processor controls the operation of these components. It should be appreciated that this gaming device processor can be a processor dedicated to data card management, or it can be the processor which generally operates the gaming device.

The card read-write device enables the gaming device processor to electronically communicate with the data card for reading, updating or resetting credit unit data on a data card. In one embodiment, a data exchange card read-write device includes an interface which makes direct contact with the data card, and through conduction or magnetism, enables communication. However, the interface can also enable the processor and the data card to communicate without such physical contact. It should be appreciated that the gaming device of the present invention can include data exchange card read-write devices which enable processors to read and write data, or the gaming device can include card read devices and card write devices which separately enable processors to read and write data.

In another embodiment, the gaming device includes a graphics write-erase device in addition to the data exchange read-write device. The graphics write-erase device thermally records erasable graphics on the data card. When certain events occur, the graphics write-erase device thermally erases graphics on the data card. The graphics recorded on the card is player readable or visible.

The card transporter moves the data cards to and from the card read-write device and to and from the card holder. In one embodiment, the card transporter includes a path for conveying data cards to the card holder and a path for conveying data cards to the card read-write device.

The card holder enables the card transporter to store and retrieve data cards. In one embodiment, the gaming device of the present invention includes a plurality of card holders designated for a plurality of different types of data cards. In one embodiment, the card holder includes a feeder for retrieving cards from the holder and feeding them to the transport. In another embodiment, the card holder includes an opening and closing chute which drops cards into a card tray. It should be appreciated that other card holder embodiments can include rollers which hold and release data cards or other mechanisms suitable for holding or storing data cards and enabling the gaming device to dispense the data cards upon the occurrence of certain events.

In one embodiment, when the gaming device receives a data card, the gaming device processor, using the card read-write device, reads the data card to determine how much cash is associated with the card. Then the gaming device processor stores certain credit unit data on the memory of the gaming device. This credit unit data is associated with the cash amount of the card. The processor then, using the card read-write device, resets the data card, bringing it to a predetermined state (such as a blank state or face value state). Then the gaming device processor causes the transporter to move this (now) reset data card to the card holder where a plurality of other data cards are stored.

The gaming device memory, in one embodiment, includes a computer program which instructs the gaming device processor how to operate the gaming device with the use of circulating data cards. In one embodiment, this computer program generally instructs the gaming device to accept currency or charged data cards, enable players to play games and either dispense charged data cards to players or reset and retain data cards, depending upon which events occur during the game.

The processor uses the gaming device memory to keep track of the player's credit balance and cash balance as the player plays the game. In one embodiment, if the player uses or exhausts all of the credit units, the game terminates and the gaming device does not dispense a data card to the player. However, if the player who inserted the data card cashes out or terminates the game before having lost all credits, the gaming device moves the data card from the card holder to the card read-write device. There the processor stores credit unit data on that data card which corresponds to the amount of remaining credits which, in turn, corresponds to an amount of cash. The gaming device then dispenses the data card to the player. In another embodiment, the gaming device receives a data card with a certain amount of credit units and dispenses this same data card back to the player if credits remain when the player cashes out. It should be appreciated that the gaming device of the present invention can include alternate, suitable techniques for reusing, resetting, updating and manipulating data cards within the gaming device.

The gaming device processor or a currency station can reset the data cards repeatedly so that a single population of circulating data cards can serve different players at different times. The data card of the present invention is universal, meaning that it can be used by different players at different times.

Though in one embodiment the gaming device of the present invention can receive currency (as described below), the gaming device need not receive currency. In such a non-currency embodiment, players are required to obtain data cards or tokens from currency stations in order to play the gaming device. A currency station can include: (a) a machine or device which automatically exchanges currency and data cards; or (b) one or more currency station operators or cashiers who exchange currency and data cards. In one embodiment, after players have finished playing, all reset data cards will remain in the gaming devices and players will take charged data cards to a currency station for redemption. Preferably, periodically a gaming enterprise employee redistributes reset data cards which have accumulated in gaming devices and currency stations in order to maintain a relatively even distribution of reset data cards in the desired places. This embodiment may be most useful to gaming enterprises which have a policy against storing currency or cash on the "floor."

It should be appreciated that although the gaming device processor is at times described herein as that which changes data on the data card, a data card processor alone (described below) or communication between the gaming device processor and a data card processor can change data on the data card as well.

In one embodiment, the data card includes an integrated circuit or chip, as described below. The integrated circuit includes a data card processor and one or more memory devices or members. These types of data cards are commercially available from a variety of data card manufacturing companies and can be programmed for different purposes. Preferably, the data card in this embodiment includes retain code stored in its memory. When the data card has reached a predetermined state (such as a blank state or a particular face value) or when a player reaches a certain credit balance (such as zero), the retain code instructs the gaming device processor to cause the gaming device to keep or retain the data card provided by the player.

In alternative embodiments, the data card of the present invention does not include an integrated circuit or chip. Instead, the data card includes any suitable device, code or member (such as a magnetic or optical bar or strip) which enables the gaming device processor to use the read-write device to read, change and reset the data stored on the data card.

In operation of one example, a player provides currency or cash to a currency station and in exchange receives a data card A with a cash identifier or cash data corresponding to the amount of currency the player deposited. The player uses that data card A to play a gaming device. If the player cashes out or voluntarily terminates the game with credits remaining, the gaming device dispenses that data card to the player with fund data or cash data corresponding to the amount of remaining cash. If, on the other hand, the player loses all credits while playing the game, the gaming device retains data card A, resets it and stores it for future use. This reset data card A can be used again by the same player or other players in a variety of scenarios.

In one embodiment, another player can play the same gaming device by inserting currency or a data card B into the gaming device. If this player cashes out with credits remaining, the gaming device processor can then reset and retain data card B and also rewrite and dispense data card A to the player upon the occurrence of certain events. In another embodiment, a gaming enterprise employee can move the reset data card A (along with other accumulated reset data cards) to a currency station for future charging.

In one embodiment, the gaming device of the present invention includes a card management assembly having: (a) a card processing bay or station; (b) a used card holder; and (c) a new card holder. The card processing station includes a plurality of devices for magnetically reading and writing to the data card, thermally printing or recording erasable player-specific graphics on the data card and thermally erasing the erasable player-specific graphics on the data card. Upon certain events, the gaming device retains the data cards provided by players, erases them and stores them in the used card holder for future use. Upon certain events, the gaming device retrieves cards from the used card holder for use by players. If the used card holder is empty, the gaming device retrieves new cards from the new card holder for use by players.

The gaming device of the present invention can receive, update, reset, erase, house and dispense circulating data cards which can be reset repeatedly. In one embodiment, gaming device processors or currency station processors, using read-write devices, repeatedly reset the data cards after players have used them. This type of gaming device provides players and gaming enterprises with an increased level of convenience and efficiency in playing gaming devices and managing gaming facilities, respectively.

It is therefore an advantage of the present invention to provide a gaming device having a card management system for the management of circulating data cards.

Another advantage of the present invention to enable players to play gaming devices with data cards which can circulate throughout a plurality of gaming devices, can be used by a plurality of different players and can display erasable player-specific information.

Yet another advantage of the present invention is to provide increased convenience for operating gaming devices.

Still another advantage of the present invention is to provide increased convenience for managing gaming facilities.

Another advantage of the present invention is to provide a data card alternative to the token which circulates and which alone has the capacity to represent a plurality of credits or an amount of cash corresponding to credits.

Yet another advantage of the present invention is to reduce the number of items circulating through gaming devices and players.

Still another advantage of the present invention is to enable gaming device players to receive data cards from gaming devices upon the occurrence of certain events.

Another advantage of the present invention is to provide a gaming device which enables different players to play games at different times by inserting the same data card.

Yet another advantage of the present invention is to provide a data card usable with a gaming device which can be reset and reused repeatedly by different players on different occasions.

Still another advantage of the present invention is to provide a data card usable with a gaming device which signals the gaming device to retain the data card when the data card reaches a predetermined state.

Another advantage of the present invention is to decrease the amount of storage space required in gaming facilities and gaming devices to accommodate tokens.

Yet another advantage of the present invention is to reduce gaming device card and ticket waste.

Still another advantage of the present invention is to reduce gaming device card replacement costs.

Another advantage of the present invention is to reduce the amount of labor associated with the circulation of tokens and coins in gaming facilities.

Yet another advantage of the present invention is to assist players in keeping track of the monetary or purse value of their gaming device cards or data cards.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

I. General Card Management System

A. Card Management Assembly

Figure 1:
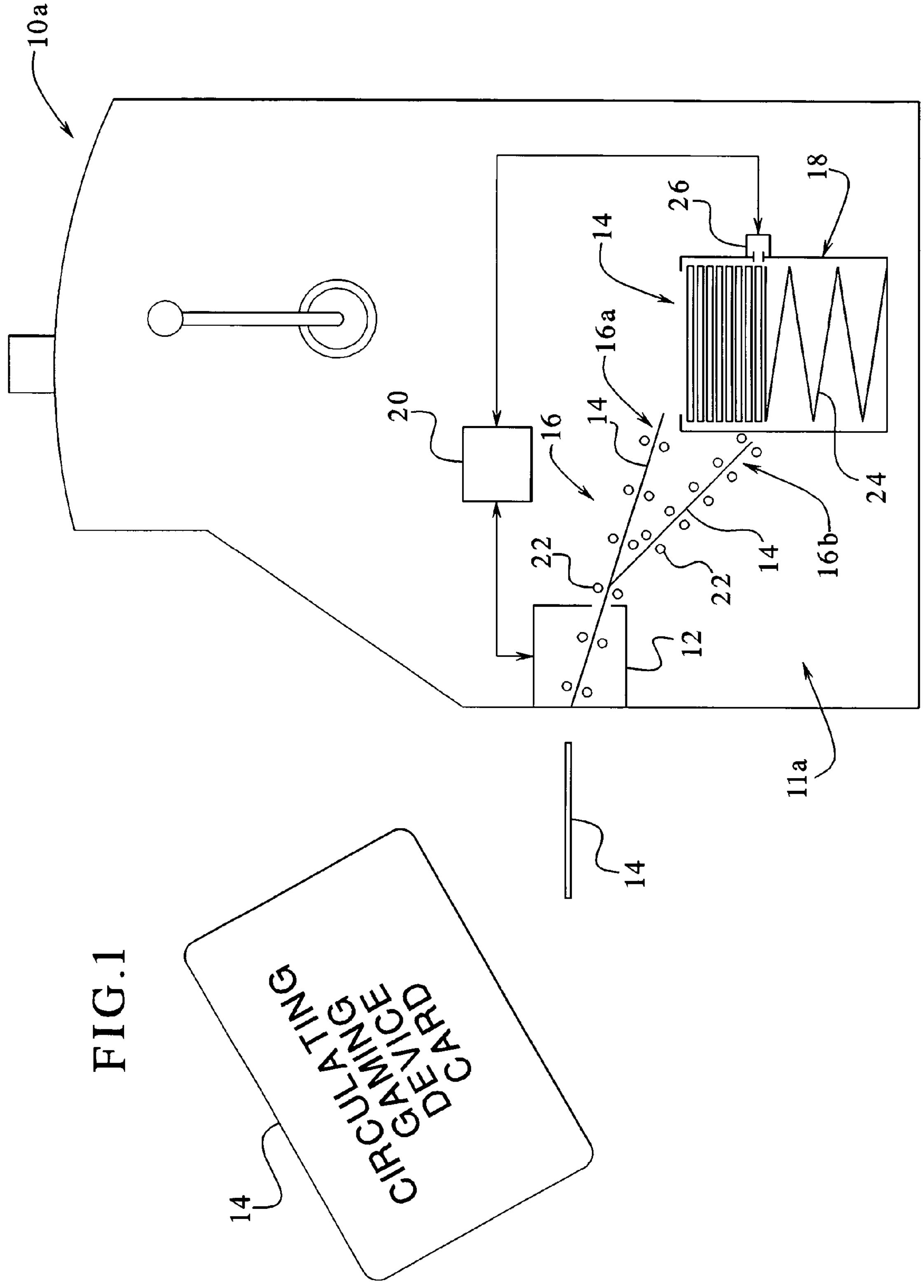
FIG. 1 is a schematic diagram of a gaming device having a card management assembly for managing data cards in one embodiment of the present invention.

Referring now to FIG. 1, in one embodiment of the present invention a gaming device 10*a* includes a card management system having a card management assembly 11*a*; one or more data exchange card read-write devices 12 for receiving, updating, reading and dispensing data cards 14; a card transporter 16 for moving or conveying data cards 14 within the gaming device; one or more card holders 18 for holding or storing data cards 14; and a processor 20 which controls the operation of the card read-write device 12, the card transporter 16 and the card holder 18.

There are a plurality of different embodiments of the data cards described herein. In one embodiment, the data cards have a substantially rectangular shape of a personal identification card, are relatively rigid and are constructed of a suitable plastic material. In another embodiment, the data cards are tickets. These data cards or tickets, in one example, have a rectangular shape, are relatively flexible and are constructed of paper or plastic. Furthermore, these data cards or tickets can be assembled in a roll where each data card or ticket is cut or torn from the roll. In other embodiments, the data cards can include, consist of or have the configuration of slips, paper currency, tokens, coins or any suitable combination of such embodiments of the data cards.

The card read-write device 12, in this embodiment, includes a gaming device interface (not shown) which enables the gaming device processor 20 to electronically communicate with the data card 14. Using the gaming device interface, the processor 20 reads, updates or resets credit or cash identification data on a data card 14, depending upon which events occur during a game. Preferably, the gaming device interface directly contacts the data card 14, and through conduction or magnetism, enables communication. However, the gaming device interface can also include a device which enables the processor 20 and the data card 14 to communicate without such direct contact, preferably through the use of magnetic field technology. In one embodiment, instead of including a card read-write device, the present invention includes a card read device and a card write device The card transporter 16, in one embodiment, includes a plurality of rollers 22 which, under the control of the processor 20, move data card 14 to and from the card read-write device 12 and to and from the card holder 18. The rollers 22 rotate at a predetermined rate and in a predetermined direction so as to move data cards 14 to their destinations. Preferably, the card transporter 16 includes a path 16*a* for conveying data cards 14 to the card holder 18 and a path 16*b* for conveying data cards 14 to the card read-write device 12. It should be appreciated that the card transporter 16 can include any mechanism or set of mechanisms which can transport data cards 14, whether or not rollers are included.

The card holder 18, in one embodiment, includes at least one spring 24 which compresses the data cards and a feeder 26 adapted to feed a single data card 14 from the card holder 18 into the rollers 22 of the transport 16. It should be appreciated that the card holder 18 can include any mechanism or set of mechanisms which enables the card transporter 16 to store and retrieve data cards 14. For example, the card holder could include a chute (not shown) which, when closed, stores data cards and when opened enables a single data card to drop into a card tray (not shown) for collection by a player. In yet another embodiment, the card holder can include one or more rollers or wheels which can selectively hold and release data cards. The wheels may rotate upon the occurrence of predetermined events to feed particular data cards to a card transporter or directly to a card tray. It should be appreciated that the card holder of the present invention can include any mechanism capable of holding or storing a plurality of data cards and enabling the gaming device to dispense the data cards to players.

In one embodiment, the gaming device of the present invention includes a plurality of card holders designated for holding different types of data cards (such as data cards with integrated circuits, magnetic cards, optical cards, used cards and unused or new cards). Here, the data exchange card read-write device enables the gaming device processor to read and write machine readable data to different types of cards for those gaming devices which accommodate different types of data cards. In any case in this embodiment, players can use different types of circulating data cards to play the gaming device.

Figure 2B:
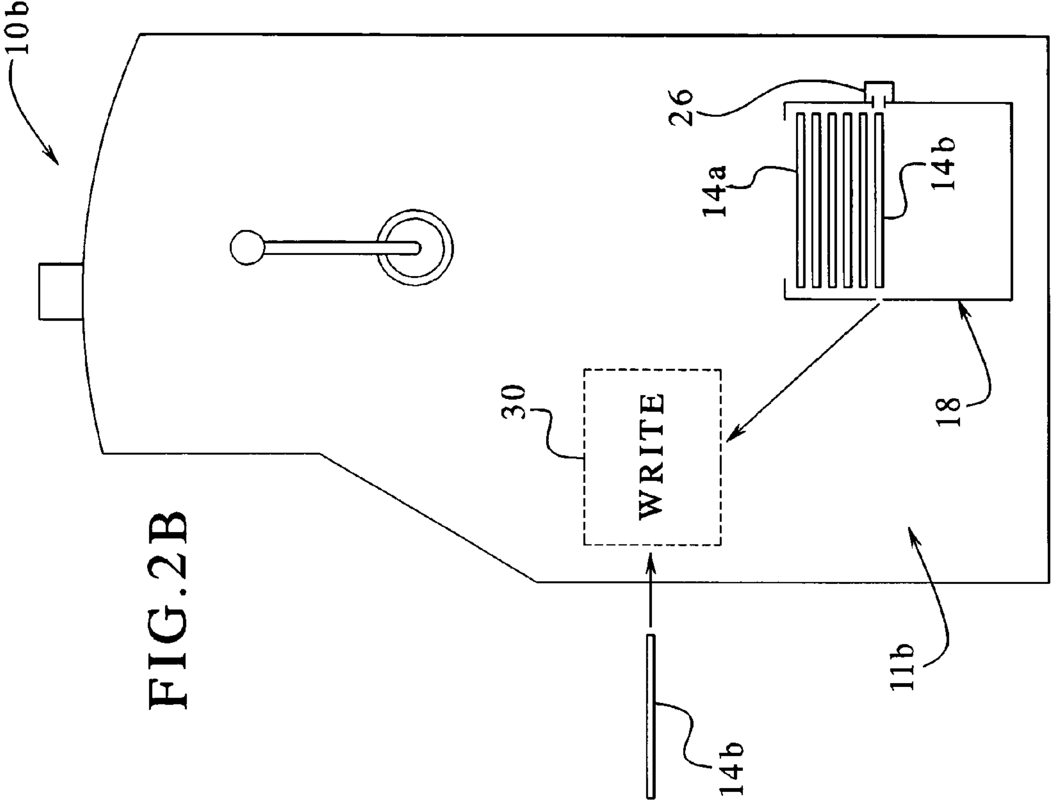
FIG. 2B is a schematic diagram illustrating a gaming device retrieving a data card from its card holder and writing upon and dispensing the data card in one embodiment of the present invention.
Figure 2A:
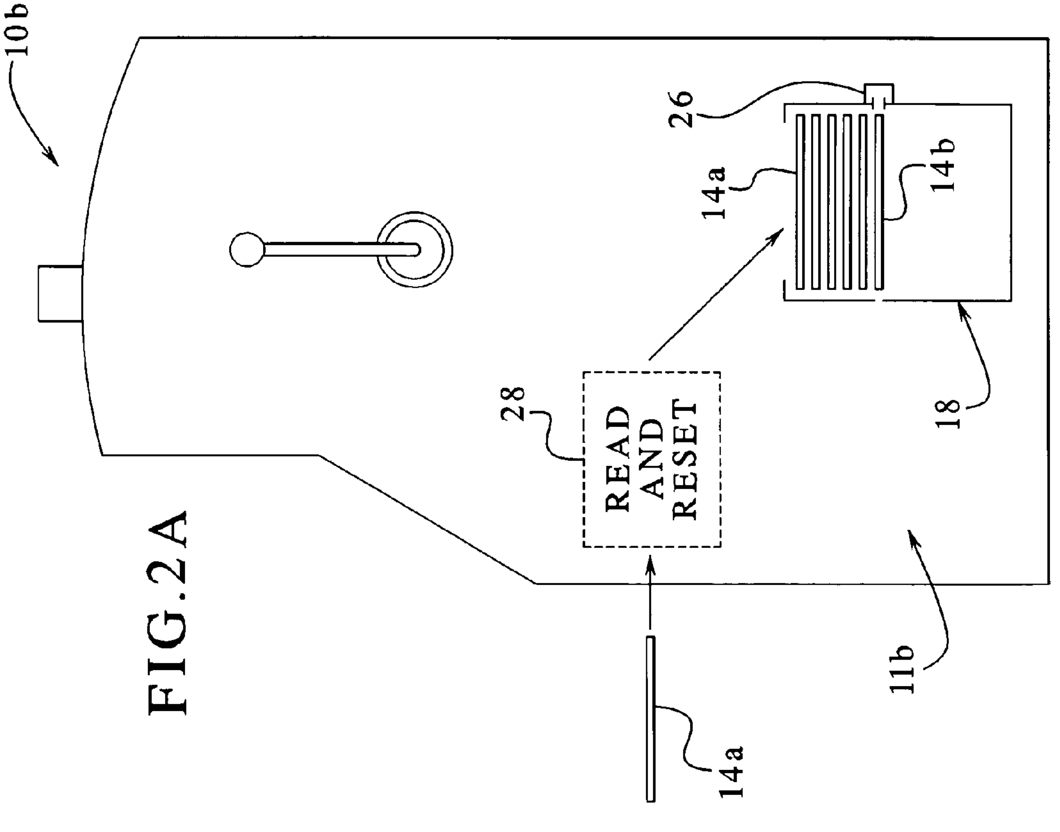
FIG. 2A is a schematic diagram illustrating a gaming device receiving, reading, resetting and storing a data card in one embodiment of the present invention.

As illustrated in FIGS. 2A and 2B, in one embodiment gaming device 10*b* includes a card management assembly 11*b* for receiving a data card 14*a*. Here, the gaming device processor, using the read-write device, reads the data card 14*a* and stores the credit unit data on that card in the memory of the gaming device as described below and as indicated by block 28. The processor then resets the data card 14*a*, bringing it to a predetermined state (such as a blank state or face value state), also as indicated by block 28. Then the gaming device processor causes the transport to move this (now) reset data card 14*a* to the card holder 18 where a plurality of other data cards are stored.

The processor uses the gaming device memory to keep track of the player's credit units and cash balance as the player plays the game. If the player uses or exhausts all of the credit units, the game terminates and the gaming device does not dispense a data card to the player. However, if the player who inserted the data card 14*a* cashes out or terminates the game and has credits, the gaming device processor causes the feeder 26 to feed a data card 14*a* from the card holder 18 to the transport for conveyance to the card read-write device. There the processor stores data on that data card 14*b* which corresponds to or is associated with the amount of remaining credits or cash balance, by writing data as indicated by block 30. The gaming device 10*b* then dispenses the data card 14*b* to the player.

The gaming device processor, in one embodiment, uses a computer program to operate the gaming device in conjunction with circulating data cards. The computer program can be stored in any memory or data storage device. The storage device can include software and/or hardware, including, without limitation, any tape or any disk, such as a CD-ROM, floppy disk, hard disk or any other optical or magnetic disk.

In one embodiment, the computer program instructs the gaming device processor to cause the gaming device to: (a) receive a certain amount of currency; (b) designate for a player a certain amount of credits which corresponds to the amount of currency received; (c) initiate a game; (d) enable the player to gain and lose credits while playing the game; (e) track any credit gains and losses; (f) terminate the game after the player cashes out or after the player loses a certain amount of credits; (g) retrieve a data card from the card holder; (h) change data on the retrieved data card; and (i) dispense the data card to the player.

In another embodiment, the computer program instructs the gaming device processor to cause the gaming device to: (a) receive a certain amount of currency; (b) designate for a player a certain amount of credits which corresponds to the amount of currency received; (c) initiate a game; (d) enable the player to gain and lose credits while playing the game; (e) track any credit gains and losses; (f) terminate the game after the player cashes out or after the player loses a certain amount of credits; (g) retrieve a blank data card from the card holder; (h) change data the blank data card to a charged data card; and (i) dispense the charged data card to the player.

In yet another embodiment, the computer program instructs the gaming device processor to cause the gaming device to: (a) receive a data card having credit unit data or other data corresponding to or associated with a certain amount of credit units or cash; (b) designate for a player a certain amount of credits which corresponds to such data stored on the received data card; (c) initiate a game; (d) enable the player to gain and lose credits while playing the game; (f) track any credit gains and losses; (g) terminate the game after the player cashes out or after the player loses a certain amount of credits; (h) reset the received data card; (i) move the received data card to the card holder; (j) retrieve a data card from the card holder; (k) change data on the retrieved data card; and (l) dispense the retrieved data card to the player.

In another embodiment, the computer program instructs the gaming device processor to cause the gaming device to: (a) receive a data card having credit unit data or other data corresponding to or associated with a certain amount of credit units or cash; (b) designate for a player a certain amount of credits which corresponds to such data stored on the received data card; (c) initiate a game; (d) enable the player to gain and lose credits while playing the game; (e) track any credit gains and losses; (f) terminate the game after the player cashes out or after the player loses a certain amount of credits; (g) update the received data card; and (h) dispense the received data card to the player.

Figure 3:
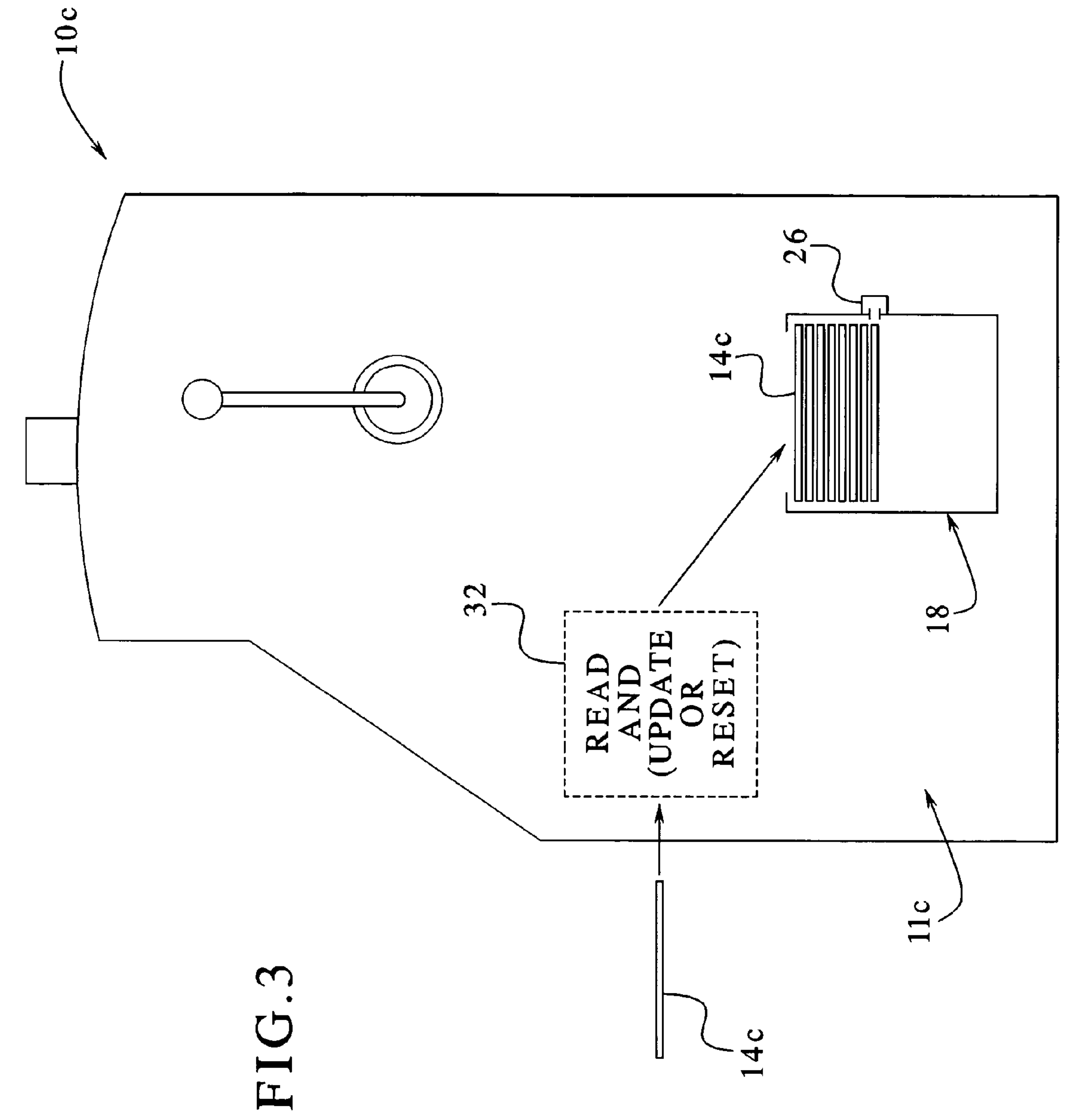
FIG. 3 is a schematic diagram illustrating a gaming device in one embodiment of the present invention having the capacity to receive, read, update and dispense a data card and to receive, read, reset and store a data card.

In one embodiment illustrated in FIG. 3, gaming device 10*c* includes a card management assembly 11*c* for receiving data card 14*c* with data associated with a certain amount of credit units or cash and dispensing this same data card 14*c* back to the player if credits remain when the player cashes out. If the player loses all of his/her credits, the gaming device processor resets data card. The processor then causes the transport to move data card 14*c* to the card holder for storage and future dispensing. If, on the other hand, when the player cashes out or terminates the game, a certain amount of credit remains, the gaming device processor updates the data on the data card 14*c* to correspond to the amount of credits or cash possessed by the player at the point of cash out, as indicated by block 32. Preferably, the updating is accomplished by writing data, as described below. In any case, gaming device 10*c* then dispenses this data card 14*c* to the player with the data associated with the player's balance of appropriate credit or cash. It should be appreciated that the card may be retained in the card read-write device or in the card holder while the player plays the gaming device.

The embodiments described in FIGS. 2A, 2B and 3 include techniques which gaming devices may employ to reuse and manipulate data cards. In one embodiment, these techniques preserve gaming device and data card resources and also simplify the manipulation of data cards within the gaming devices. Either one of these techniques may be suitable for different types of gaming devices and different types of games. It should be appreciated that the gaming device of the present invention can include alternate, suitable techniques for reusing, resetting, updating and manipulating data cards within the gaming device.

B. Data Card

The gaming device processor or a currency station can reset the data cards repeatedly so that a single population of circulating data cards can serve different players at different times. The data card of the present invention is preferably universal, meaning that it can be used by different players and different times. Though the data card is, in one embodiment, substantially rectangular and sized for a wallet, the data card can be of any suitable shape or size.

The type of data card suitable for the present invention has the capacity to be repeatedly reset and, in one embodiment, can be repeatedly changed between: (a) a blank state and a charged state; or (b) a face value charged state and a different charged state. During the life time of a single data card, the data card can be reset or otherwise brought to a particular state on numerous occasions. In one embodiment, the data card can be reset and brought to a particular state (such as a blank state or a face value state) hundreds or possibly thousands of times without jeopardizing the integrity or functionality of the data card.

Though in a preferred embodiment the gaming device of the present invention can receive currency (as described below), the gaming device need not be adapted to receive currency. In such a non-currency embodiment, players are required to obtain data cards or tokens from currency stations in order to play the gaming device. In one embodiment, after players have finished playing, all reset data cards remain in the gaming devices and players take charged data cards to a currency station for redemption. In one embodiment, periodically a gaming enterprise employee redistributes reset data cards which have accumulated in gaming devices and currency stations in order to maintain a relatively even distribution of reset data cards in the desired places. This embodiment may be most useful to gaming enterprises which have a policy against storing currency or cash on the "floor."

In one embodiment, the data card includes an integrated circuit or chip, as described below. The integrated circuit includes a data card processor and one or more memory devices. These data cards are commonly known as I/C cards or chip cards, and are also known as "smart cards" though this term is often casually used to refer to data cards in general (whether or not they include an integrated circuit). These types of data cards are commercially available from a variety of data card manufacturing companies and can be programmed for different purposes. In one embodiment, the data card includes retain code stored in its memory. When the data card has reached a predetermined state (such as a blank state or a particular face value) or when a player reaches a certain credit balance (such as zero), the retain code instructs the gaming device processor to cause the gaming device to keep or retain the data card provided by the player. The retain code can also instruct the data card processor and/or the gaming device processor to reset the data card and have it stored in the gaming device for future use.

In other embodiments, the data card of the present invention does not include an integrated circuit or chip. Instead, the data card includes one or more mechanisms which enable the gaming device processor to read, change and reset the data stored on the data card. These mechanisms may include magnetic codes, optical codes, bar codes and/or other suitable technologies.

As further described below, in one embodiment the data card includes: (a) a thermo-sensitive graphics recording member or strip on the front side of the card; and (b) an elongated magnetic member or strip. The graphics recording strip enables a thermal graphics writer to record player-readable graphics on the card, and the recording strip also enables a thermal graphics eraser to erase graphics on the card. The magnetic strip enables a data exchange read-write device to read machine readable data stored on the card and to store machine-readable data on the card.

It is preferable that one or more security devices or security techniques be incorporated into the data cards of the present invention. Such security devices or techniques can prevent, deter or hinder unauthorized people from rewriting or changing data stored in the data cards.

In one embodiment, a suitable encryption method or encryption code is used to encrypt the data stored on the data card. Here, the gaming devices and currency stations can include a key code, unlock code or translation code. The gaming devices and currency stations use this code to access, read and/or write to the data card. In other embodiments, holographic images and/or isotope materials are incorporated into the data card to help ensure the authenticity of the data cards. It should be appreciated that the present invention can include other suitable know security devices and methods to aid in the security of the data cards.

C. Operation

Figure 4:
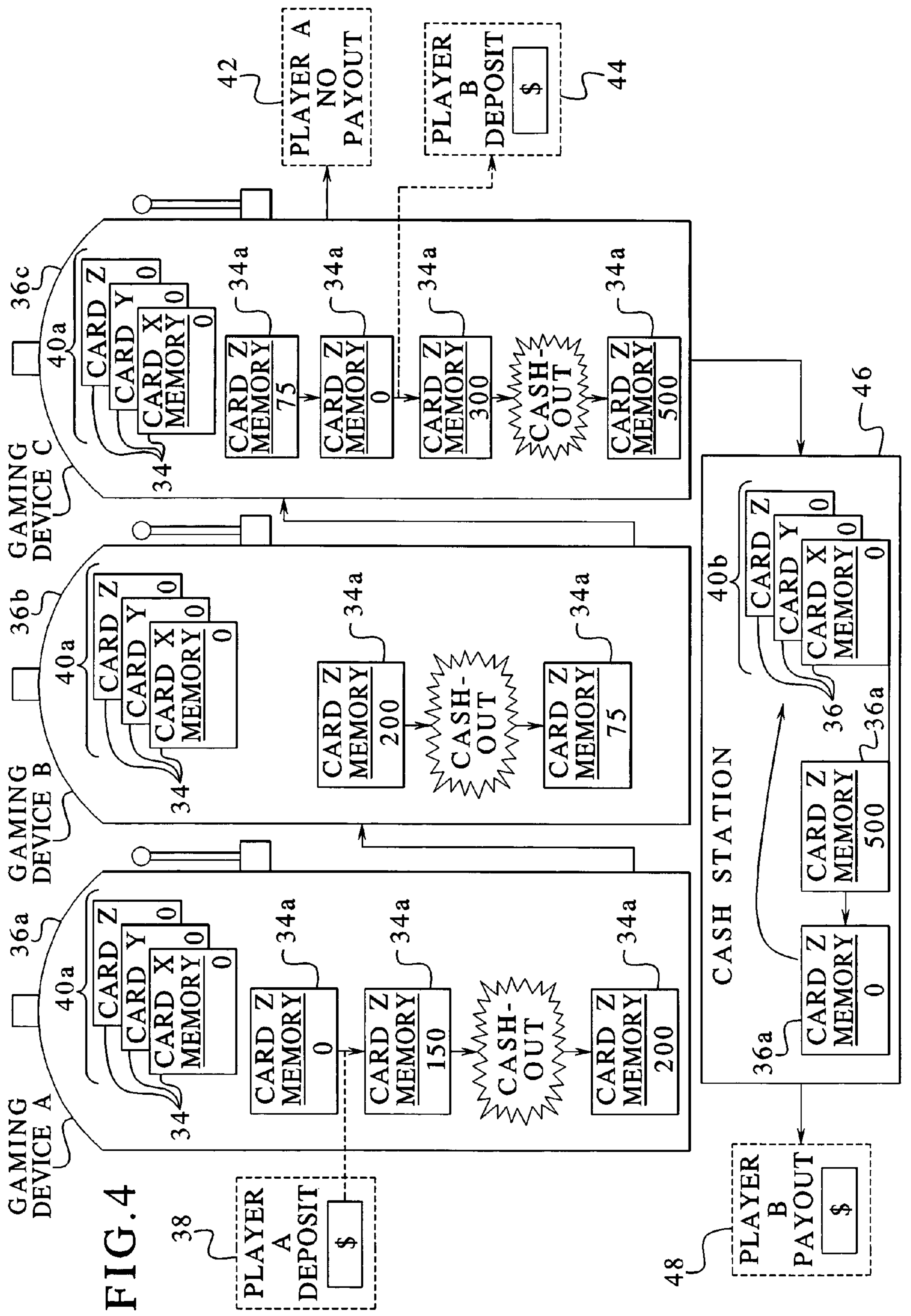
FIG. 4 is a schematic diagram illustrating the circulation of a single data card through a plurality of gaming devices in one embodiment of the present invention.

As illustrated in FIG. 4, the present invention enables a plurality of data cards (represented generally by data cards 34) which one or more, and preferably a plurality of gaming devices (represented by gaming devices 36*a* through 36*c*) can both receive and dispense. The same data card can be used by different players on different occasions. For example, a particular player A may initiate a game by depositing currency in a gaming device 36*a* illustrated by block 38. The gaming device 36*a* houses or stores a plurality of blank data cards 34 in a card holder 40*a*. When player A deposits currency in gaming device 36*a*, a card transporter in the gaming device brings one of the blank data cards 34 into contact with a gaming device interface. The gaming device processor, using a card read-write device, writes fund data corresponding to a certain amount of credit units on the data card which, in turn, corresponds to the amount of currency deposited.

After player A makes the deposit, the gaming device processor causes fund data corresponding to one hundred fifty credit units to be written on data card 34*a*. Player A then plays one or more games at that gaming device 36*a*. If the player cashes out or terminates the game with credits remaining, the gaming device will dispense data card 34*a* with the credit, cash or fund data corresponding to the appropriate amount of remaining credits. In this example, player A purchases one hundred fifty credit units for data card 34*a*, plays the game and wins an additional fifty credits, bringing the player's balance to a total of two hundred credit units. Player A then cashes out, and gaming device 36*a* dispenses data card 34*a* with data associated with two hundred credit units or data associated with the cash equivalent of such credit units.

Player A then inserts that data card 34*a* into gaming device 36*b* in order to play one or more games there. Player A loses one hundred twenty-five credits while playing gaming device 36*b* before cashing out or terminating the game. The processor in gaming device 36*b* updates the fund data on the data card 34*a* to reflect a new credit unit amount of seventy-five. The gaming device 36*b* then dispenses this data card 34*a* to player A.

Continuing with the example, player A takes this data card 34*a* with seventy-five credit units and inserts it into gaming device 36*c*. While playing the game at gaming device 36*c*, player A loses the remaining seventy-five credit units. The processor of gaming device 36*c* resets the data card 34*a* to a blank state, and the processor then causes the card transporter to move data card 34*a* into a card holder 40*a* within gaming device 36*c*.

Player A then leaves or walks away from gaming device 36*c* with no data card and no currency or payout, as indicated by block 42. As indicated by block 44, a different player B may deposit currency into gaming device 36*c*. The processor of gaming device 36*c* may write fund data associated with to a certain amount of credit units onto data card 34*a*. This amount of credit units will correspond to the amount of currency inserted into gaming device 36*c*. In this example, the processor writes onto the data card 34*a*, fund data which is associated with three hundred credit units or fund data associated with the cash equivalent of such credit units.

While playing gaming device 36*c*, player B earns an additional two hundred credits, and the processor stores fund data associated with an additional two hundred credit units (or the cash equivalent thereof) on data card 34*a* appropriately. Player B then may cash out and receive data card 34*a* having fund data associated with five hundred credit units stored on it or fund data associated with the cash equivalent of such credits. At this point, the player B may then take this data card 34*a* to a currency station and exchange it for the appropriate amount of currency. In this example, player B takes data card 34*a* to currency station 46.

Depending upon the particular embodiment, the currency station 46 can be a clerk validation terminal (CVT), gaming machine, wireless cashier or a manually operated cashier station. Whether the currency station is automated or run by an operator, the currency station receives the data card 34*a* and initially validates the data card 34*a*. This validation step involves reading the information on the data card 34*a* and comparing this information to information stored in the pay validation system described below. Upon successful validation, the currency station 46 reads the fund data on this data card 34*a*, resets this data card 34*a* and stores it with other blank data cards 34 in card holder 40*b*. In addition, currency station 46 dispenses or provides a certain amount of currency to player B which corresponds to the fund data which remained on data card 34*a*, when provided to the currency station, as indicated by block 48.

Figure 5:
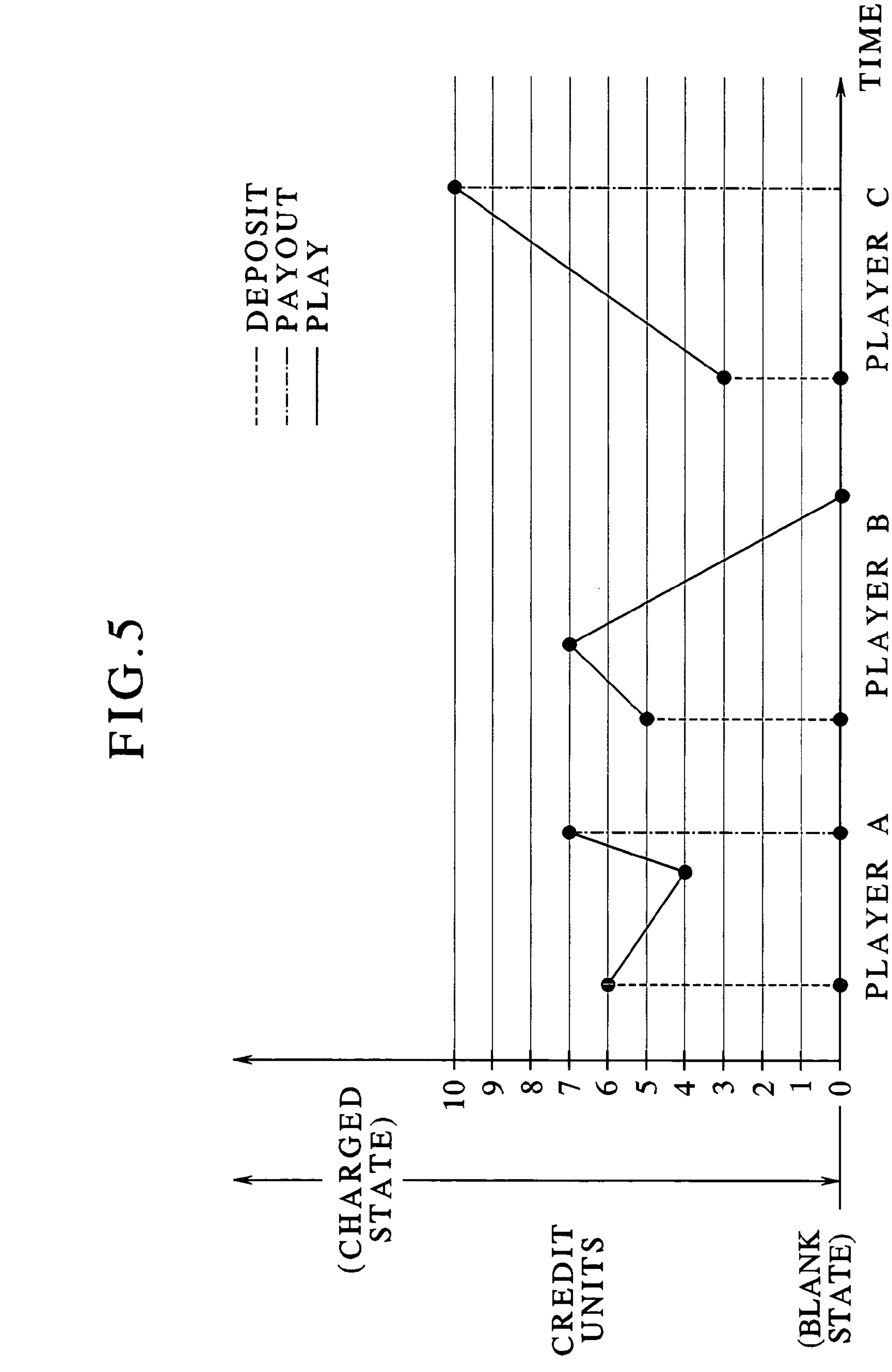
FIG. 5 is a graph of an example of multiple players using a single data card which changes between a blank state and a charged state on multiple occasions.

In an example of one embodiment illustrated in FIG. 5, a single data card A is circulated to three players: player A, player B and player C. Initially, data card A is at a blank state stored in a currency station where player A deposits a certain amount of currency. The amount of currency deposited corresponds to six credit units. The currency station provides data card A to the player with fund data corresponding to six credit units. In playing one or more gaming devices, player A loses two credits and then gains three credits before cashing out. Consequently, when the player cashes out, a gaming device dispenses data card A with fund data corresponding to seven credit units. Player A then takes data card A to a currency station and, upon validation, receives a cash payout corresponding to the seven credit units. The currency station then returns the data card A to a blank state.

Player B then deposits a certain amount of currency at a currency station and in turn receives data card A with fund data corresponding to five credit units. In playing one or more gaming devices, player B earns two credits and then loses seven credits. Accordingly, the fund data on the data card is changed to reflect an increase by two and then a decrease to zero. Player B then leaves the gaming device and walks away with no currency and with data card A remaining inside the gaming device. Player C then deposits a certain amount of currency into this gaming device and the processor of the gaming device changes the data card A from the blank state to a charged state having fund data reflecting three credit units. Player C plays the gaming device and earns seven credits before cashing out. The processor of the gaming device thus changes the fund data on data card A to reflect an increase to ten credit units and dispenses data card A to player C. Player C then takes data card A to a currency station. Upon validation, the currency exchange provides the player C with an amount of currency corresponding to the ten credit units.

In another embodiment, the gaming device is adapted to receive a plurality of data cards with predetermined face values or preset credit units. For example, such data cards could be a set of data cards with fund data associated with five credit units and a set of data cards with fund data associated with to ten credit units. These data cards, in one embodiment, do not reach a blank state. Instead, after use, they are returned to their predetermined face value or state. Data cards of different face values can be stored in various gaming device card holders designated for such data cards.

Figure 6:
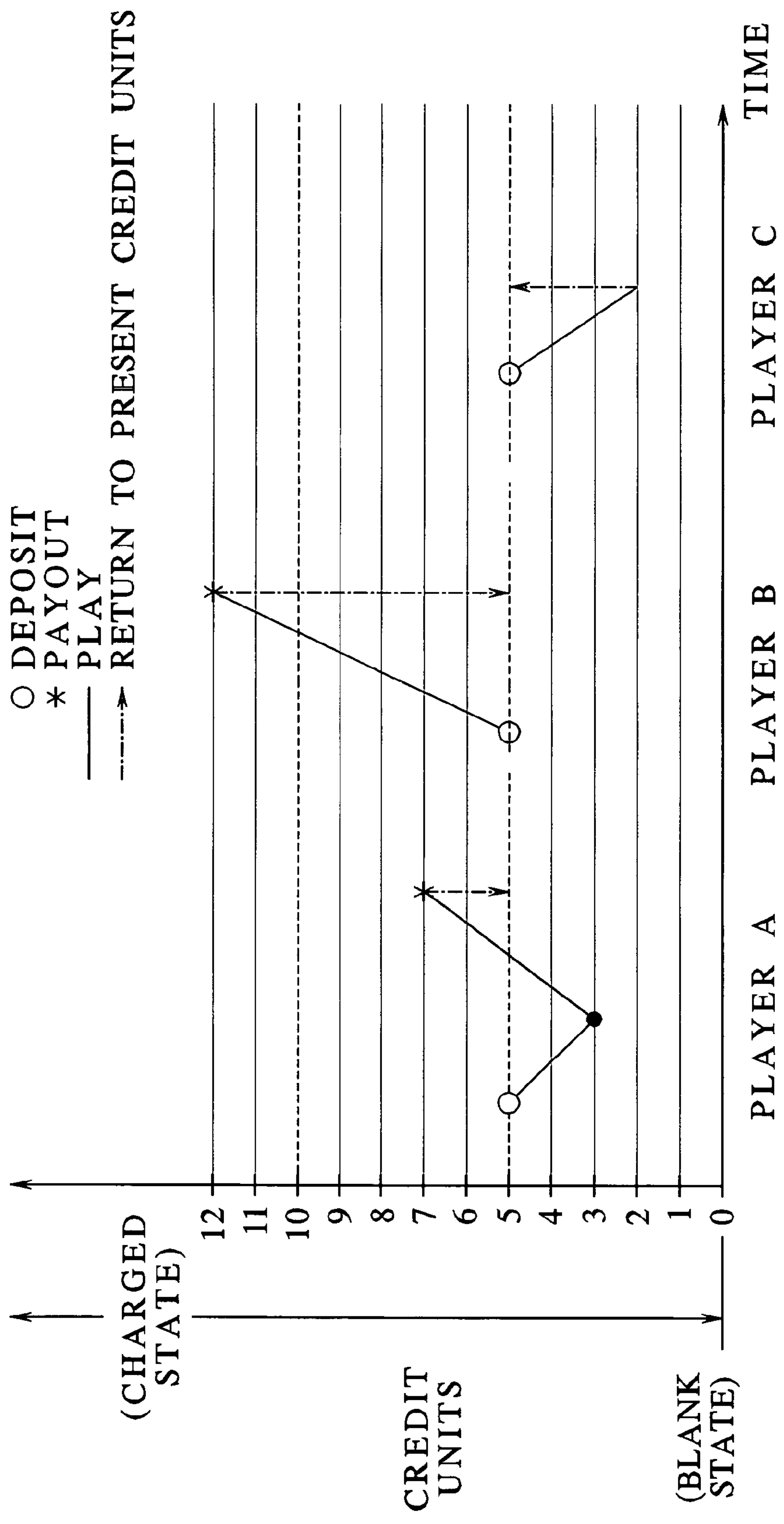
FIG. 6 is a graph of an example of multiple players using a single data card which changes between a face value charged state and a different charged state on multiple occasions.

This embodiment may be desirable to gaming enterprises which have various games which require various minimum credits to initiate the games. In the example illustrated in FIG. 6, player A obtains a five credit unit data card B by depositing the amount of currency corresponding to five credits in a gaming device. Using data card B at a gaming device, player A initially loses two credits and then gains four credits before cashing out. The processor of the gaming device updates the fund data on the data card B to reflect seven credit units. Player A then takes this data card B to a currency station and, upon validation, receives a cash equivalent of seven credit units. The currency station then returns the data card B to its predetermined face value or charged state reflecting five credit units. Player B then obtains the same data card B by depositing the amount of currency corresponding to five credit units in a currency station. After doing so, player B uses data card B to play a game and earns an additional seven credits, and the processor of the gaming device adjusts or updates the fund data on the data card B to reflect an amount of twelve credit units. Player B then takes this data card B to a currency station. Upon validation, the currency exchange provides the player B with an amount of currency corresponding to twelve credit units. The currency station returns this data card B to its predetermined face value or preset charged state reflecting five credit units.

Player C then deposits an amount of currency equivalent to five credit units in a currency station and receives data card B which has fund data associated with five credit units. After doing so, player C inserts data card B into a gaming device, plays the gaming device and loses three credits. The processor of the gaming device initially erases, removes or modifies the fund data to correspond to five credit units so as to return to card B three credit units to its predetermined face value. The gaming device then stores this data card B for future use, and player C walks away from the gaming device with no data card and no currency.

It should be appreciated that the gaming device processor can change, erase or add fund data on a data card at the beginning of a game, ending of a game, at cash out or any time during the operation of the gaming device. In addition, it should be appreciated that the examples illustrated in FIGS. 4 through 6 involve a relatively small number of players merely for illustrative purposes. The gaming device of the present invention preferably enables numerous different players to use the same data card on different occasions. This function of the gaming device, in one embodiment, resembles the role of currency, such as dollar bills, being used or handled by different members of the general public.

II. Card Management System for Cards with Graphical Display

Referring now to FIGS. 7 through 12, in one embodiment, the present invention includes a gaming device 110 with a gaming device processor 112 and a card management system. The card management system includes: (a) a card management assembly 114 positioned in the gaming device 110; and (b) a plurality of cards 116 manipulated and managed by the card management assembly 114 in the gaming device 110. As described above, in one embodiment the gaming device processor 112 is the processor which controls the general operation of the gaming device. In another embodiment, the processor 112 is an extra processor which is designated for controlling the card management system of the present invention.

A. Card Management Assembly

Figure 7:
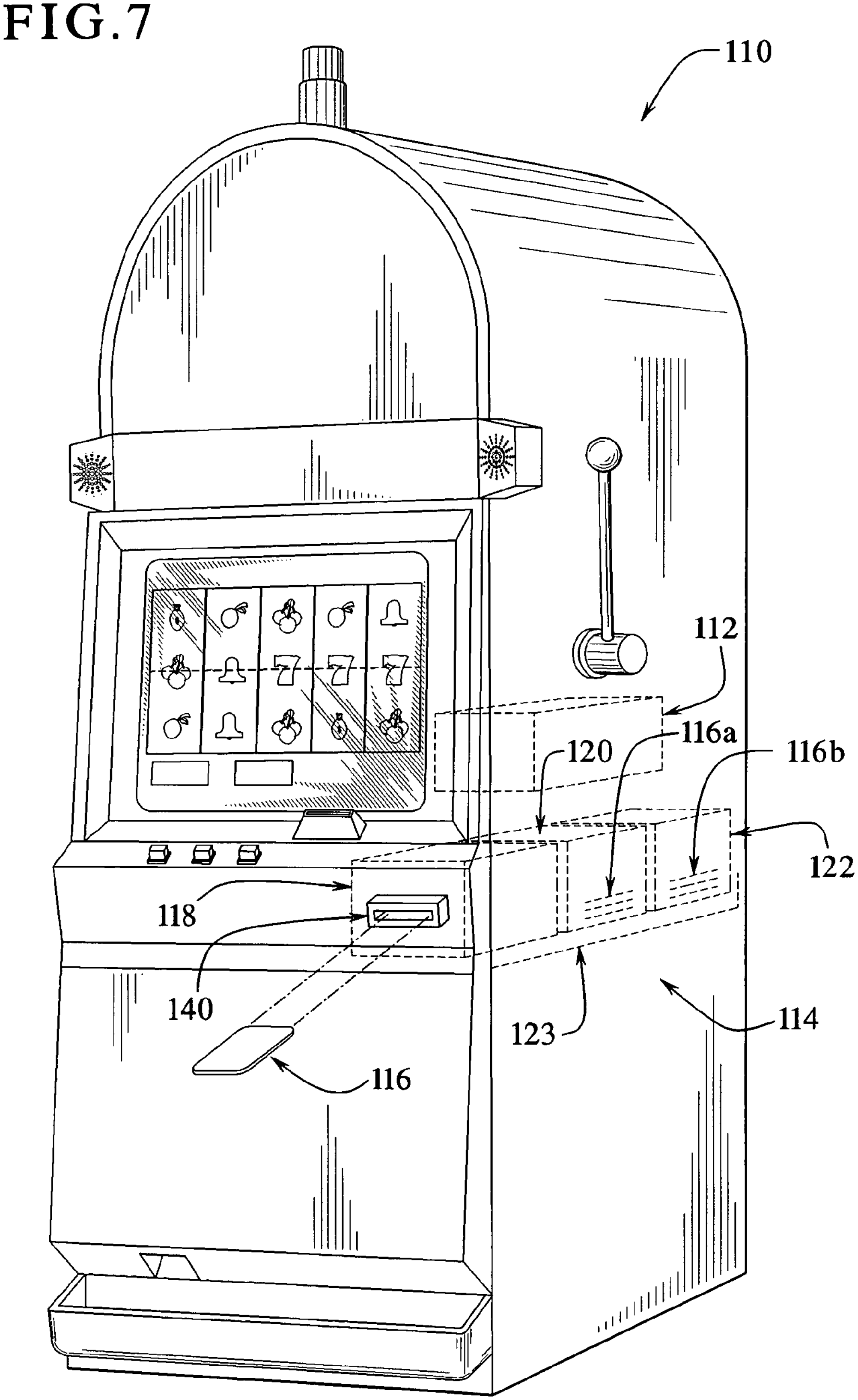
FIG. 7 is a schematic diagram of a gaming device having a card management assembly for managing cards in one embodiment of the present invention.

As generally illustrated in FIG. 7, in one embodiment the card management assembly 114 includes: (a) a card processing station, bay or assembly 118 where the card 116 is processed and treated as described below; (b) a recycled or used card bin or used card holder 120 for holding used cards 116*a* which have been used on one or more occasions by a player; (c) a new card bin or new card holder 122 for holding new cards 116*b* which have not previously been used by a player; and (d) a lower support member, platform or pan 123 which functions as a common mount for the card processing assembly 118, used card holder 120 and new card holder 122.

1. Card Processing Assembly

Figure 8:
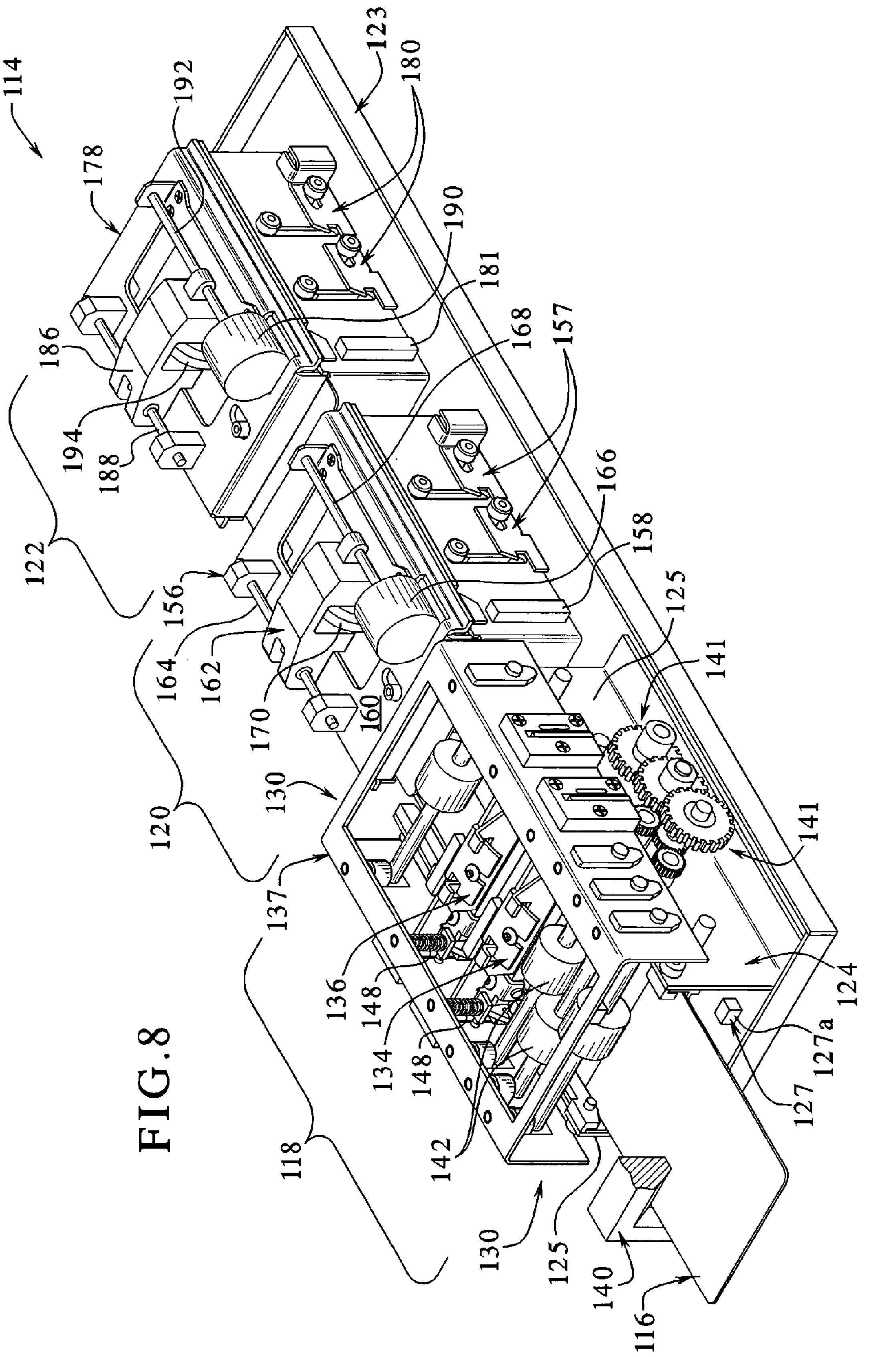
FIG. 8 is a top perspective view of a card management assembly in one embodiment of the present invention.
Figure 9:
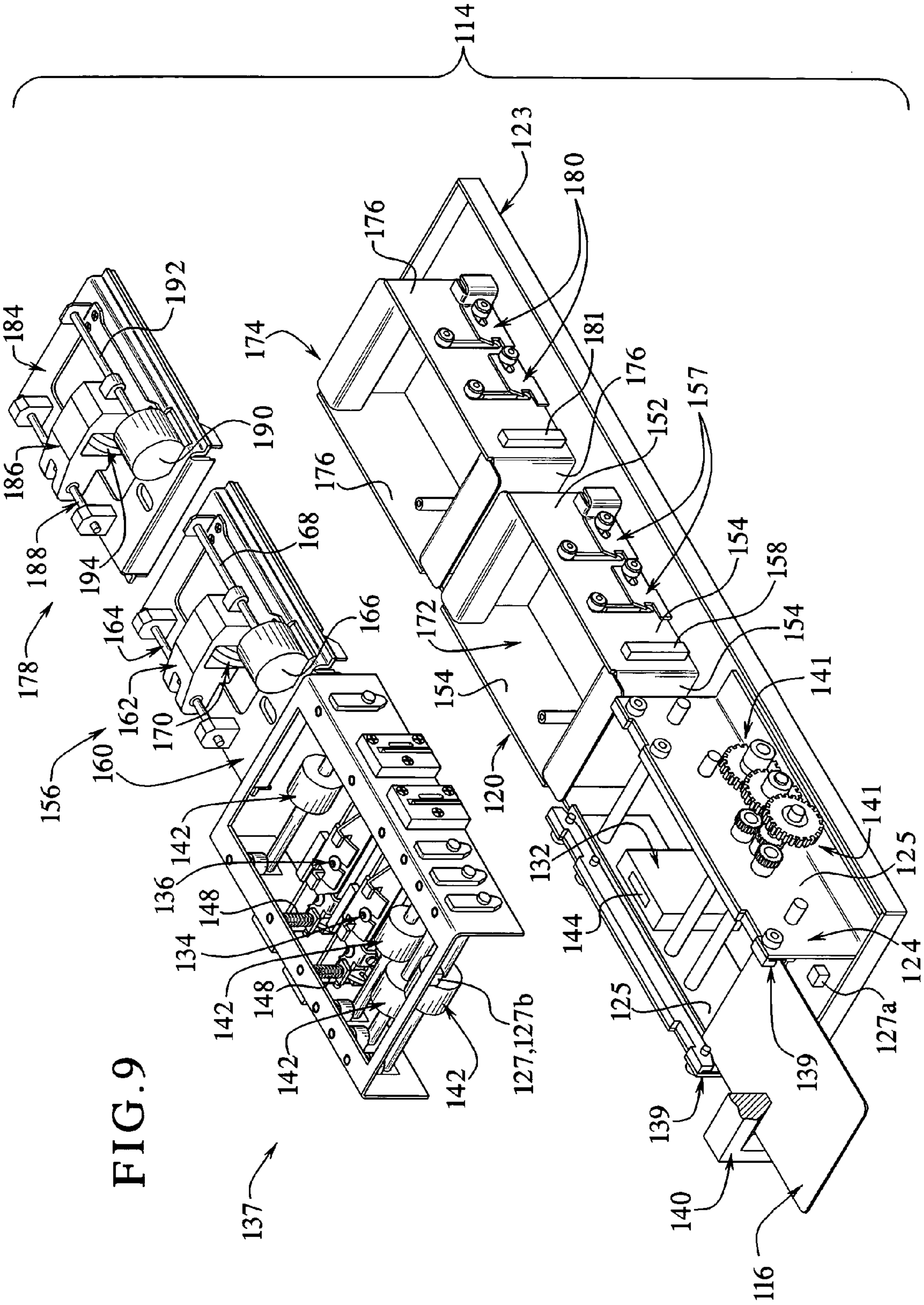
FIG. 9 is an exploded top perspective view of the card management assembly of FIG. 8 in one embodiment of the present invention.
Figure 10:
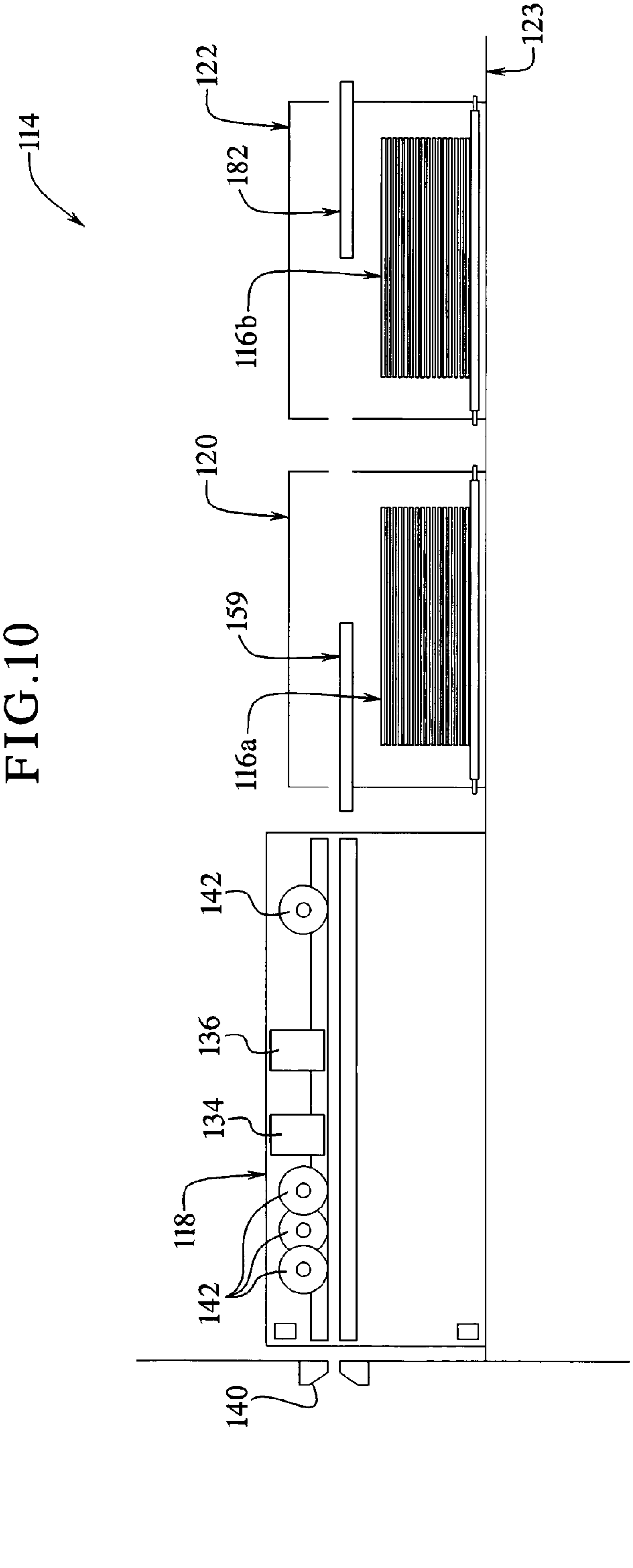
FIG. 10 is a schematic side elevation view of the card management assembly of FIG. 8 in one embodiment of the present invention.

As best illustrated in FIGS. 8, 9 and 10, in one embodiment, the card processing assembly 118 includes: (a) a base support unit or lower base member 124 having a plurality of walls 125 and a card track or card support member 139 for supporting the card 116 while the card 116 is in motion or at rest; (b) a suitable card entry sensor 127, preferably having a light source 127*a* and a photo eye or light receiver 127*b*; (c) a card transporter 130 for moving the card 116 to and from certain portions of the card processing assembly 114; (d) a data read-write device or data reader-writer 132 supported by the base member 124 for reading machine readable data stored on the data card 116 and for writing and storing machine readable data on the data card 116; (e) a graphics printing device graphics recorder or graphics printer 134 for printing, recording or forming text, symbols, images or other graphics on the data card 116 through the use of heat, chemical treatment or other suitable techniques; (f) a graphics erasing device or graphics eraser 136 for partially, substantially or entirely erasing or hiding text, symbols, images or other graphics on the data card 116; and (g) an upper or top support unit or top member 137 which functions as a common mount for the card entry sensor 127, card transporter 130, graphics printer 134 and graphics eraser 136.

In one embodiment, the card entry sensor 127 is electrically or electronically connected to the card transporter 130. In operation, first the player inserts the card 116 through the card slot defined by the card acceptor or card entry wall 140 connected to the exterior of the gaming device 110. When the card 116 reaches the sensor 127, the sensor 127 detects the card 116 and transmits a signal to the motor of the card transporter 130. When the card transporter motor receives this signal, the motor activates the card transporter 130, and the card transporter 130 moves the card 116 into the gaming device 110.

In one embodiment, the card transporter 130 includes: (a) a plurality of gears or drive wheels 141; (b) a plurality of card engagement wheels 142 coupled to the drive wheels 141; and (c) one or more electrical motors (not shown) which are mechanically coupled to the drive wheels 141 and electronically coupled to the gaming device processor 112. In operation, when powered by the motor, the drive wheels 141 transmit force to the card engagement wheels 142 which, in turn, transmit force to the cards 116. Depending upon the rotational direction of the drive wheels 141, the card transporter 130 can draw the card 116 into the gaming device 110 or dispense the card 116 from the gaming device 110.

As best illustrated in FIG. 9, the data reader-writer 132 of the card processing assembly 118 can include any suitable electronic or electromagnetic card interface device which reads machine-readable data on the card 116 and also writes machine-readable data to the card 116. In one embodiment where the card 116 has a magnetic strip, layer or member 143 as described below, and the data reader-writer 132 includes an electromagnetic or magnetized device 144 which is in communication with the gaming device processor 112. When the card 116 enters the card processing assembly or station 118, the processor 112 uses the magnetized device 144 to read the data on the card 116 in order to determine if the card 116 is the proper type of card to be inserted into the gaming device 110. If so, the magnetized device 144 then reads other information on the card 116 such as the fund data corresponding to the total quantity of credit units and the name of the player. The processor 112 retrieves this information and stores this information in the memory device of the gaming device 110.

In one embodiment, where the card 116 includes a heat sensitive graphics recording medium or member 146 (illustrated in FIG. 11), the graphics printer 134 includes: (a) a laser, heat or thermal energy source (not shown) and a thermal energy director or printing head (not shown) which directs the energy source to designated areas or portions of the graphics recording member 146; and (b) a plurality of biasing members or springs 148 which bias the printing head against the graphics recording member 146. For example, the printing head can direct the thermal energy source so that the thermal energy source is applied to the graphics recording member 146 in a designated pattern or form. The processor 112 uses the graphics printer 134 to cause player-readable text, symbols, images or other graphics to appear on the graphics recording member 146. In one embodiment, when the player has completed playing the gaming device 110, the graphics printer 134 prints player-specific information on the recording member 146, such as the player's name and the player's balance of credit units (or the monetary value of such credit units).

In this embodiment, the graphics eraser 136 of the card processing assembly 118 preferably includes: (a) a thermal energy source (not shown) and a thermal energy director or erasing head (not shown) which directs and applies the thermal energy source to part or all of the heat sensitive graphics recording member 146 of the card 116; and (b) a plurality of biasing members or springs 150 which bias the thermal energy director against the graphics recording member 146. As described below, when a certain degree or level of thermal energy is applied to the heat sensitive graphics recording member 146, the text, symbols, images or other graphics on the printing layer 146 have a decreased intensity, darkness or visibility or are otherwise removed, erased or become invisible. Using the graphics printer 134 and the graphics eraser 136, the processor 112 can print and erase player-readable text, symbols, images and other graphics on the card 116.

In one embodiment, the card 116 remains in the card processing assembly or station 118 while the player is playing the gaming device 110. In one example, when the player is finished playing, the processor 112 uses the magnetized device 144 to remove or adjust the fund data on the card 116 and to then store fund data associated with the player's current balance of credit units on the card 116. At this phase, the processor 112 may use the graphics eraser 136 to erase all text from the card 116, and the processor 112 may use the graphics printer 134 to print the player's name and the monetary equivalent of the player's credit balance on the card 116.

Next, the card transporter 130, under control of the processor 112, dispenses the card 116 to the player. In this case, the player leaves the gaming device 110 with the same card 116 which the player inserted into the gaming device 110. However, the card 116 has a different credit balance, a new printing of the player's name and a different player-readable monetary or purse value printed on the card 116.

2. Used Card Holder

In some cases, the player may finish playing the gaming device 110 with no remaining balance of credits, and the player may not be interested in keeping the card 116. In this scenario, the used card holder 120 of the card management assembly 114 functions as a repository or storage place for such used cards **116*a*. As best illustrated in FIG. 9, the used card holder 120 includes: (a) a lower base unit or lower retaining member 152 having a plurality of retaining walls 154; and (b) an upper unit, top unit or top member 156 for manipulating the cards 116 and 116*a*. The lower retaining member 152 preferably includes a suitable card lifting mechanism or card lifting device 157 which applies a force to the bottom of the stack of cards 116*a*. Depending upon the embodiment, the card lifting device 157 can include one or more biasing members, such as springs (not shown), or a motorized platform (not shown) which moves the stack of cards 116*a* upward or downward depending upon whether a used card 116*a* is entering or leaving the lower retaining member 152. In addition, the lower retaining member 152 can include a card level sensor 158 for sensing when the old card holder 120 is empty or when the quantity of old cards 116*a* in the old card holder 120** has otherwise reached a designated level.

The top member 156 of the used card holder 120, in one embodiment, includes: (a) a sliding closure member, gate or door 159 shown partially open in FIG. 10; (b) a substantially flat support member or platform 160 positioned so as to overlay the door 159; (c) a coupling member or arm 162 which couples the door 159 to the platform 160; (d) a slide bar or rod 164 which couples the arm 162 to the platform 160, enabling the arm 162 and the door 158 to slide relative to the platform 160; (e) a motor 166; (f) a worm gear 168 which is coupled to the motor 166 and which is also engaged with the arm 162; and (g) a motor (not shown) which drives a card engagement wheel 170.

In operation, the gaming device processor 112 controls the motors of the used card holder 120 in order to selectively deposit used cards 116 into the used card holder 120 and to retrieve used cards 116*a* from the used card holder 120.

In one embodiment, the memory device of the gaming device 110 includes at least one card management instruction, command or program. This card management program directs the processor 112 to move a card 116, which a player has used to play the gaming device, from the card processing station 118 to the used card holder 120 on one or more conditions. One condition is if such used card 116 remains in the processing station 118 a designated amount of time after the player has finished playing the gaming device 110. As described above, when the card 116 is in the processing station 118, the processor 112, in one embodiment, removes or adjusts the fund data from the card 116 and erases all graphics from the card. Therefore, when the player finishes playing the gaming device 110 with no remaining balance of credits, and the player is not interested in keeping the card 116, the processor 112 causes the processing station 118 to move the card 116 to the used card holder 120 after a certain period of time elapses.

At the same time or shortly thereafter, the processor 112 activates the motors of the used card holder 120 and causes the door 159 to slide away from the retaining walls 154, thereby exposing the opening 172. The processor 112 then causes the card engagement wheel 170 to rotate in a direction which directs the card 116 over the opening 172. When the card 116 reaches the opening 172, the card 116 drops into the lower retaining member 152.

Once a card 116 is erased and moved into the used card holder 120, the card 116, which at that point is a used card 116*a*, is available for use by future players of the gaming device 110. For example, a new player may initiate play of the gaming device by depositing coins, tokens or a ticket into the gaming device 110. When this player finishes playing the gaming device 110, the player may have a balance of credit units. When the player cashes-out, the processor 112 initially causes the used card holder 120 to move one of the used cards 116*a* to the card processing station 118. Specifically, the processor 112 controls the used card holder 120 so that the door 159 slides open, enabling the top card 116*a* to exit the retaining member 152 and to rest on top of the door 159. Next, the card engagement wheel 170 rotates in such a direction so as to move the card 116*a* toward the card processing assembly or station 118. The card processing assembly 118 then, under control of the processor 112, transfers fund data associated with the player's credit units to the card 116*a* and also prints or forms graphics, such as the player's name and current monetary balance, on the card 116*a*. Finally, the processor 112 causes the card processing assembly 118 to dispense the card 116*a* to the player. In this fashion, the same card 116 can be reused or recycled time and time again by different players of the same or different gaming devices.

3. New Card Holder

It is expected that a certain percentage of players will begin playing the gaming device with a data card 116 and a certain percentage of players will begin playing the gaming device 110 without a data card 116 by using, for example, tokens, tickets or cash. If too many players begin playing the gaming device 110 without a data card 116, in comparison to the number of players who begin playing with a data card 116, the supply of used cards 116*a* in the used card holder 116 may be depleted.

For this reason, the card management assembly 114 includes a new card holder 122 which holds a plurality of new or unused cards 116*b*. In one embodiment, the new card holder 122 is positioned on the pan 123 in line with and directly behind the used card holder 120.

As best illustrated in FIG. 9, the new card holder 122 includes: (a) a lower base unit or lower retaining member 174 having a plurality of retaining walls 176; and (b) an upper unit, top unit or top member 178 for manipulating the cards 116*b*. The lower retaining member 174 preferably includes a suitable card lifting mechanism or card lifting device 180 which applies a force to the bottom of the stack of cards 116*b*. Depending upon the embodiment, the card lifting device 180 can include one or more biasing members, such as springs (not shown), or a motorized platform (not shown) which moves the stack of cards 116*b* upward depending upon when a new card 116*b* is leaving the lower retaining member 174. In addition, the lower retaining member 174 can include a card level sensor 181 for sensing when the new card holder 122 is empty or when the quantity of new cards 116*b* in the new card holder 122 has otherwise reached to a designated level.

The top member 178 of the used card holder 122, in one embodiment, includes: (a) a sliding closure member, gate or door 182 shown closed in FIG. 10; (b) a substantially flat support member or platform 184 positioned so as to overlay the door 182; (c) a coupling member or arm 186 which couples the door 182 to the platform 184; (d) a slide bar or rod 188 which couples the arm 186 to the platform 184, enabling the arm 186 and the door 182 to slide relative to the platform 184; (e) a motor 190; (f) a worm gear 192 which is coupled to the motor 190 and which is also engaged with the arm 186; and (g) a motor (not shown) which drives a card engagement wheel 194.

In operation, the gaming device processor 112 controls the motors of the new card holder 122 in order to selectively retrieve new cards 116*b* from the new card holder 122. In one embodiment, the memory device of the gaming device 110 includes at least one card management instruction, command or program. This card management program directs the processor 112 to retrieve a new card 116*b* from the new card holder 122 on one or more conditions. One condition is if the old card holder 120 is empty, as detected by the card level sensor 158 of the used card holder 120.

If this condition occurs, the processor 112 initially causes the door 158 of the old card holder 120 to remain closed, and the processor 112 causes the new card holder 122 to move one of the new cards 116*b* from the top member 178 of the new card holder 122, through the top member 156 of the used card holder 120 and to the card processing station 118. Specifically, the processor 112 controls the new card holder 122 so that the door 182 slides open, enabling the top card 116*b* to exit the retaining member 174 and to rest on top of the door 182. Next, the card engagement wheel 194 rotates in such a direction so as to move the card 116*b* toward the old card holder 120.

The processor 112 then causes the card engagement wheel 170 of the old card holder 120 to force the new card 116*b* toward the card processing assembly or station 118. The card processing assembly 118 then, under control of the processor 112, transfers fund data corresponding to the player's credit units to the new card 116*b* and also prints graphics, such as the player's name and current monetary balance, on the new card 116*b*. Finally, the processor 112 causes the card processing assembly 118 to dispense the new card 116*b* to the player. In this fashion, the gaming device 110 can provide players with data cards even after there are no more used cards 116*a* in the gaming device 110.

In one embodiment, the gaming device processor 112 uses both of the card level sensors 158 and 181 to determine or monitor the levels of cards 116 in the card holders 120 and 122. In one embodiment, when the processor 112 determines that the amount of cards 116*a* or 116*b* has been reduced to a certain level, the processor 112 provides a suitable output or message either on the gaming device 110 or on a facility management or maintenance system.

B. Data Card

Figure 11:
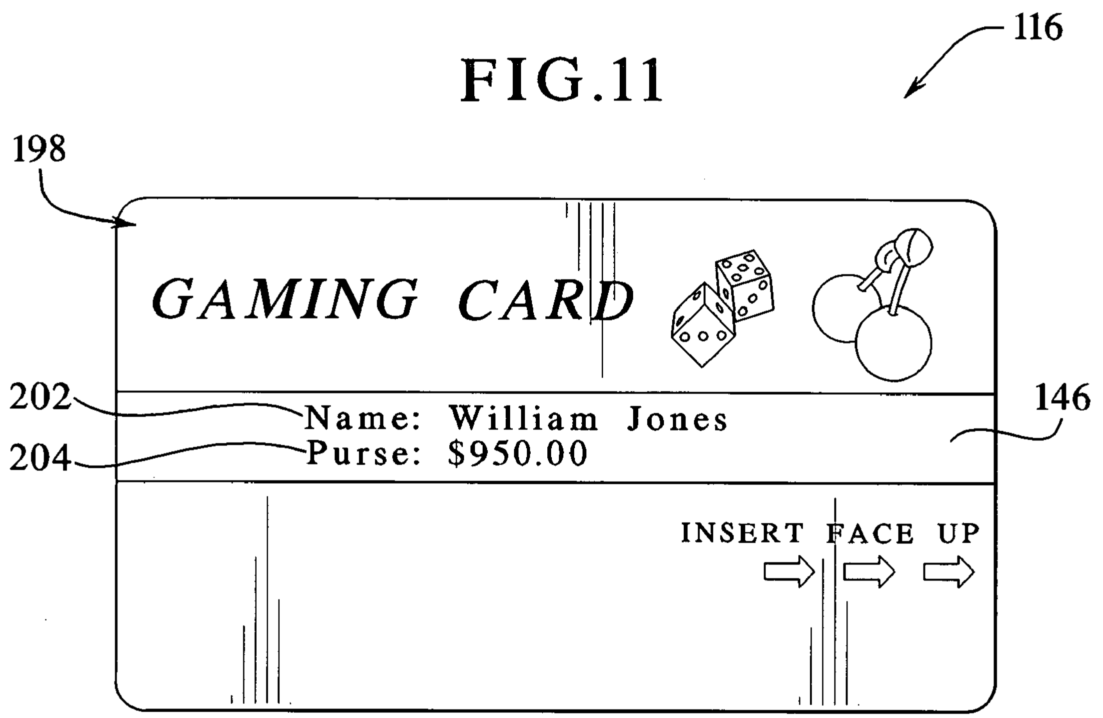
FIG. 11 is a top or plan view of the front side or face of a data card in one embodiment of the present invention.
Figure 12:
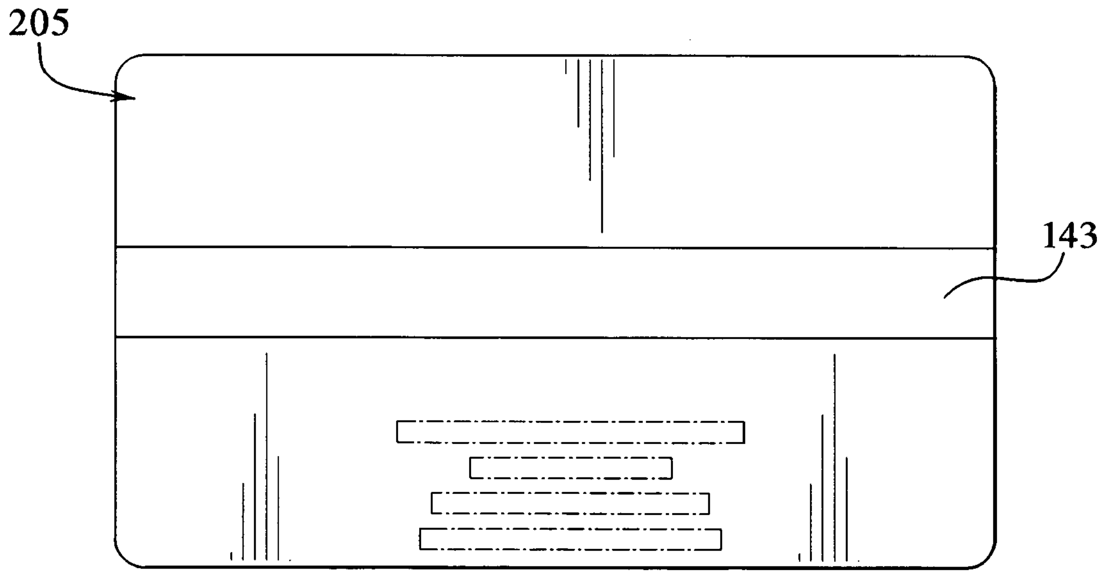
FIG. 12 is a top or plan view of a backside of the data card of FIG. 11 in one embodiment of the present invention.

Referring now to FIGS. 11 and 12, in one embodiment, the front side or face 198 of the data card 116 includes a printing medium or a graphics recording member 146 which can include one or more layers of material. The graphics recording member 146 is preferably a thermosensitive recording medium or member or a thermo-reversible medium or member. In one embodiment, the graphics recording member 146 preferably includes one or more low-molecular weight materials, and when these materials are heated to different levels of temperature, these materials change to have different reflection densities. For example, one level of heat may cause the graphics recording member 146 to have a transparent state, and another level of heat may cause the graphics recording member 146 to have an opaque state. In another embodiment, when different levels of heat are applied to the graphics recording member 146, different chemical reactions occur in the graphics recording member 146. Here, one type of chemical reaction can cause the graphics recording member 146 to have one color, and a different chemical reaction can cause the graphics recording member 146 to have a different color.

In one embodiment, the thermosensitive recording member 146 has a plurality of different light transmission states associated with different levels of heat. The different light transmission states can include a transparent state, an opaque state and other states. In one embodiment, each of the light transmission states is associated with a graphical characteristic including, without limitation, black, white, color, shade and intensity.

In another embodiment, the thermosensitive recording member 146 has a plurality of different chemical states associated with different levels of heat. It is preferable that each of the chemical states is associated with a graphical characteristic including, without limitation, black, white, color, shade and intensity.

In the embodiment where the recording member 146 is a thermo-reversible or thermosensitive member, the thermal head (not shown) of the graphics printer 134 applies a designated level of heat to a pattern on the recording member 146. If, for example, the pattern is the letters for the text 202, the face 198 of the card 116 displays the player-readable text 202, which in this example, is the name of the player. In another example, if the pattern is the player-readable text 204, the face 198 of the card 116 displays the text 204 to the player. In this example, the text 204 is the monetary equivalent or purse amount of the player's credit unit balance on the card 116.

The graphics eraser 136 can erase this text 202 and 204 by applying a certain level of heat to the recording member 146. Accordingly, the recording member 146 can be written upon and erased time and time again.

It should be appreciated that various suitable sizes and types of the recording member 146 can be used to accommodate different types, sizes, color and shapes of different text, images, symbols and graphics which the card processing assembly 18 may print on and remove from the recording member 146.

As illustrated in FIG. 12, the backside 205 of the card 116 includes a magnetic layer, strip, member, or magnetic memory device 143 which magnetically stores machine-readable data, codes or information. Using the reader-writer 132, the gaming device processor 112 can read this machine-readable code and also write this code onto the card 116. When the processor 112 stores fund data or information on the magnetic memory device 143, this data remains on the card 116. The player can take this charged card 116 to a currency station, such as a clerk validation terminal (CVT). The currency station, in one embodiment, has a magnetic read-write device which reads the fund data on the magnetic memory strip 143. By communicating with an electronic pay validation system, the currency station verifies the amount of currency payable to the player. Upon successful verification, the currency station provides the appropriate amount of currency to the player. In one embodiment, the magnetic member 143 includes one of the magnetic strips which is commercially available and commonly used on credit cards, and debit cards and the like.

III. Data Card Having Processor

Figure 13:
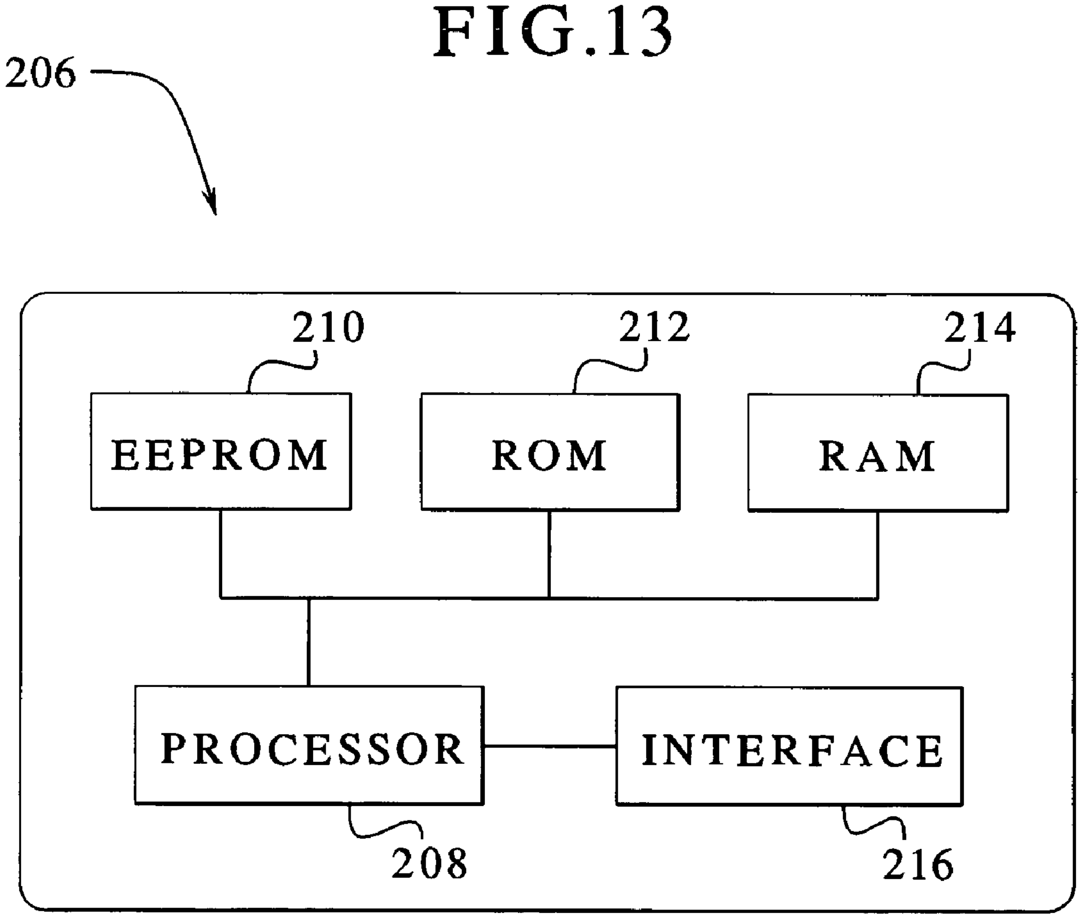
FIG. 13 is a schematic block diagram of the electronic configuration of a data card in one embodiment of the present invention.

Referring to FIG. 13, in one alternative embodiment, the gaming device of present invention is used in conjunction with a data card 206 which includes: (a) a data card processor 208 which communicates with EEPROM (Erasable Electrically Programmable Read-Only Memory) 210; (b) data card ROM (Read-Only Memory) 212; (c) data card RAM (Random Access Memory) 214; and (d) data card interface 216. The data card processor 208 can include any processor which has the function and size suitable for integration into a data card. Data card processor 208 operates on a suitable operating system, preferably the operating system known as mask. EEPROM 210 is a flexible and robust form of nonvolatile memory. Data stored in EEPROM 210 remains there even when there is no power supply, and the data can be changed relatively quickly and easily, although not as quickly as data can be changed in data card RAM 214. EEPROM 210 preferably stores variable credit unit data, as described below.

Data card ROM 212 stores computer programs or code which the data card processor 208 uses to erase and write data. Preferably, data card ROM 212 includes retain code which instructs the gaming device processor and/or the data card processor 208 to cause the gaming device to retain the data card 206 once it reaches a predetermined state or once a player reaches a certain balance of credits, such as a zero balance. In one embodiment, data card ROM 212 includes data regarding a predetermined number of times in which the data card 206 can be reset or returned to a predetermined state. Data card processor 208 uses this data to deactivate data card 206 at the appropriate time. This deactivation ensures that older data cards which are vulnerable to dysfunction are removed from circulation at the proper time. Data card RAM 214 includes data which may vary from time to time. For example, RAM 214 may include data regarding how many times a data card 206 has been used or which gaming devices have received the data card 206.

Data card interface 216 can include any mechanism, connection or terminal which is capable of enabling the data card processor 208 to exchange data with the gaming device processor. In one embodiment, the data card interface 216 includes one or more metal contacts (not shown) which are connected to the data card processor 208 and which are exposed at the surface of the data card 206. These contacts are adapted to make direct contact with the contacts of a gaming device interface. In another embodiment, data card interface 216 does not include such contacts, but rather includes the mechanisms necessary for the data card processor 208 to communicate with the processor of the gaming device without physical contact between data card 206 or any interface or portion of the gaming device. In one embodiment, such a contact-free interface involves electrical current running through coiled wire included in the data card interface 216 and an electromagnetic field generated by the gaming device interface.

In one embodiment, EEPROM 210 includes a predetermined number of memory cells which are preset to "1." Each "1" corresponds to a credit unit. Thus, if a player purchases ten credit units, ten of the memory cells in the data card would be written or set to "1." In response to messages received by the gaming device processor, the data card processor 208 writes or rewrites data to the memory cells. Preferably, for each credit lost during a game, the gaming device processor rewrites to a memory cell from "1" to "0", and for each credit gained during a game the data card processor 208 rewrites a memory cell from "0" to "1". Alternatively, the gaming device processor can be programmed to minimize rewrites by not causing the data card processor 208 to write memory cells until the player cashes out or terminates the game. At that point, the gaming device processor may subtract all credit losses from all credit gains, resulting in a net credit. The gaming device processor could then cause the data card processor 208 to rewrite a certain number of memory cells from "0" to "1," where the number of rewrites corresponds to the net credit. It is preferable that if a player loses all credits during a game, such that all memory cells are set to "0" or there is no net credit, the gaming device processor causes the game to terminate.

In another embodiment, the data card need not include EEPROM or the other memory devices illustrated in FIG. 13. Rather, the data card of the present invention can include non-EEPROM technology and/or alternate, suitable data storage devices which the data card processor and/or gaming device processor can use.

IV. Gaming Device

Figure 14A:
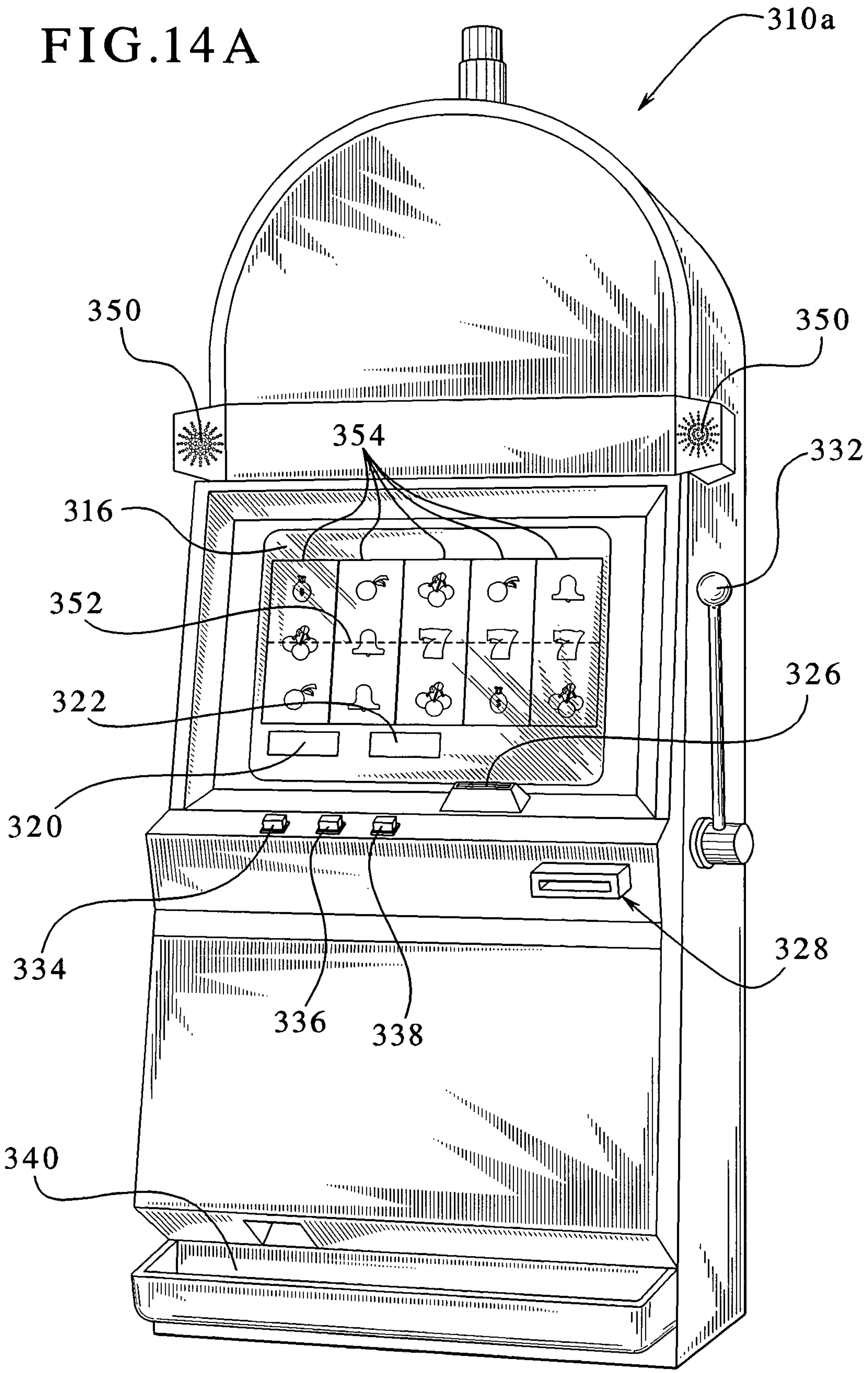
FIG. 14A is a perspective view of one embodiment of a gaming device of the present invention.
Figure 14B:
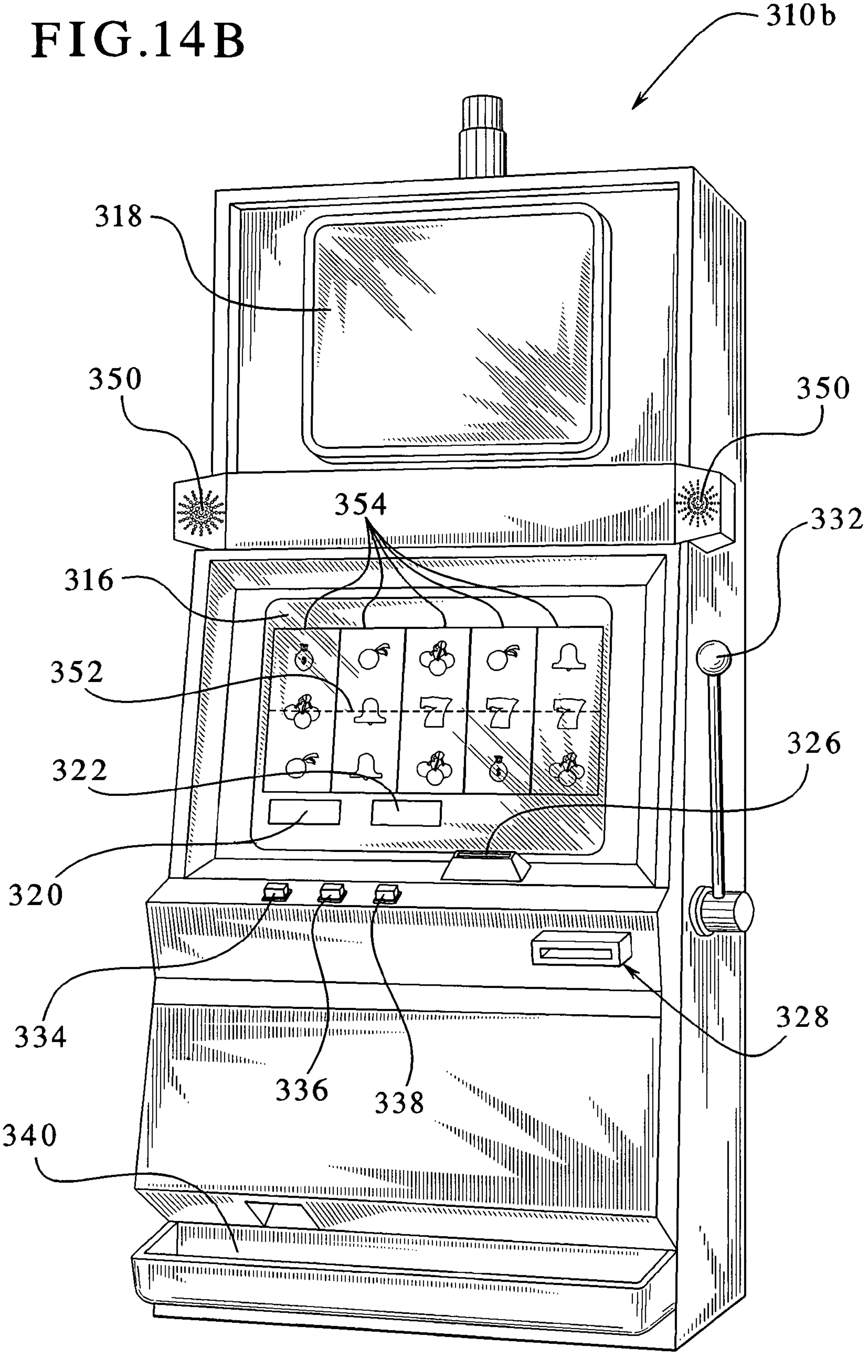
FIG. 14B is a perspective view of another embodiment of a gaming device of the present invention.

The card management system of the present invention can be used in conjunction with any suitable type of gaming device. Referring now to FIGS. 14A and 14B, two alternative embodiments of the gaming device of the present invention are illustrated as gaming device 310*a* and gaming device 310*b*, respectively. Gaming device 310*a* and/or gaming device 310*b* are generally referred to herein as gaming device 310.

In one embodiment, as illustrated in FIGS. 14A and 14B, gaming device 310 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 14A and 14B, the gaming device can be constructed with varying cabinet and display configurations.

Figure 15A:
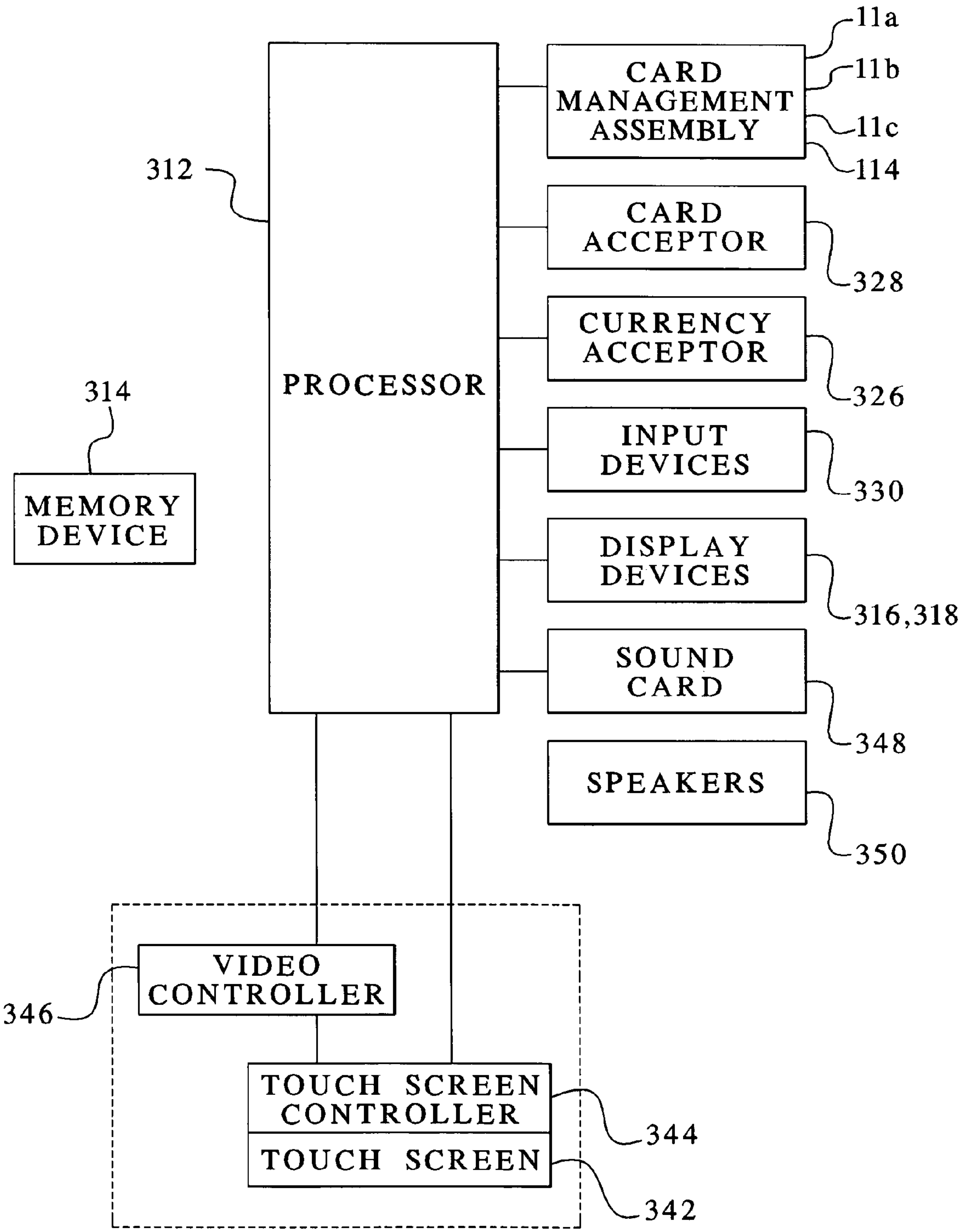
FIG. 15A is a schematic block diagram of the electronic configuration of a gaming device in one embodiment of the present invention.

In one embodiment, as illustrated in FIG. 15A, the gaming device preferably includes at least one processor 312, such as a microprocessor, a microcontroller-based platform, a suitable integrated circuit or one or more application-specific integrated circuits (ASIC's). The processor is in communication with or operable to access or to exchange signals with at least one data storage or memory device 314. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device store fund data, credit data or credit unit data. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 14A, the gaming device includes one or more display devices controlled by the processor. The display devices are preferably connected to or mounted to the cabinet of the gaming device. The embodiment shown in FIG. 14A includes a central display device 316 which displays a primary game. This display device may also display any secondary game associated with the primary game as well as information relating to the primary or secondary game. The alternative embodiment shown in FIG. 14B includes a central display device 316 and an upper display device 318. The upper display device may display the primary game, any suitable secondary game associated with the primary game and/or information relating to the primary or secondary game. As seen in FIGS. 14A and 14B, in one embodiment, the gaming device includes a credit display 320 which displays a player's current number of credits, cash, account balance or the equivalent. In one embodiment, the gaming device includes a bet display 322 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIGS. 14A and 14B, in one embodiment, the gaming device includes at least one currency acceptor 326 in communication with the processor. The currency acceptor 326 may include a coin slot or a payment, note or bill acceptor, where the player inserts money, tickets, coins or tokens.

Also, in this embodiment, the gaming device includes a data card acceptor 328 where the player can insert data cards 14 and 116 into the gaming device and receive data cards 14 and 116 from the gaming device. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 14A, 14B and 15A, in one embodiment the gaming device includes at least one and preferably a plurality of input devices 330 in communication with the processor. The input devices can include any suitable device which enables the player to produce an input signal which is read by the processor. In one embodiment, after appropriate funding of the gaming device, the input device is a game activation device, such as a pull arm 332 or a play button 334 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 14A and 14B, one input device is a bet one button 336. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 338. The player may push the cash out button and cash out to receive a data card charged with credit units, a cash payment or other suitable form of payment corresponding to the number of remaining credits. In one embodiment, when the player cashes out, the player receives the coins or tokens in a coin payout tray 340.

In one embodiment, as mentioned above and seen in FIG. 15A, one input device is a touch-screen 342 coupled with a touch-screen controller 344, or some other touch-sensitive display overlay to allow for player interaction with the images on the display. The touch-screen and the touch-screen controller are connected to a video controller 346. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 15A, the gaming device includes a sound generating device controlled by one or more sound cards 348 which function in conjunction with the processor. In one embodiment, the sound generating device includes at least one and preferably a plurality of speakers 350 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 310 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 14A and 14B, a base or primary game may be a slot game with one or more paylines 352. The paylines may be horizontal, vertical, circular, diagonal, angled or any combination thereof. In this embodiment, the gaming device displays at least one and preferably a plurality of reels 354, such as three to five reels 354 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 354 are in video form, the plurality of simulated video reels 354 are displayed on one or more of the display devices as described above. Each reel 354 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 14A and 14B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 15B:
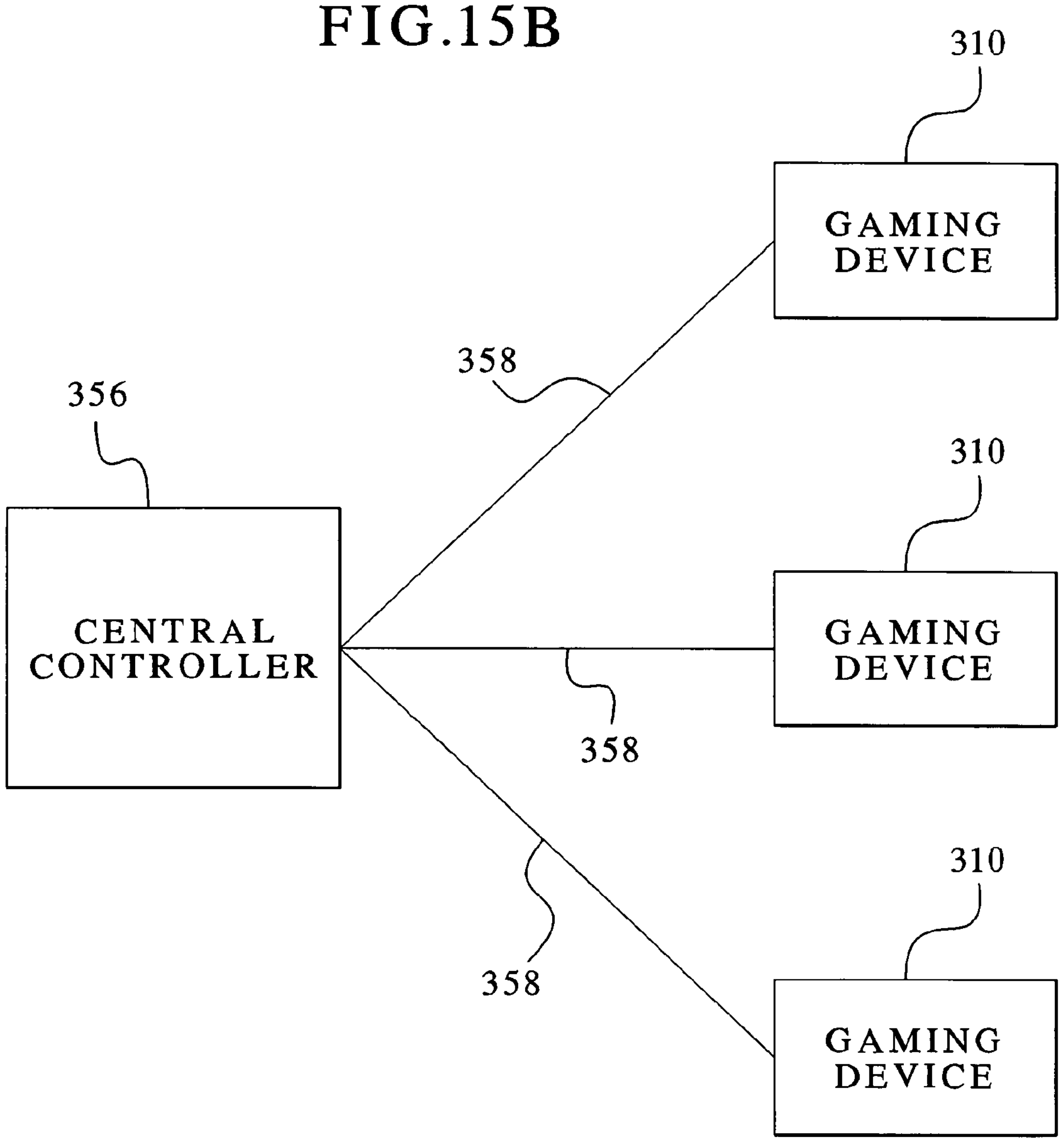
FIG. 15B is a schematic block diagram illustrating a plurality of gaming terminals in communication with a central controller.

In one embodiment, as illustrated in FIG. 15B, one or more of the gaming devices 310 of the present invention may be connected to each other through a data network or a remote communication link 358 with some or all of the functions of each gaming device provided at a central location such as a central server or central controller 356. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Figure 15C:
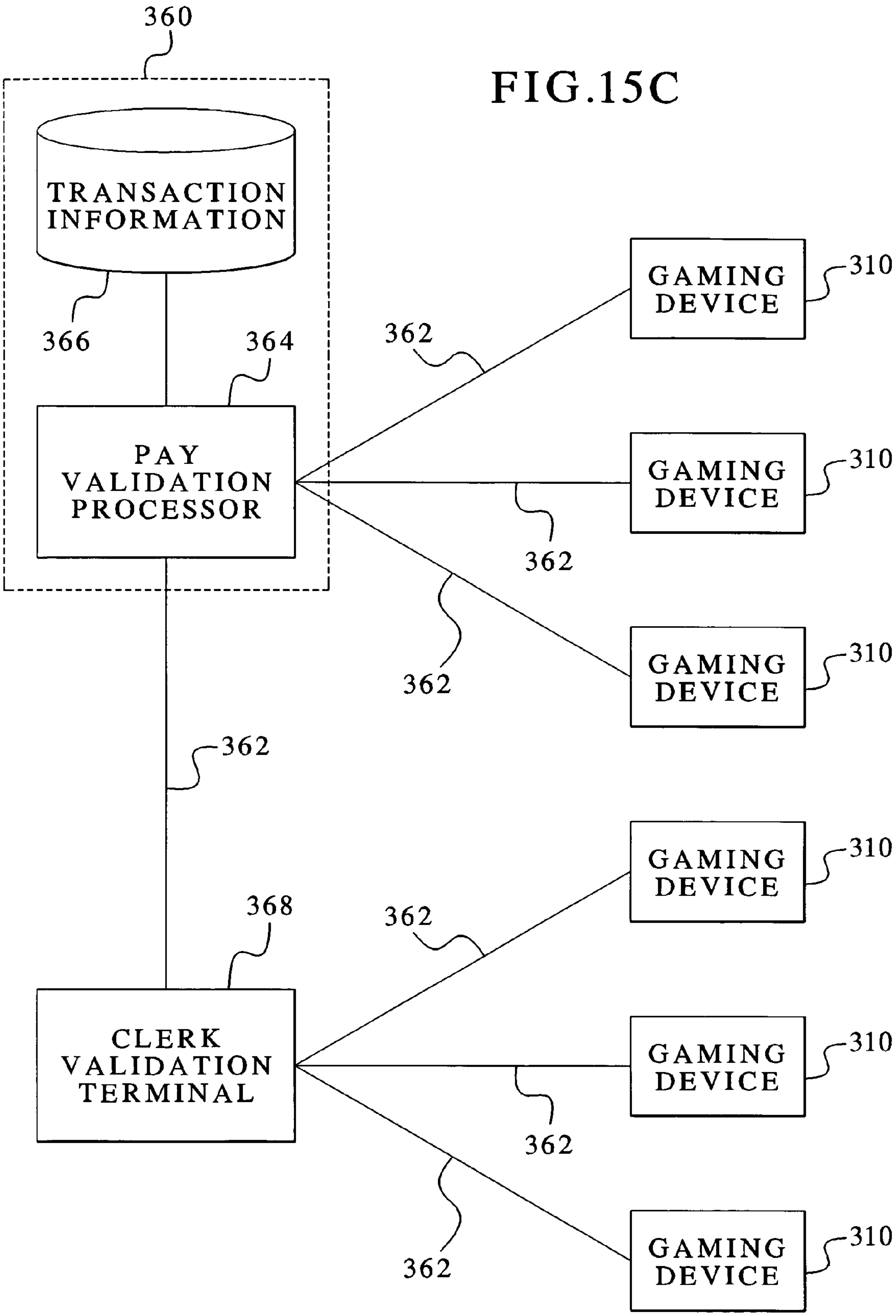
FIG. 15C is a schematic block diagram illustrating a plurality of gaming devices in communication with a pay validation system and a plurality of gaming devices in communication with a clerk validation termination which, in turn, is in communication with a pay validation system.

In another embodiment, as illustrated in FIG. 15C, one or more of the gaming devices 310 of the present invention are in communication with a pay validation system 360 through a network or a plurality of communication lines or channels 362. The pay validation system 360 can include any suitable system for tracking payment transaction information for the use of data cards 14 and 116 with gaming devices 310. In one embodiment, the pay system is similar to the commercially available pay system known as the EZ Pay™ cashless gaming system which is owned by the assignee of the present invention. In one embodiment, the pay validation system 360 includes a pay validation processor 364 in communication with one or more databases 366. The databases 366 store transaction information. In another embodiment, a plurality of gaming devices 310 are connected to one or more clerk validation terminals (CVT's) 368 through a suitable communication channel 362. Here, the CVT 368 is connected to the pay validation system 360 through a communication channel 362.

In operation of one example, a player may play a gaming device 310 using a data card, and when the player finishes playing the gaming device, the gaming device may provide the data card to the player with fund data corresponding to a balance of four hundred credit units, the equivalent of two hundred dollars. At this point, the gaming device transfers this fund data or information to the pay validation system 360. When the player goes to a CVT 368 to obtain the two hundred dollars, the CVT 368 compares the fund data on the data card to the fund data stored on the pay validation system 360 for that data card. If the fund data matches, the CVT 368 pays the player two hundred dollars. If the fund data does not match, the CVT 368 does not pay the player the two hundred dollars.

To illustrate the circulation of data cards in one embodiment of the present invention, in one example a player deposits a certain amount of currency or cash in a gaming device. The gaming device stores a supply of data cards. After receiving the currency, the gaming device processor transfers fund data associated with a balance of credit units to the gaming device memory. The gaming device enables the player to play the game with a possibility of experiencing credit gains and credit losses. As instructed by one or more programs in the gaming device, the gaming device processor tracks the number of credit gains and credit losses. If the player has no remaining credits or reaches a minimal level of credits, the gaming device processor will terminate the game and not dispense a data card to the player.

In another example, the player may insert a data card with fund data corresponding to a certain number of credit units into the gaming device to begin playing. The gaming device reads and writes to the data card to reflect the player's credit gain or loss. If the player ends the game with no credits, the gaming device may erase and retain the data card for future use.

In either example, if the player ends the game with a balance of credits, the processor of the gaming device, using the card read-write device, may update the fund data on the data card and then dispense that data card to the player. The player may then redeem the data card at a CVT or currency station for the amount of currency associated with the fund data remaining on that data card. In this manner data cards can be reset and reused repeatedly by different players.

V. Gaming Device Having Card Processing Assembly with Vertically-Stacked Card Holders Referring now to FIG. 16, in one embodiment, the present invention includes a gaming device 400 having a housing 402. The housing 402 supports: (a) a processor 404; (b) a display device 406 which displays a game to the player; (c) a card processing assembly 408 used to process data cards, such as data card 410; and (d) a card information indicator or card mouth display device 412 mounted to the housing 402 adjacent to the card processing assembly 408.

As best illustrated in FIGS. 17A, 17B, 17C and 18, the card processing assembly 408 includes: (a) a card mouth 414 which receives and dispenses data cards; (b) a card hopper, driver or transporter 416 which drives or moves the data cards from the card mouth 414 to the card holders 420 and 422; (c) a read-write device 419 which reads the machine-readable data on the data card 410 and also writes or stores machine-readable data onto the data card 410; and (d) a graphics print-erase device 421 which includes a heat source which directs heat onto the data card 410. This heat source causes graphics to appear on the data card 410, and the heat source also removes graphics from the data card 410.

In one embodiment, the read-write device 419 includes a data read device 419*a* and a data write or data storing device 419*b*. In one embodiment, the read-write device 419 includes a magnetized device that interfaces with a magnetic memory device on or in the data card 410. The read-write device 419 may include a memory device storing non-volatile memory for storing a transaction history of five hundred to ten thousand transactions or any suitable number of transactions.

It should be appreciated that the graphics print-erase device 421 can include a single mechanism that prints and erases cards or separate mechanisms, one of which prints and one of which erases. In one embodiment, the graphics print-erase device 421 includes a thermal graphics printer 421*a* and a separate thermal graphics eraser 421*b*.

Figure 18:
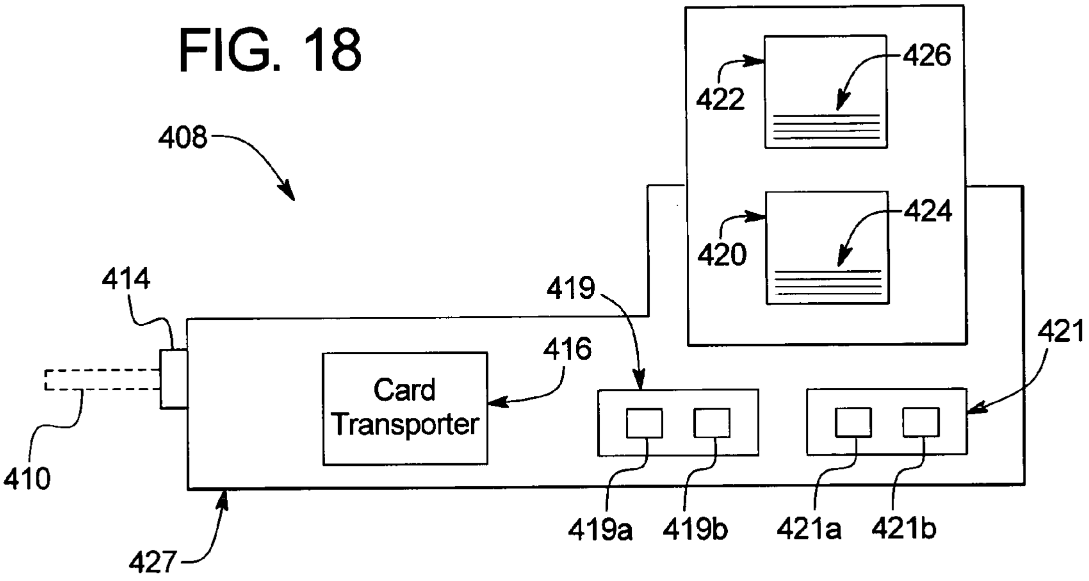
FIG. 18 is a schematic side elevation view of the card processing assembly in one embodiment of the present invention.

In the embodiment illustrated in FIG. 18, the card holder 420 holds acceptable quality data cards 424 which are useable, workable or otherwise satisfy a designated condition associated with an acceptable level of card integrity. The acceptable quality cards 424 include new data cards which have not been used, and the acceptable quality cards 424 can also include data cards which have been used but which have an acceptable level of integrity. Accordingly, the acceptable quality cards 424 are dispensable to players during operation of the gaming device 400.

The card holder 422 holds, supports or otherwise stores unacceptable quality data cards 426. The unacceptable quality cards 426 include data cards which do not meet a designated level of integrity. The unacceptable quality cards 426 may satisfy a plurality of card conditions, including, but not limited to, one or more of the following conditions:

a) Data card has been read a designated number of times;
b) Data card has been written to a designated number of times;
c) Data card has been thermally printed a designated number of times;
d) Data card has been thermally erased a designated number of times;
e) Data card has been used a designated number of times;
f) Data card has been tampered with or altered;
g) Data card has a flaw or defect;
h) Data card is unreadable by the gaming device processor; and
i) The intensity of the graphics printed by the print-erase device has been reduced by a designated percentage.

In one embodiment, the card processing assembly 408 includes a support member, frame or mount 427. The mount 427, which is connected to the housing 402, supports the card transporter 416, read-write device 419, print-erase device 421 and the card holders 420 and 422 in relatively close proximity to one another. As illustrated in FIG. 18, the card holders 420 and 422 are positioned or oriented in a vertically-stacked configuration. In the example illustrated, the card holder 422 is positioned above the card holder 420. In other embodiments not illustrated, the card holder 420 is positioned above the card holder 422. In additional embodiments not illustrated, the card holders 420 and 422 are off-set from one another. In this off-set configuration, one of the card holders is located above the other, but the card holders have different positions relative to a common x-axis.

Referring back to FIG. 16, in one embodiment, the housing 402 of the gaming device 400 has a greater degree of vertical space than horizontal space. The vertical configuration of the card processing assembly 408 enables the card processing assembly 408 to be relatively short in length. Accordingly, the card processing assembly 408 fits within the relatively small horizontal space of the housing 402.

Referring back to FIG. 17A, the card mouth display device 412 includes a suitable display screen, such as a liquid crystal diode (LCD) or organic light emitting diode (OLED) screen. The relatively small or miniature display device 412 displays images and graphics relating to the data card 410 used by the player. For example, the card mouth display device 412 can display an image or graphics which provides card usage instructions to the player, such as an "INSERT YOUR CARD BELOW" graphics 462.

Figure 17A:
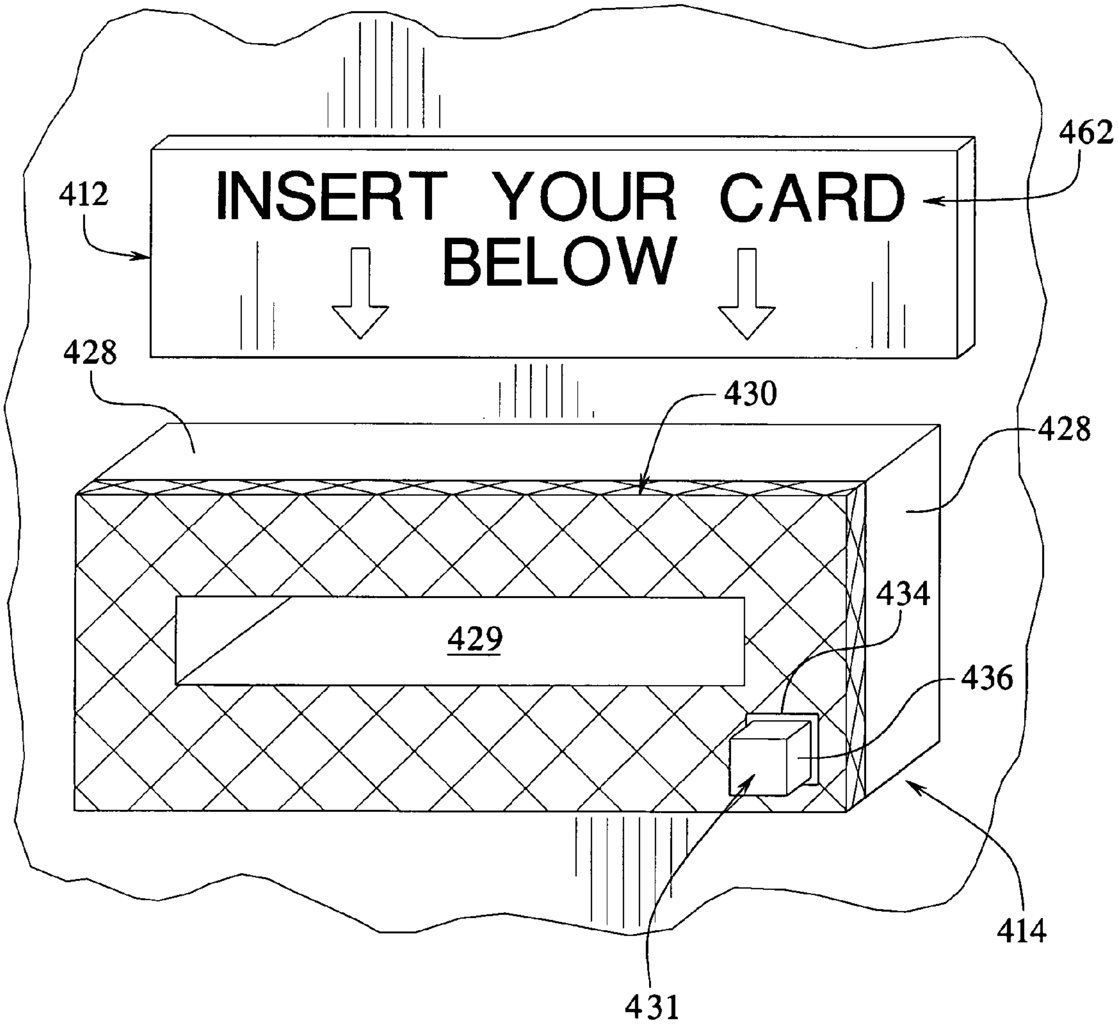
FIG. 17A is break-away expanded view of the card mouth and card mouth display device of the card processing assembly illustrating card usage graphics in one example of the present invention.
Figure 17B:
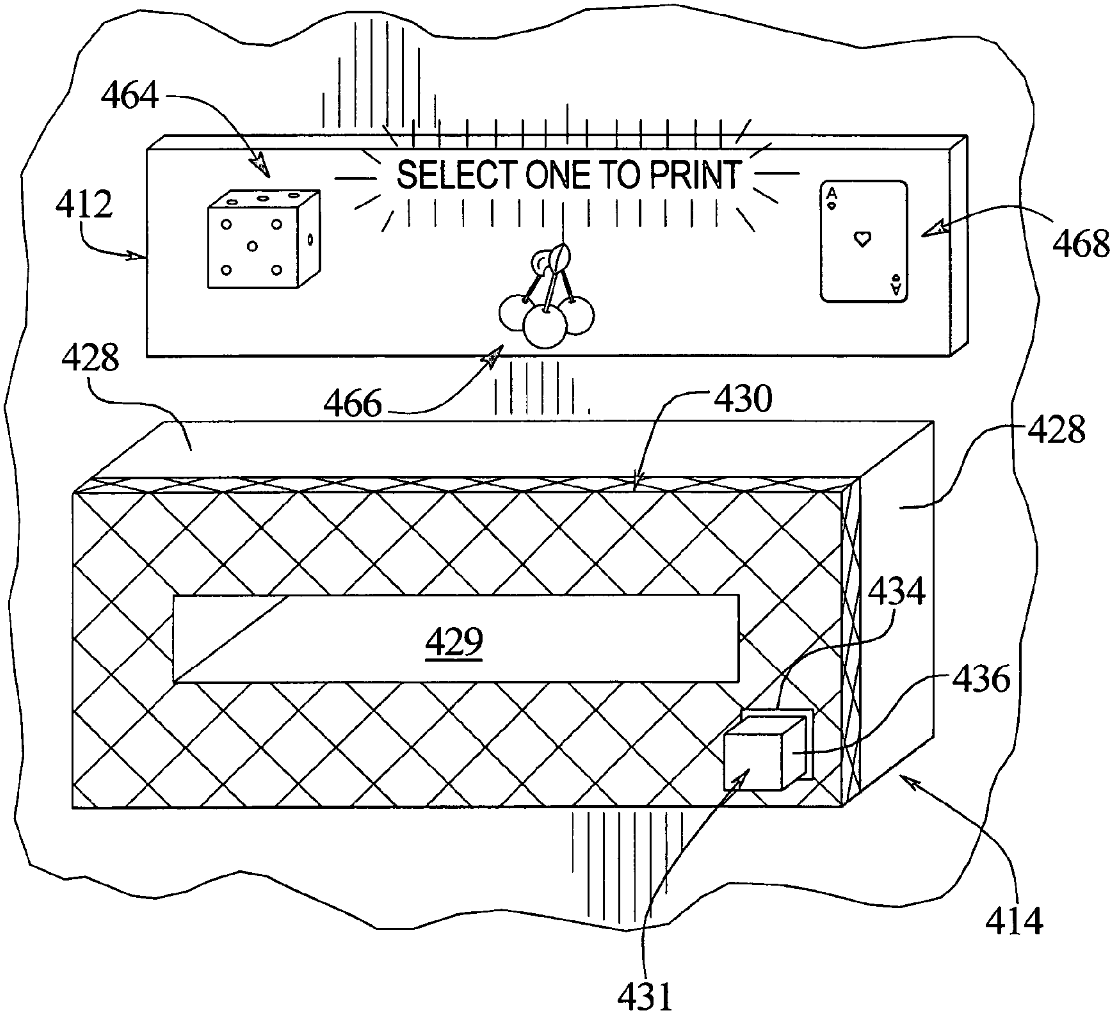
FIG. 17B is break-away expanded view of the card mouth and card mouth display device of the card processing assembly illustrating player-selectable printable graphics in one example of the present invention.

In one embodiment illustrated in FIG. 17B, the card mouth display device 412, as controlled by the processor 404, displays a plurality of different graphics, symbols or images 464, 466 and 468, each of which can be printed on the face 502 of the data card 410. By using one or more input device, such as buttons 470, the user can select a desired image 464, 466 or 468. If the user selects cherry image 466, the processor 404 causes the card processing assembly 408 to thermally print the selected cherry image 466 on the face 502 of the data card 410.

In this way, the processor 404 enables a player to print on the card 410, casino-specific or other graphics which are displayed by the card information indicator or card mouth display device 412. This enables players to customize their data cards 410. In one embodiment, the gaming device 400 has a memory device which stores the data represented by such player-selectable graphics, and the memory device stores such data apart from the computer code use by the processor 404 to control the read-write device 419.

Figure 16:
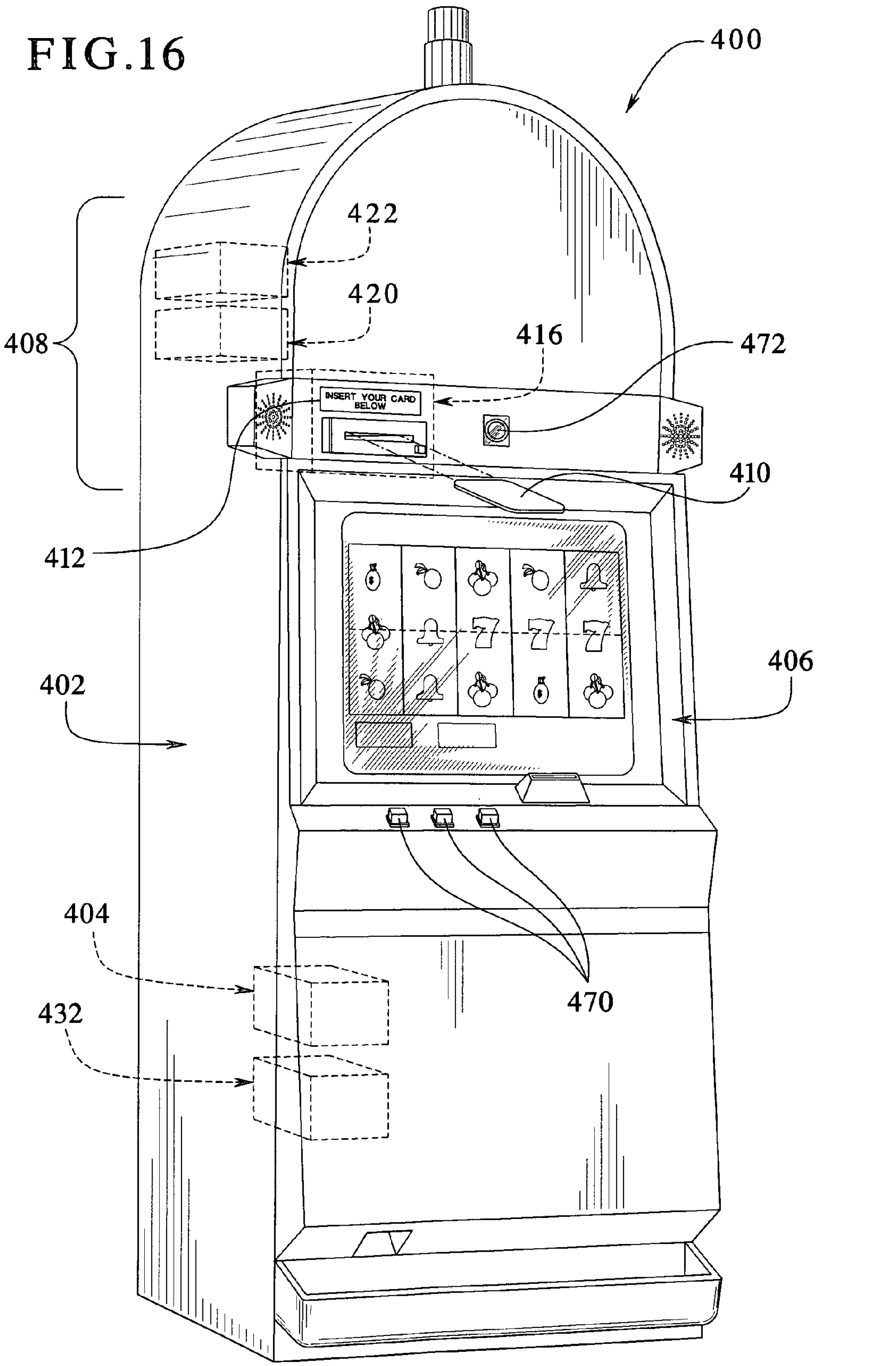
FIG. 16 is a perspective view of the gaming device having vertically-stacked card holders and a camera in one embodiment of the present invention.
Figure 17C:
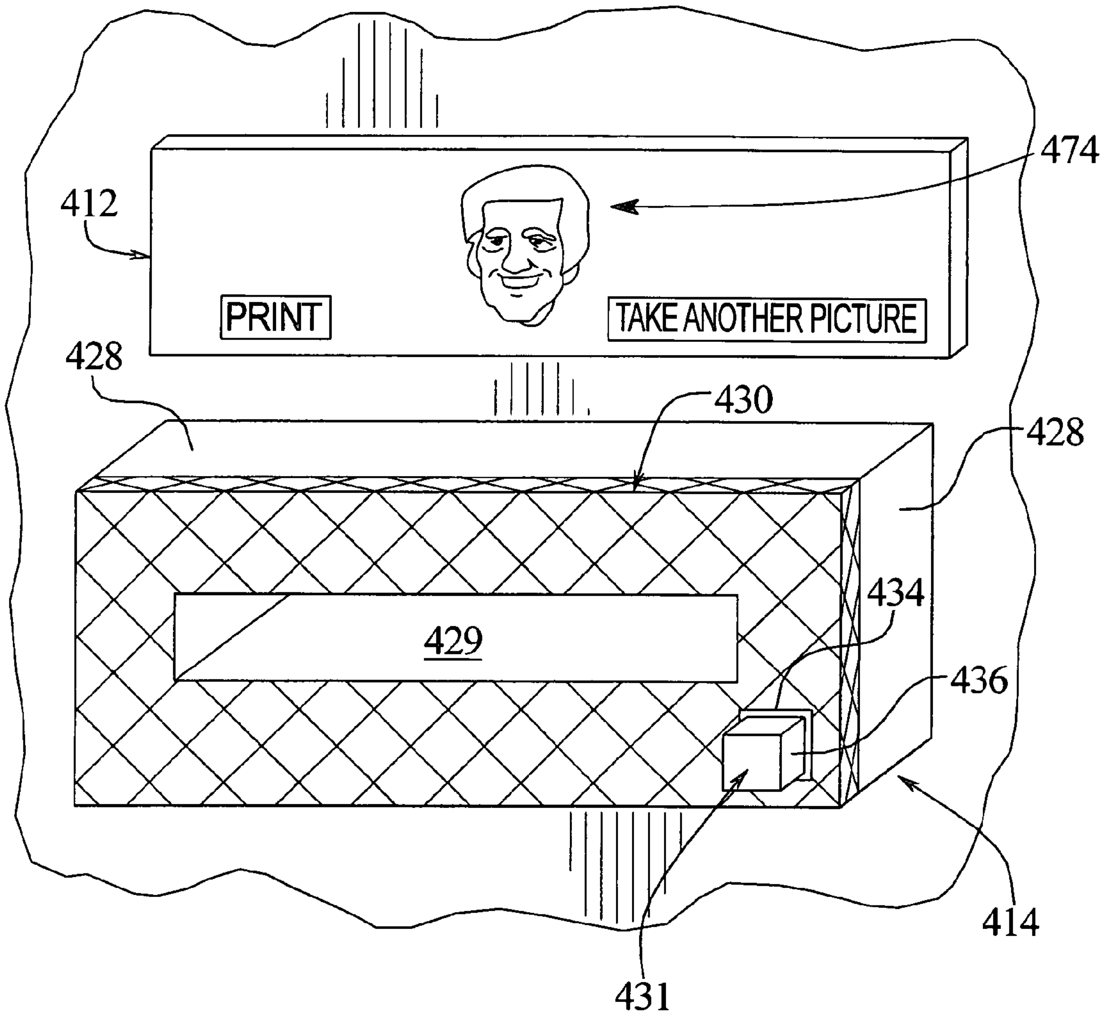
FIG. 17C is break-away expanded view of the card mouth and card mouth display device of the card processing assembly illustrating a printable photograph of the player in one example of the present invention.

In one embodiment illustrated in FIGS. 16 and 17C, the gaming device 400 includes a digital camera 472 controlled by the processor 404. Upon the player's request, through use of an input device, the camera 472 takes a picture of the player, producing a digital photograph 474 of the player. Then the card mouth display device 412 displays the player's photograph 474. If the player is not pleased with the photograph 474, the processor 404 enables the digital camera 474 to take another picture of the player. Upon the player's input, the processor 404 causes the card processing assembly 408 to thermally print the player's photograph 474 on the face 502 of the data card 410. It should be appreciated that the display device 406 can also be used to display part or all of one or more of the graphics 464, 466, 468 and 474.

The card mouth 414, in one embodiment, includes: (a) a plurality of walls 428 which define a slot 429; (b) an indicator 430 which indicates or signifies information, features or events to the player; and (c) an eject device 431 which enables the player to eject the data card 410 from the gaming device 400. The slot 429 has a length and width sufficient to enable the player to insert the card 410 into the card mouth 414.

The indicator 430, sometimes referred to as a lighted bezel, produces a plurality of different visual effects viewable by the player. In one embodiment, the indicator 430 has a plurality of connected panels forming a rectangular shape, and the indicator 430 surrounds the perimeter of the slot 429. The indicator 430 can produce one visual effect when the gaming device is in attract mode, and the indicator 430 can produce a different visual effect when a game is being played. In one embodiment, the gaming device 400 includes one or more light sources, such as light source 432. The light source 432 directs light toward the indicator 430. This light causes the indicator 430 to illuminate with different colors when different events occur. The different colors may result from different colors of light produced by the light source 432. One embodiment of the indicator 430 is disclosed in U.S. Pat. No. 6,565,434.

In one embodiment, the indicator 430 includes a wall 434 defining an opening that receives a depressible activator or eject button 436. When the player depresses the button 436, the card processing assembly 408 dispenses a data card to the player. In one embodiment, the memory device of the gaming device 400 stores data associated with a plurality of different designated visual effects, and each of the visual effects is associated with a different event. For example, the different visual effects can be associated with an attract mode event, a card insert event, a game start event, a winning outcome event, a game end event, a cash-out event and a card eject event. When the player inserts the card 410, the indicator 430 may, for example, produce a green light, and when the player depresses the depressible activator 436, the indicator 430 may, for example, produce a flashing red light.

Figure 19:
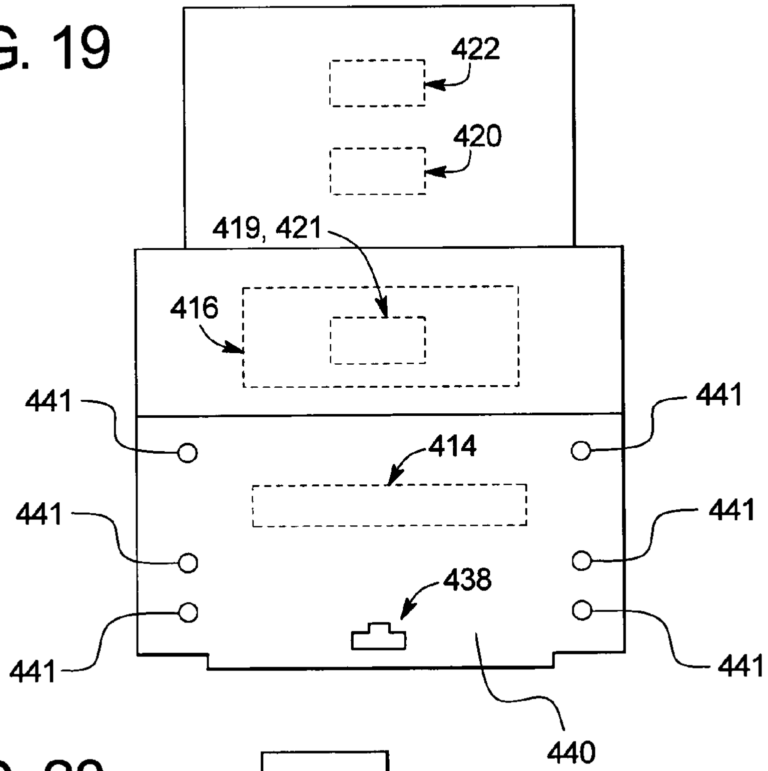
FIG. 19 is a schematic rear elevation view of the card processing assembly in one embodiment of the present invention.
Figure 20:
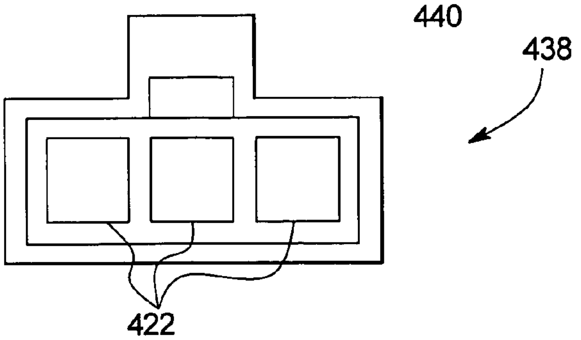
FIG. 20 is a schematic front elevation view of the pin connector of the card processing assembly in one embodiment of the present invention.

As illustrated in FIGS. 19 and 20, the card processing assembly 408 also includes an electronic or electrical connector or pin connector 438. The pin connector 438 is attached to the rear side 440 of the card processing assembly 408. The rear side 440 defines a plurality of holes 441. The holes 441 are sized to receive a plurality of fasteners (not shown) which connect the card processing assembly 408 to the housing 402 of the gaming device 400.

As best illustrated in FIG. 20, the pin connector 438, in one embodiment, includes three pin walls 422 which define holes to receive three electronic or electrical pins (not shown). It should be appreciated, however, that in other embodiments, the pin connector 438 can include any suitable number of pin walls.

Figure 21:
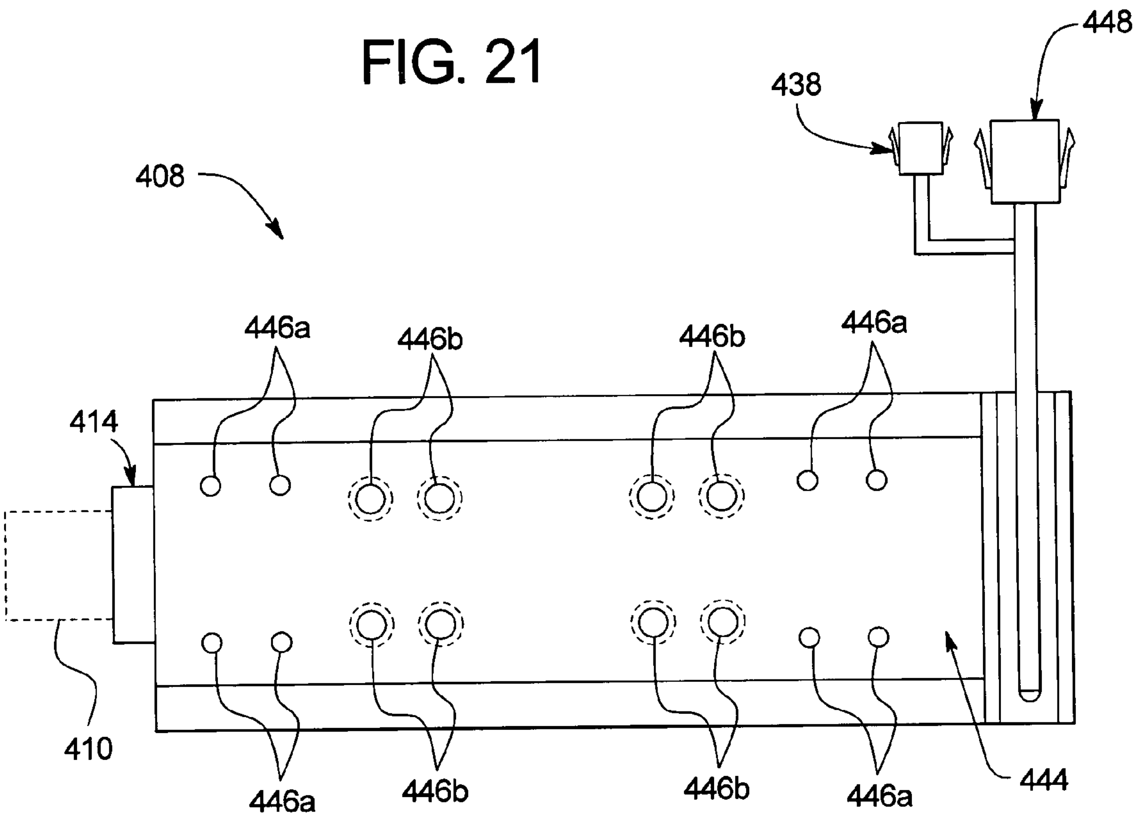
FIG. 21 is a schematic bottom view of the card processing assembly in one embodiment of the present invention.
Figure 22:
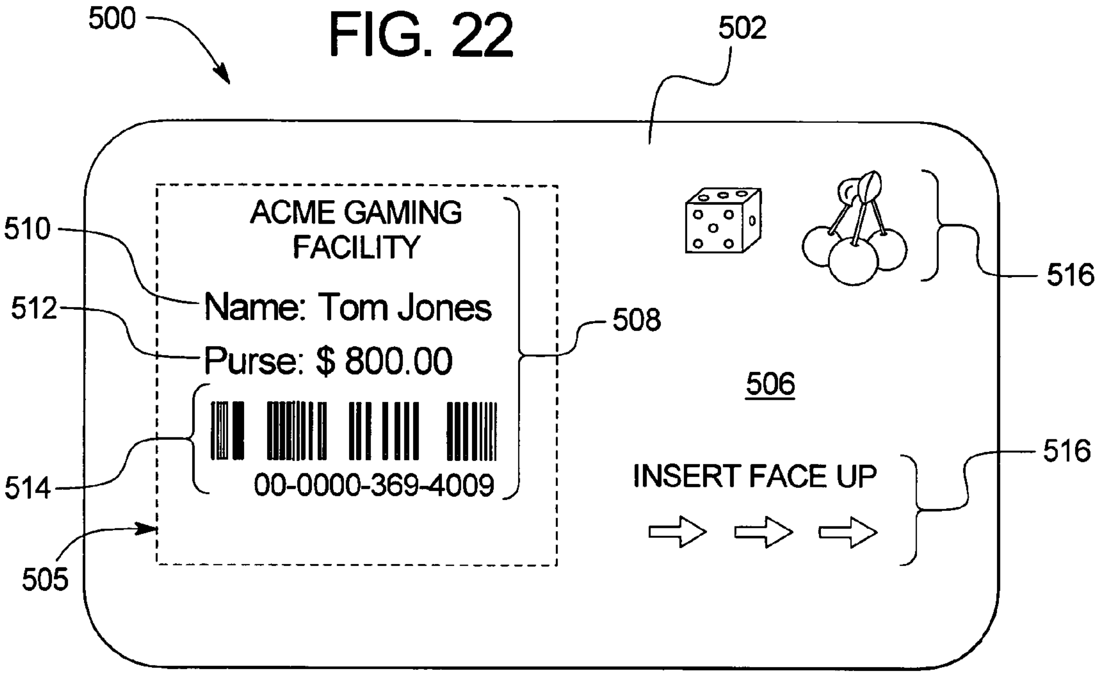
FIG. 22 is a top plan view of the thermally-printable data card in one embodiment of the present invention.

As illustrated in FIG. 21, the under side 444 of the card processing assembly 408 defines a plurality of holes 446*a* and 446*b*. The holes 446*a* and 446*b* are sized to receive a plurality of fasteners (not shown) used to mount the card processing assembly 408 to the housing 402 of the gaming device 400. The card processing assembly 408 also includes an additional electronic connector or pin connector 448. In this embodiment, the pin connector 448 includes eight or twelve pin walls (not shown) to receive eight or twelve electronic or electrical pins (not shown). It should be appreciated, however, that the pin connector 448 can includes any number of pin walls. The connectors 438 and 448 electronically or electrically couple the card processing assembly 408 to the processor 404 of the gaming device 400.

VI. Data Card With Thermally-Printable Area

Referring to FIGS. 22 through 27, in one embodiment, the present invention includes a thermally-printable data card 500 having an upper side or face 502, a back side or underside 504 and a body 507 positioned between the face 502 and underside 504. The thermally-printable data card 500 includes at least one thermally active or thermally printable region, member, zone or area 505 and at least one non-thermally printable region, member, zone or area 506. In operation, the card processing assembly 408 thermally prints thermal graphics 508 on or at the thermally printable area 505. The thermal graphics 508 can include any text, image, art or symbol. The thermal graphics 508 represents or describes changeable player information, player-tracking information, gaming information or gaming-related information. In the embodiment illustrated in FIG. 22, the thermal graphics 508 include player-related text 510 identifying the player's name or identity, payout-related text 512 identifying the purse value or redemption value of the card 500 and bar code graphics

514. The bar code graphics 514 includes a bar code which is associated with the redemption value of the card 500 which, in this example, is eight hundred dollars.

It should be understood that the present invention is usable by casinos which have not yet fully converted from bar code ticket systems to the data card system of the present invention. The bar code graphics 514, which are associated with the redemption value of the card, enable such casinos to continue using bar code readers for redemption purposes. This is because, in one embodiment, the card processing assembly 408 updates the thermally-printed bar code graphics 514 upon each use of a data card. Therefore, after the gaming device dispenses a data card to the player, the casino's bar code reader can determine the redemption value of the card by reading the bar code graphics 524.

Figure 24:
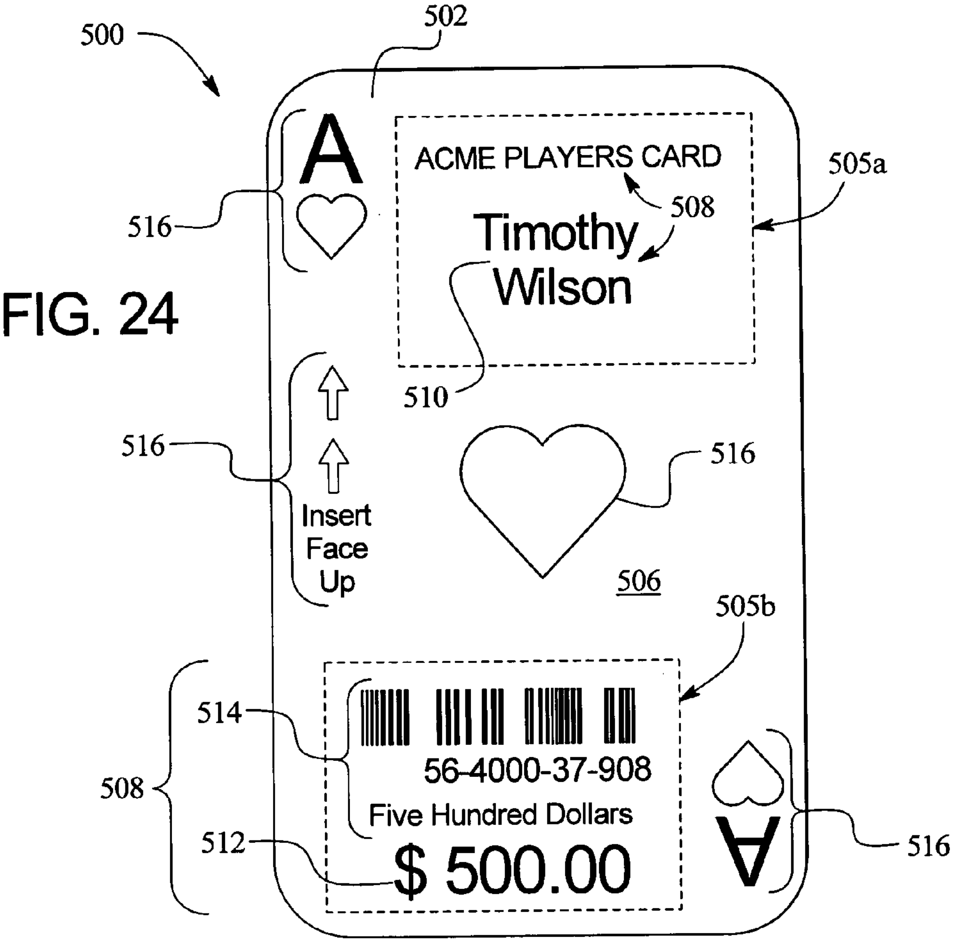
FIG. 24 is a top plan view of the thermally-printable data card illustrating multiple thermally-printable areas in one embodiment of the present invention.

Referring now to FIG. 24, the non-thermally printable member or area 506 includes gaming-related graphics 516 which, in this example, include gaming-related artwork and card insertion information. In the illustrated example, the graphics 516 include the representation or image of a conventional playing card. The graphics 516, in one embodiment, are permanent graphics which are preprinted on the card in the card manufacturing stage. The graphics 516 can be produced with a permanent printing substance such as ink, paint or dye.

Figure 23:
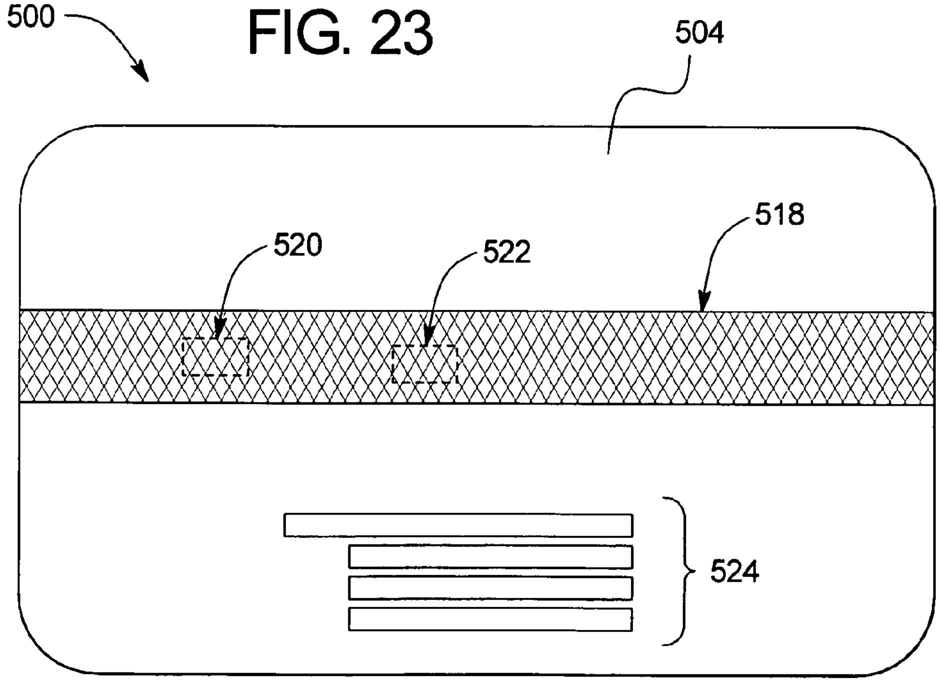
FIG. 23 is a bottom view of the thermally-printable data card illustrated in FIG. 22.
Figure 25:
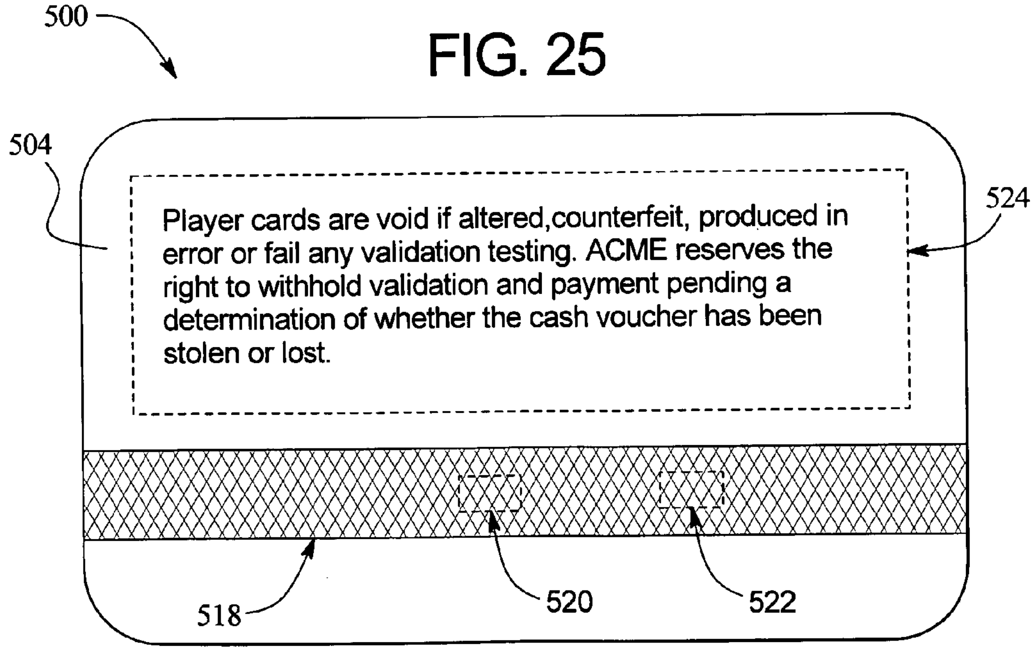
FIG. 25 is a bottom view of the thermally-printable data card illustrated in FIG. 24.

As illustrated in FIGS. 23 and 25, the card 500 also includes a data device 518. The data device 518 stores machine-readable data. The data device 518 also enables the card processing assembly 408 to read machine-readable data from the card and store machine-readable data 520 to the card. In one embodiment, the data device 518 includes a magnetic data device or magnetic interface 522 that stores payout-related information, enables the reading of data on the data card and enables the writing of data to the data card. As in the example illustrated in FIGS. 23 and 25, the data device 518 can be visible on the underside 504 of the card 500. It should be appreciated, however, that in other embodiments, the data device 518 is positioned between the face 502 and underside 504 of the card 500. In such embodiment, the data device 518 is not exposed or visible. The data card 500 may include text 524 printed on the underside 504 of the card 500. This text 524 may relate to legal disclaimer language, card usage information, restrictions of use or other suitable user information.

It should be appreciated that the data card of the present invention can include multiple thermally-printable members or areas. Referring back to FIG. 24, in one embodiment, the data card 500 includes thermally-printable area 505*a* and thermally printable area 505*b*. In this example, both of these areas 505*a* and 505*b* display thermal graphics on the face 502 of the data card 500.

Figure 26:
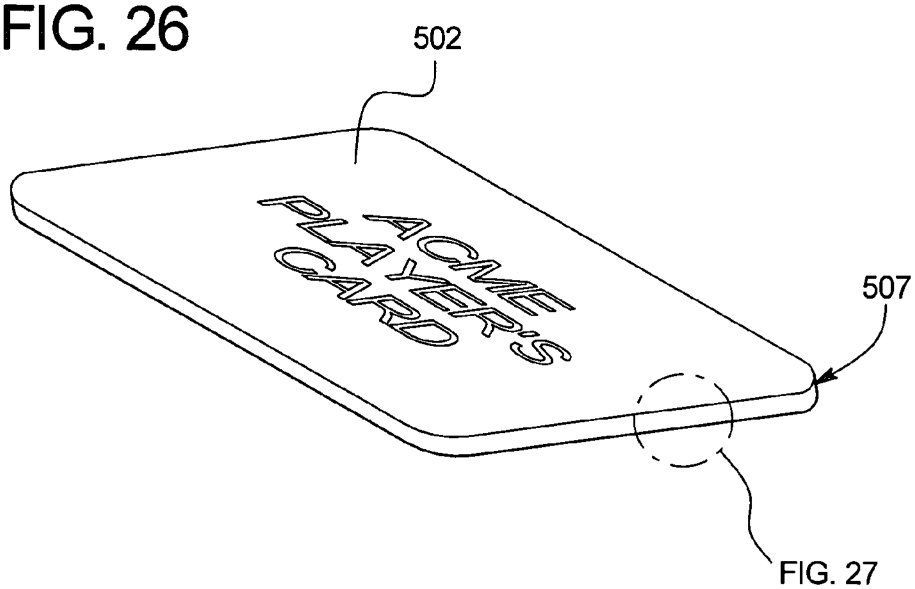
FIG. 26 is a perspective view of the thermally-printable data card in one embodiment of the present invention.
Figure 27:
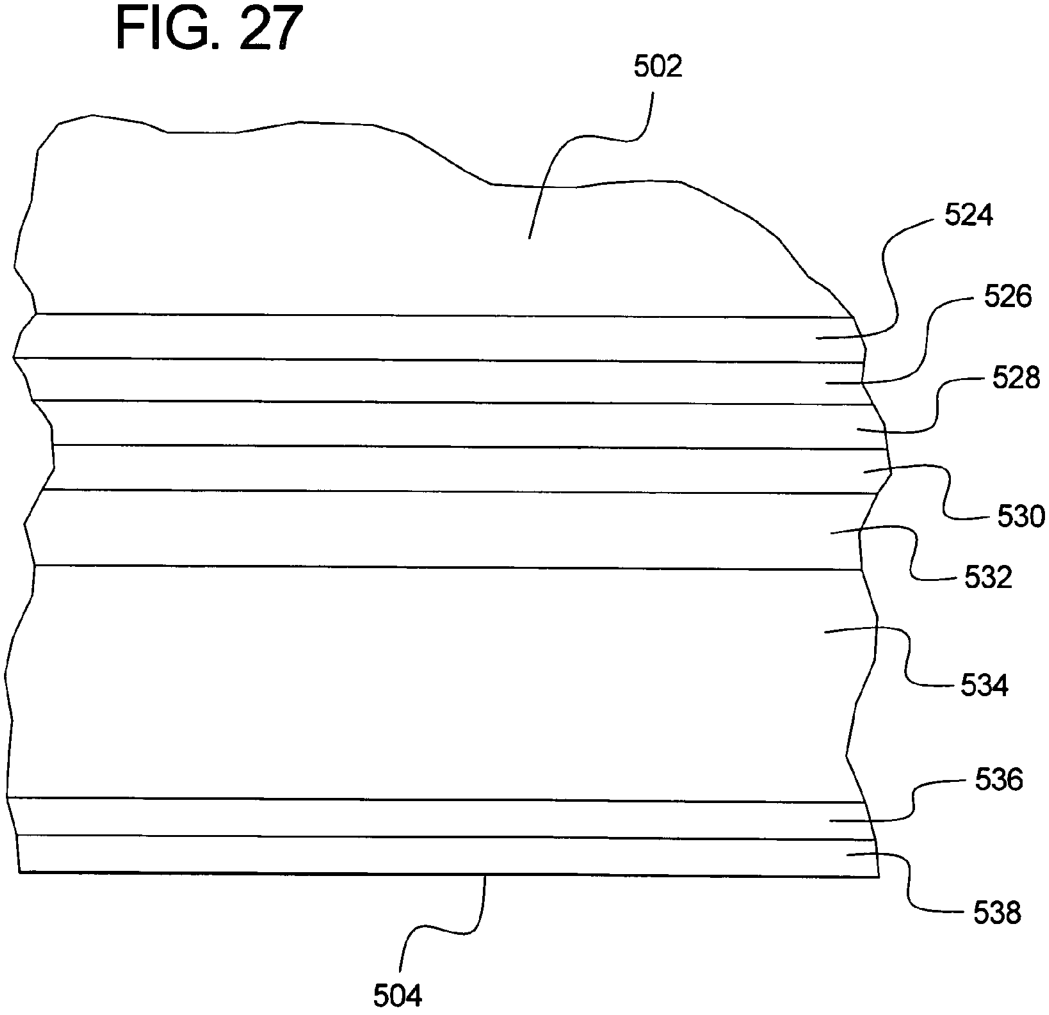
FIG. 27 is a break-away expanded view of the body of the thermally-printable data card of FIG. 26.

As illustrated in FIGS. 26 and 27, the body 507 of the data card 500, in one embodiment, includes: (a) a protection member or layer 524 (having a thickness of two micrometers plus or minus one micrometer); (b) a printing member or layer 526 (for preprint purposes, such as black); (c) a thermal printing member or layer 528 (having a thickness of five to eight micrometers); (d) an insulation member or layer 530 (having a thickness of two micrometers plus or minus one micrometer); (e) a magnetic member or layer 532 (having a thickness of fifteen micrometers plus or minus two micrometers); (f) a polyethylene terephthlate (PET) member or layer 534 (having a thickness of one hundred eighty-eight to two hundred fifty micrometers); (g) a printing member or layer 536 (preferably including multi-color or dye sublimation having a thickness of two micrometers plus or minus one micrometer); and (h) a protection member or layer 538 (having a thickness of two micrometers plus or minus one micrometer).

In one embodiment, the data card 500 includes one of the re-writable cards, such as the TC Card™, which is commercially available through Ricoh Co., Ltd or one of its subsidiaries or affiliates, including, but not limited, to Ricoh Electronics Inc.

In another embodiment, the data card 500 includes one of the embodiments of the rewriteable card disclosed in U.S. Pat. Nos. 5,448,284; 5,448,280 and/or 5,448,279.

In one embodiment, the data card 500 includes one of the thermally-printable cards, such as the Kudos Card™, which is commercially available through Mitsubishi Plastics, Inc. or one of its subsidiaries or affiliates.

As described above, in one embodiment, the data card includes a ticket, consists of a ticket or otherwise has the configuration of a ticket. Here, the tickets 14, 14*a*, 14*b*, 14*c*, 116, 206, 410 and 500 each have the components and functionality described herein with respect to data cards 14, 14*a*, 14*b*, 14*c*, 116, 206, 410 and 500, respectively.

VI. Data Card Changeover

A. Card Changeover Door

Figure 29:
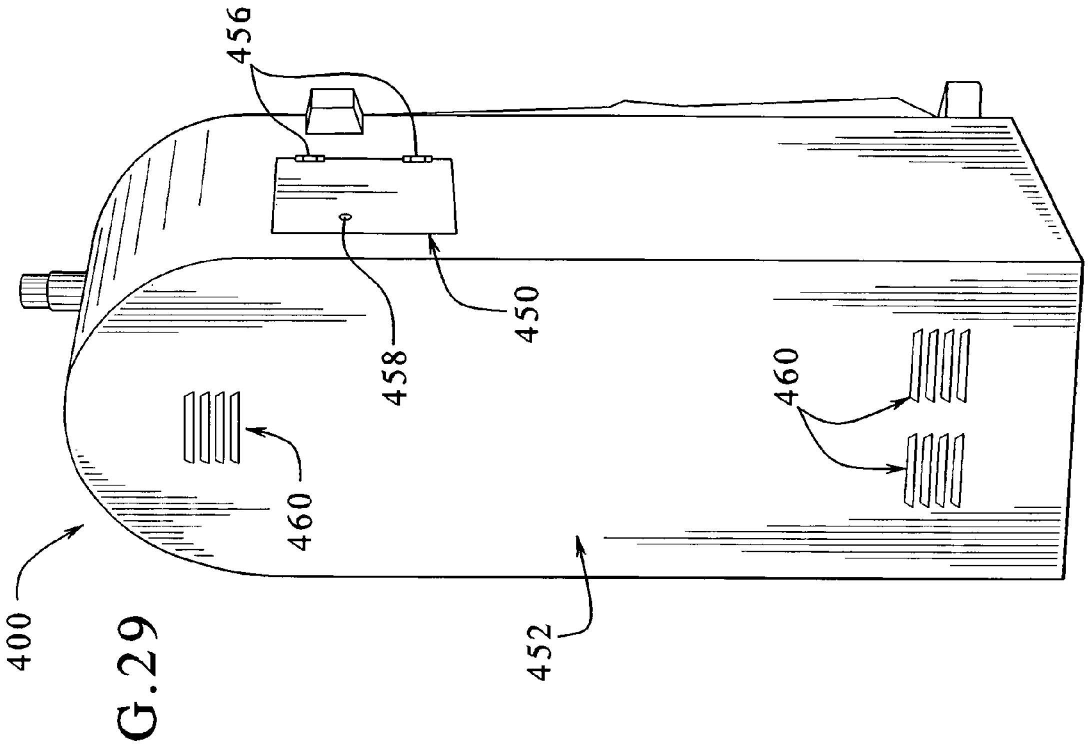
FIG. 29 is a perspective view of the gaming device illustrating the card changeover device at the side of the gaming device in one embodiment of the present invention.
Figure 28:
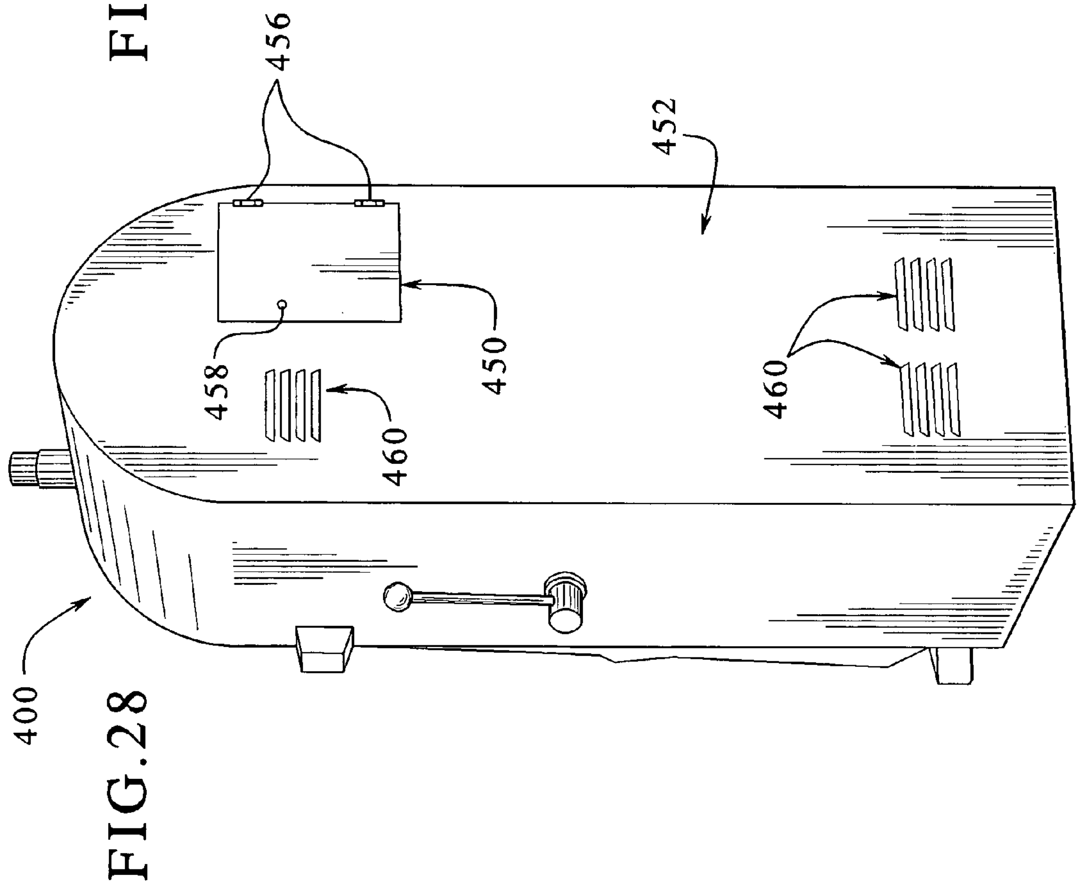
FIG. 28 is a perspective view of the gaming device illustrating the card changeover device at the rear of the gaming device in one embodiment of the present invention.

Referring to FIGS. 28 and 29, in one embodiment, the gaming device 400 includes an access device, access panel, card changeover device or door 450 connected to the housing 402. The door 450 is connected to the rear side 452 of the housing 402, as illustrated in FIG. 28. In another embodiment, the door 450 is connected to the left side 454 of the housing 402. In each embodiment, the door 450 is positioned adjacent to the card holders 420 and 422 of the data card assembly 408. In operation, the door 450 enables an operator to: (a) replace the card holders 420 and 422 with either a replacement card holder holding new data cards or an empty card holder; or (b) insert additional cards into the card holder 420 and remove the unacceptable quality cards from the card holder 422. In one embodiment, the door 450 includes: (a) one or more coupling members, such as tracks or hinges 456, which couple the door 450 to the housing 402; and (b) one or more mechanisms or members 458 (including, but not limited to, grip members, handles and locks) which facilitate the operator's opening, closing and locking of the door 450. It should be understood that the rear side 452 can include other doors and openings, such as the vents 460. In one embodiment, the card changeover device enables the user to load into the gaming device, approximately three hundred cards, from outside of the gaming device, within approximately sixty seconds.

B. Portable Card Changeover Machine

Figure 30:
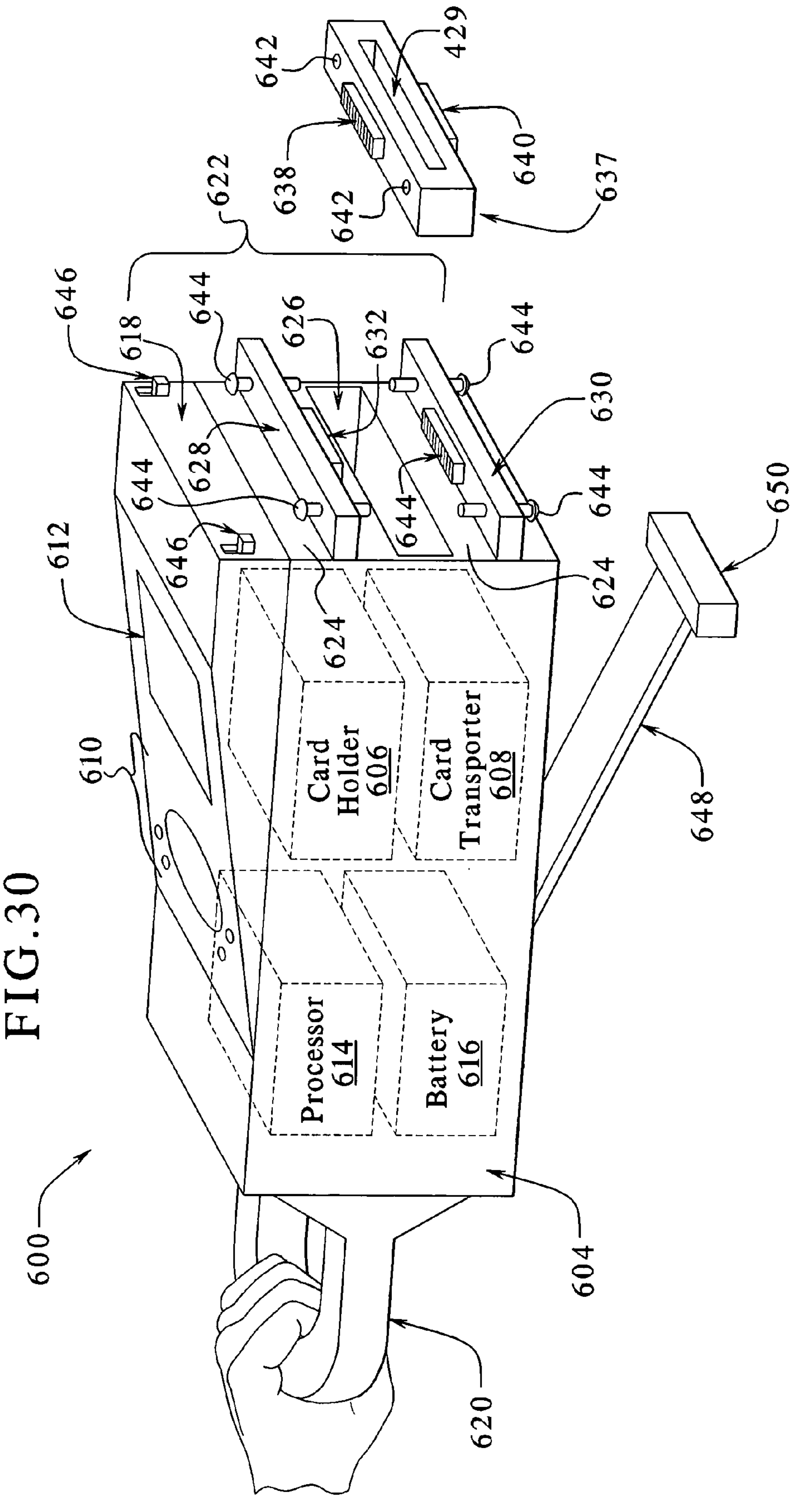
FIG. 30 is a side elevation perspective view of the portable card changeover machine in one embodiment of the present invention.
Figure 31:
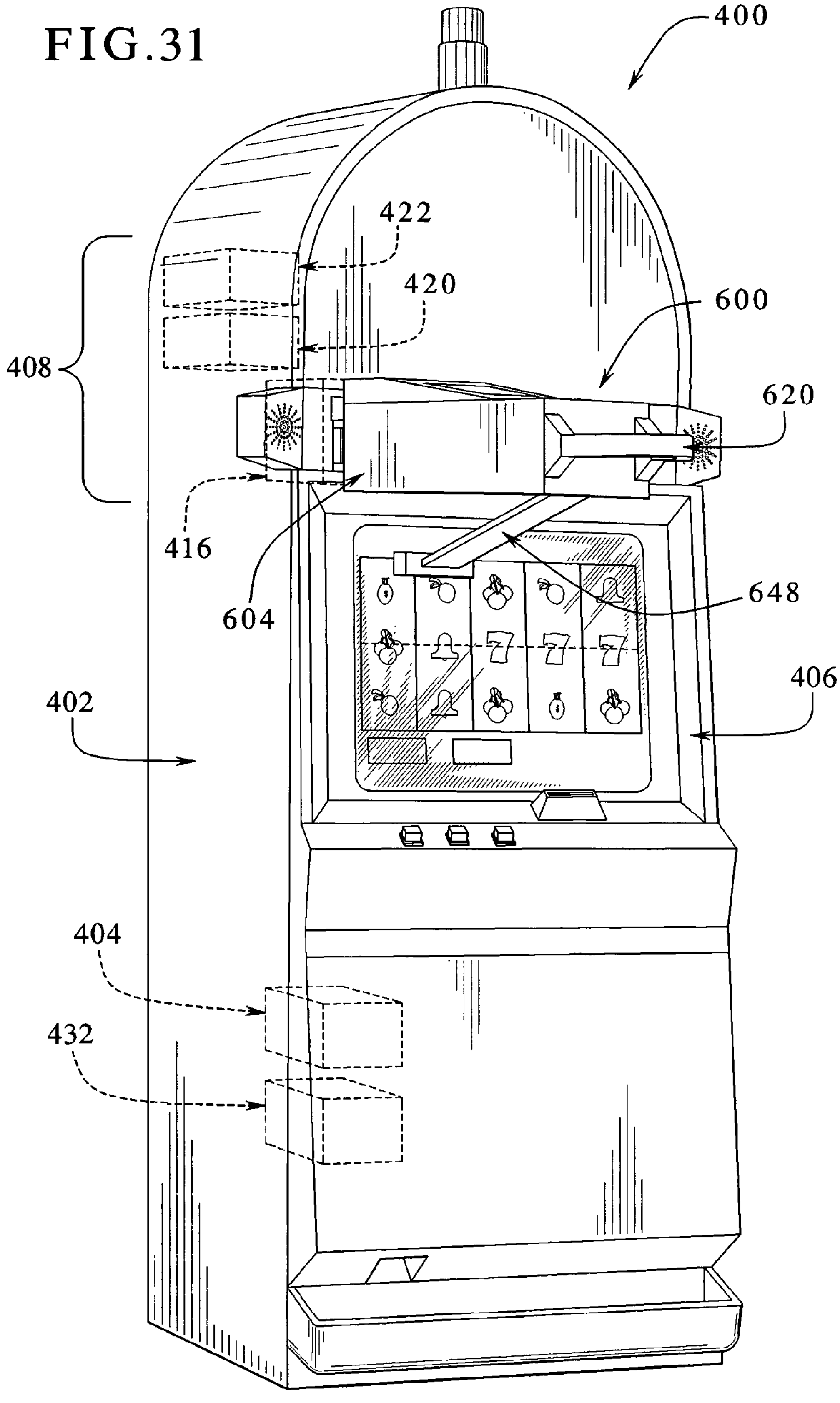
FIG. 31 is a perspective view of the gaming device illustrating the portable card changeover machine removably attached to the gaming device in one embodiment of the present invention.

Referring now to FIGS. 30 and 31, in one embodiment, the present invention includes a portable card changeover machine 600 to be used in conjunction with the gaming device 602. The card changeover machine 600 includes: (a) a housing 604; (b) at least one card holder 606 positioned within the housing; (c) at least one drive mechanism or card transporter 608 used to dispense and retrieve data cards; (d) at least one input device 610 enabling the operator to provide input signals for operating the card changeover machine 600; (e) at least one output device 612 which provides visual and/or audio output to the operator; (f) a processor 614 in control of the card transporter 608, input device 510 and the output device 612; (d) a battery power source 616, preferably rechargeable, which provides electrical power to the card transporter 608, input device 610, the output device 612 and the processor 614; (e) an access device or panel 618 which enables the operator to access the card holder 606; (f) a hand grip member or handle 620 which assists the operator in griping, holding or supporting the card changeover machine 600; and (g) a mouth 622 which enables the card changeover machine 600 to communicate with the gaming device processor 404, distribute cards to the gaming device and receive cards from the gaming device.

In one embodiment, the mouth 622 includes: (a) a plurality of walls 624 which define a card slot 626; (b) upper and lower gaming device engagement members 628 and 630, respectively, which removably engage the card mouth 637 of the gaming device 602; (c) upper and lower electronic or electrical connectors 632 and 634, respectively, which operatively couple the card changeover machine 600 to the processor 404 of the gaming device 602; and (d) a plurality of securing members or fasteners 644 which enable the operator to removably connect the card changeover machine 600 to the gaming device 602.

Referring to FIG. 31, in one embodiment, the card mouth 637 of the gaming device 602 includes: (a) an upper electronic or electrical connector 638 which removably mates with or connects to the connector 632 of the card changeover machine 600; (b) a lower electronic or electrical connector 640 which removably mates with or connects to the connector 644 of the card changeover machine 600; and (c) a plurality of walls 642 which engage with the fasteners 644 of the card changeover machine's mouth 622.

In one embodiment, the card changeover machine 600 includes a plurality of securing members or fasteners 646 connected to the access panel 618 or the housing 604. The fasteners 646 enable the operator to attach the access panel 618 to the housing 604 in order to enclose the card holder 606. In addition, the fasteners 646 enable the operator to detach the access panel 618 from the housing 604 in order to gain access to the card holder 606.

In one embodiment, the card changeover machine 600 includes a support member, such as a pivotal leg 648 having a gaming device engagement pad or member 650. The leg 648 is movable between a first position where the engagement member 650 is positioned adjacent to the housing 604 and a second position where the engagement member 650 is displaced from the housing 604.

In operation, the processor 404 produces an alert signal which indicates a designated card depletion level of the card holder 420 or a designated card level of the card holder 422. In response, the operator opens the access panel 618 and fills the card holder 606 with a supply of acceptable quality data cards. Next, the operator attaches the mouth 622 to the mouth 637 of the gaming device 602. In doing so, the operator brings the card changeover machine 600 into electronic communication with the processor 404 of the gaming device 602. Then, the operator downwardly pivots the leg 648 until the engagement member 650 engages the housing 402 of the gaming device 602. In this position, the leg 648 distributes part of the weight of the card changeover machine 600 to the gaming device 602.

After making designated inputs using the input device 610, the card changeover machine automatically distributes a plurality of acceptable quality cards to the card holder 420 of the gaming device 602. When this distribution is complete, the gaming device 602 automatically dispenses all of the unacceptable quality cards from the card holder 422 to the card changeover machine 600. In one embodiment, the card changeover machine enables the operator to automatically load into the gaming device, approximately three hundred cards, from outside of the gaming device, within approximately sixty seconds.

The portable card changeover machine of the present invention assists operators in automatically retrieving unacceptable quality cards from gaming devices, and the card changeover machine also assists operators in automatically filling gaming devices with new cards or acceptable quality cards. Because the card changeover machine is portable and relatively convenient to use, the card changeover machine increases the efficiency of operating and maintaining gaming devices which use data cards.

The gaming device of the present invention can receive, read, update, reset, erase and house a plurality of data cards which are adapted to circulate through a plurality of gaming devices and which can be used repeatedly by multiple players on multiple occasions. The data cards usable by the gaming device can be reset or returned to a blank state or a face value state on multiple occasions. Instead of the data cards being limited to use by a single player, much like currency, any player can use them. This type of gaming device provides gaming device players and gaming enterprise operators with a greater level of convenience and ease in playing gaming devices and managing gaming facilities, respectively.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention claimed is:

1. A portable card changeover machine comprising:

a housing;

at least one portable card changeover machine card holder supported by the housing and configured to hold a plurality of data cards at one time;

a mouth including a slot sized to receive and dispense each of said data cards;

at least one gaming device securing member supported by the housing adjacent to said mouth, said gaming device securing member configured to removably secure the housing to a gaming device, the gaming device having a gaming device processor and at least one gaming device card holder configured to hold a plurality of the data cards at one time;

a card transport device supported by the housing;

a portable card changeover machine processor;

at least one data interface device configured to operatively couple said portable card changeover machine processor to the gaming device processor;

a battery power source configured to provide power to the portable card changeover machine processor and the card transport device; and at least one memory device which stores a plurality of instructions which, when executed by the portable card changeover machine processor, cause the portable card changeover machine processor to communicate with the gaming device processor while the housing is secured to the gaming device and to operate with the at least one portable card changeover machine card holder and the card transport device to:

(a) receive at least one of the data cards from the at least one gaming device card holder, and (b) distribute at least one of the data cards from the at least one portable card changeover machine card holder to the at least one gaming device card holder.

2. The portable card changeover machine of claim 1, wherein at least one of the at least one portable card changeover machine card holder is configured to hold data cards to be received from the at least one gaming device card holder.

3. The portable card changeover machine of claim 1, wherein at least one of the at least one portable card changeover machine card holder is configured to hold data cards to be distributed to the at least one gaming device card holder.

4. The portable card changeover machine of claim 1, wherein the mouth includes at least one wall configured to engage a gaming device card mouth.

5. The portable card changeover machine of claim 1, wherein the data interface device includes at least one electronic connector configured to connect to an electronic connector of the gaming device.

6. The portable card changeover machine of claim 1, which includes an access wall supported by the housing, the access wall movable between a plurality of positions so as to facilitate replacement of the data cards received from the at least one gaming device card holder.

7. The portable card changeover machine of claim 1, which includes at least one input device operatively coupled to the portable card changeover machine processor, the input device configured to enable a user to provide inputs to control operation of the card transport device.

8. The portable card changeover machine of claim 1, which includes at least one output device operatively coupled to the portable card changeover machine processor, the output device configured to provide a user with audio or visual outputs associated with the operation of the card transport device.

9. The portable card changeover machine of claim 1, which includes at least one hand grip member supported by the housing.

10. The portable card changeover machine of claim 1, which includes at least one support member connected to the housing, the support member including a gaming device engagement member, the support member configured to transfer a portion of weight of the portable card changeover machine to the gaming device.

11. A gaming device comprising:

a processor;

a housing;

a card management assembly supported by the housing and including:

(a) at least one card processing assembly including:

(i) a data read device configured to read machine-readable data on a plurality of data cards, and (ii) a data storing device configured to store machine-readable data on the data cards, (b) a card transporter configured to transport the data cards, (c) a first card holder configured to:

(i) receive a plurality of the data cards, and (ii) store a plurality of the data cards at one time, and (d) a second card holder positioned above or below the first card holder and configured to:

(i) receive a plurality of the data cards, and (ii) store a plurality of the data cards at one time;

a card mouth supported by the housing and including:

(a) a plurality of walls supported by the housing and defining a slot sized to receive and dispense one of the data cards, and (b) at least one connector supported by the housing and configured to electronically couple a portable card changeover machine to the card management assembly;

a plurality of walls supported by the housing and positioned adjacent to the card mouth, the walls being configured to engage at least one securing member of the portable card changeover machine to removably secure the portable card changeover machine to the card mouth;

an indicator supported by the housing and surrounding the perimeter of the card mouth;

at least one light source supported by the housing and configured to cause the indicator to display different visual effects, each of the different visual effects being associated with a different event that occurs during operation of the gaming device;

a display device supported by the housing; and at least one memory device which stores:

(a) data corresponding to a game operable upon a wager; and (b) a plurality of instructions which, when executed by the processor, cause the processor to operate with the card management assembly to:

(1) read machine-readable data of one of the data cards;

(2) determine whether a designated condition is satisfied; and (3) when the designated condition is satisfied, move said data card to the second card holder, where the data card is retained for a period of time after a plurality of plays of the game.

12. The gaming device of claim 11, wherein the data read device is a magnetized device.

13. The gaming device of claim 11, wherein the card processing assembly includes a graphics printer and a graphics eraser.

14. The gaming device of claim 13, wherein the card processing assembly includes at least one thermal energy source operatively coupled to the graphics printer such that the thermal energy source is configured to operate with the graphics printer to produce graphics on each one of the data cards.

15. The gaming device of claim 13, wherein the card processing assembly includes at least one thermal energy source operatively coupled to the graphics eraser such that the thermal energy source is configured to operate with the graphics eraser to remove graphics from each one of the data cards.

16. The gaming device of claim 11, which includes an eject device supported by the housing and positioned adjacent to the card mouth.

17. The gaming device of claim 11, which includes a card mouth display device supported by the housing and positioned adjacent to the card mouth, said card mouth display device configured to display graphics indicating information related to the use of one of the data cards with the gaming device.

18. The gaming device of claim 17, wherein the at least one card processing assembly includes a graphics printer, wherein the plurality of instructions, when executed by the processor, cause the processor to operate with the card mouth display device and the graphics printer to:

(a) cause the card mouth display device to display a plurality of different graphics;

(b) enable a player to select one of the displayed graphics; and (c) cause the graphics printer to print the selected graphics on the data card.

19. The gaming device of claim 11, which includes a card mouth display device supported by the housing and positioned adjacent to the card mouth and an eject device supported by the housing and positioned adjacent to the card mouth, wherein the at least one card processing assembly includes a thermal graphics printer and a thermal graphics eraser, wherein the plurality of instructions, when executed by the processor, cause the processor to operate with the card management assembly, the display device, the eject device, the card mouth display device, and the at least one light source to:

(a) direct light toward the indicator to display at least one of the different visual effects;

(b) receive one of the data cards through the slot;

(c) read any machine-readable data stored on the received data card;

(d) perform at least one of:

(i) cause the thermal graphics printer to thermally produce graphics on the received data card, and (ii) cause the thermal graphics eraser to thermally remove graphics from the received data card;

(e) cause the card mouth display device to display graphics associated with an input opportunity on the card mouth display device, the input opportunity being associated with one of the data cards;

(f) cause the display device to display graphics associated with a play of the game; and (g) in response to an activation of the eject device, dispense the received data card through the card mouth.

20. The gaming device of claim 11, wherein the indicator has a rectangular shape.

21. The gaming device of claim 11, wherein the plurality of instructions, when executed by the processor, cause the processor to, following a card eject event, cause the at least one light source to cause the indicator to display a visual effect associated with the eject event.

22. The gaming device of claim 11, wherein the gaming device includes a plurality of light sources.

23. The gaming device of claim 22, wherein each of the light sources produces light of a different color.

24. The gaming device of claim 11, which includes a card changeover door coupled to the housing by at least one coupling member.

25. The gaming device of claim 24, wherein the card changeover door includes at least one grip member configured to facilitate opening and closing of the card changeover door.

26. The gaming device of claim 24, wherein the card changeover door includes at least one lock configured to facilitate locking of the card changeover door.

* * * * *

UNITED STATES PATENT AND TRADEMARK OFFICE

CERTIFICATE OF CORRECTION

PATENT NO. : 8,057,296 B2
APPLICATION NO. : 11/158478
DATED : November 15, 2011
INVENTOR(S) : Joseph R. Hedrick et al.

It is certified that error appears in the above-identified patent and that said Letters Patent is hereby corrected as shown below:

IN THE CLAIMS:

In Claim 8, column 41, line 37, before "operation" replace "the" with --an--.

In Claim 10, column 41, line 46, before "weight" add --a--.

In Claim 11, column 42, lines 8 to 9, delete "a plurality of walls supported by the housing and positioned adjacent to the card mouth,".

In Claim 11, column 42, line 13, after "surrounding" replace "the" with --a--.

In Claim 13, column 42, line 37, before "card" add --at least one--.

In Claim 14, column 42, line 40, before "card" add --at least one--.

In Claim 15, column 42, line 45, before "card" add --at least one--.

In Claim 17, column 42, line 57, before "use" replace "the" with --a--.

In Claim 18, column 42, line 60, after "printer," add --and--.

In Claim 18, column 43, line 1, replace "graphics" with --graphic--.

In Claim 19, column 43, line 9, after "eraser," add --and--.

In Claim 19, column 43, lines 25-26, delete "on the card mount display device".

In Claim 21, column 44, line 11, before "eject" add --card--.

Signed and Sealed this
Twenty-fourth Day of April, 2012

David J. Kappos

David J. Kappos
*Director of the United States Patent and Trademark Office*